(12) United States Patent
Nakamura et al.

(10) Patent No.: US 6,388,784 B1
(45) Date of Patent: May 14, 2002

(54) DIGITAL OPTICAL TRANSMITTER AND DIGITAL OPTICAL RECEIVER MAKING COMMUNICATION BY SUPERPOSING SUBDATA ON MODULATED WAVEFORM OF MAIN DATA

(75) Inventors: Makoto Nakamura, Hyogo; Yoshihiro Ohtani, Kyoto; Hiroshi Uno, Nara; Tsukasa Kaminokado, Nara; Hiroyuki Nakaoka, Nara; Yutaka Ikeda, Osaka; Takashi Nakajima, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/928,225

(22) Filed: Sep. 12, 1997

(30) Foreign Application Priority Data

Sep. 13, 1996 (JP) ................................. 8-243589
Apr. 16, 1997 (JP) ................................. 9-099072
May 19, 1997 (JP) ................................. 9-114796

(51) Int. Cl.[7] ...................... H04B 10/00; H04B 10/04; H04B 10/06
(52) U.S. Cl. .................. 359/154; 359/154; 359/181; 359/142; 359/189; 359/359; 359/184
(58) Field of Search ............................. 359/142, 158, 359/181, 182, 183, 184, 189, 180, 173, 154; 375/130, 135, 136, 146, 147, 148, 285, 346, 348, 260, 296, 297

(56) References Cited

U.S. PATENT DOCUMENTS

| 4,586,186 A | 4/1986 | Anderson | 375/3 |
| 4,972,408 A | 11/1990 | Le Bihan Herve et al. | 370/84 |
| 5,079,525 A | * 1/1992 | Ishikawa et al. | 332/120 |
| 5,126,998 A | * 6/1992 | Stem, Jr. | 370/11 |
| 5,546,190 A | * 8/1996 | Hill et al. | 359/158 |
| 5,581,576 A | * 12/1996 | Lanzetta et al. | 375/216 |
| 5,598,287 A | * 1/1997 | Van Driel et al. | 359/125 |
| 5,751,458 A | * 5/1998 | Yoshida et al. | 359/173 |
| 5,926,301 A | * 7/1999 | Hirt | 359/154 |

FOREIGN PATENT DOCUMENTS

| EP | 0261423 | 3/1988 |
| JP | 63313944 | 12/1988 |
| JP | 4074034 | 3/1992 |
| JP | 7297808 | 11/1995 |

* cited by examiner

Primary Examiner—Jason Chan
Assistant Examiner—M. R. Sedighian

(57) ABSTRACT

A digital optical transmitter includes a main/subdata modulation part for distorting a main data modulated signal waveform in response to sub-data, and an E/O conversion part for converting a subsequently obtained electrical modulated signal to an optical modulated signal and outputting the optical modulated signal. A digital optical receiver includes an O/E conversion part for receiving the optical modulated signal, converting it to an electrical modulated signal, and outputting the electrical modulated signal. Additionally, the digital optical receiver further includes a main/subdata demodulation part for demodulating the main data from the electrical modulated signal, while detecting whether or not a distortion signal responsive to the subdata is superposed on a subcarrier which forms the electrical modulated signal. If the distortion signal is superposed on a subcarrier, the main/subdata demodulator part demodulates the associated subdata.

30 Claims, 62 Drawing Sheets

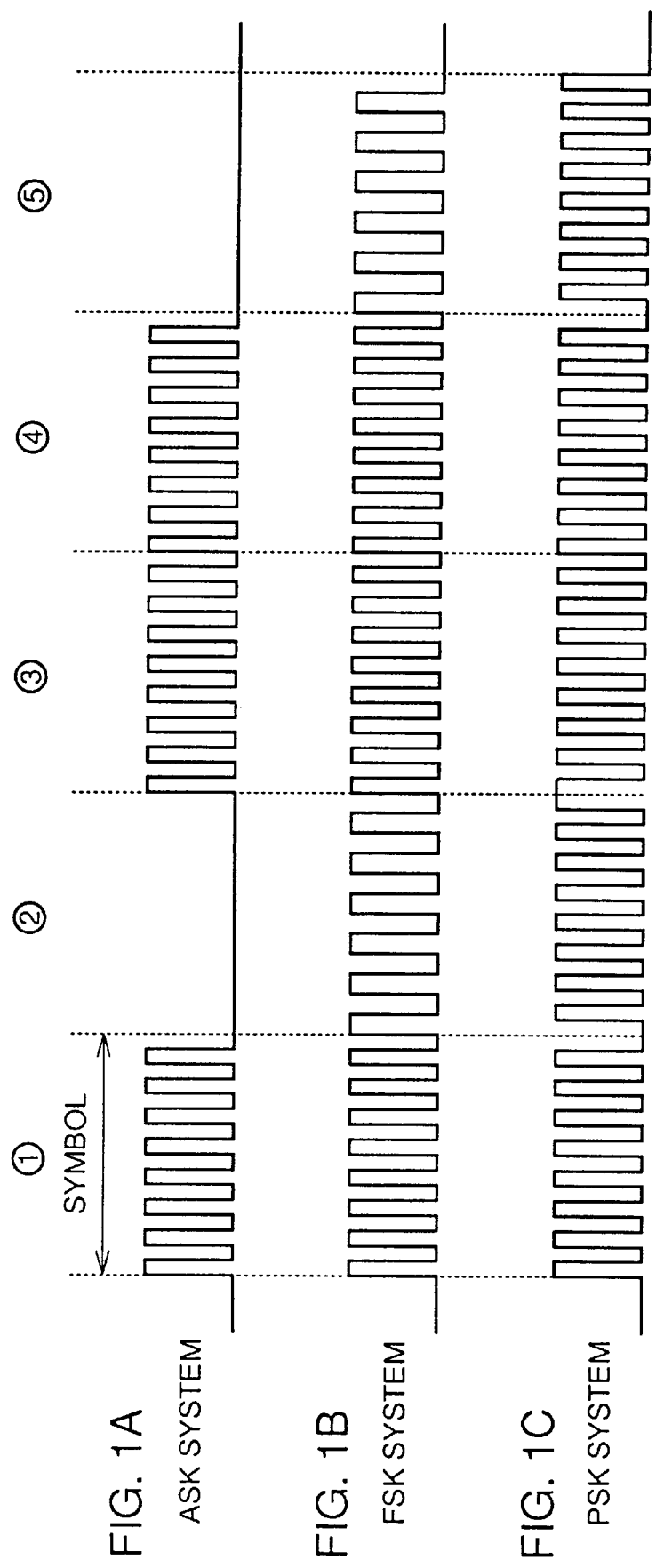

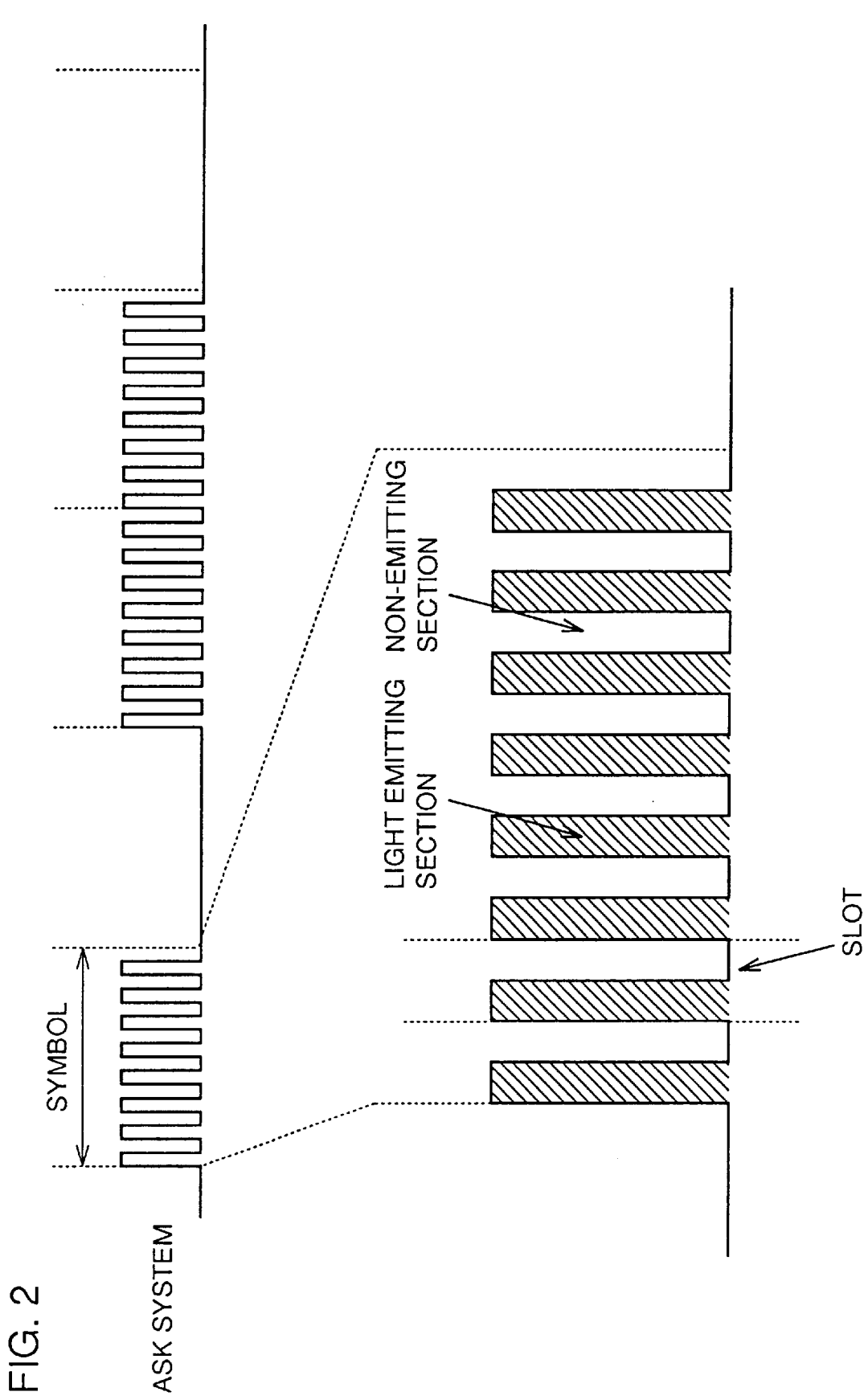

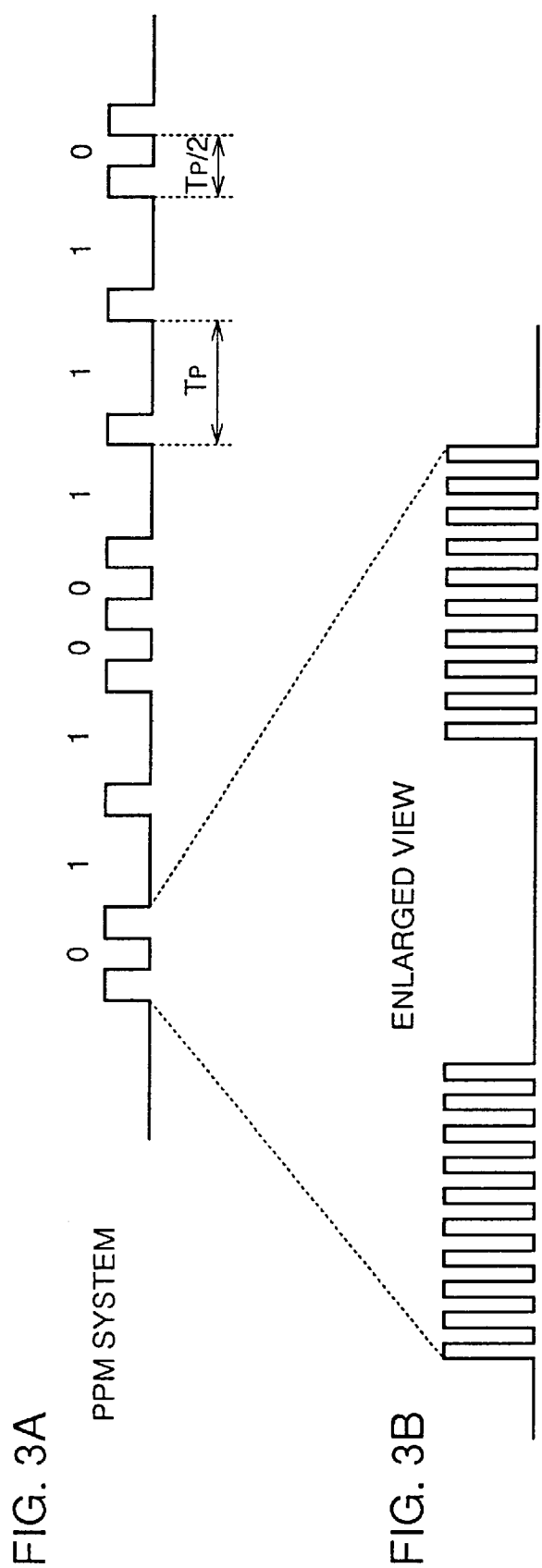

FIG. 5A
PRIOR ART
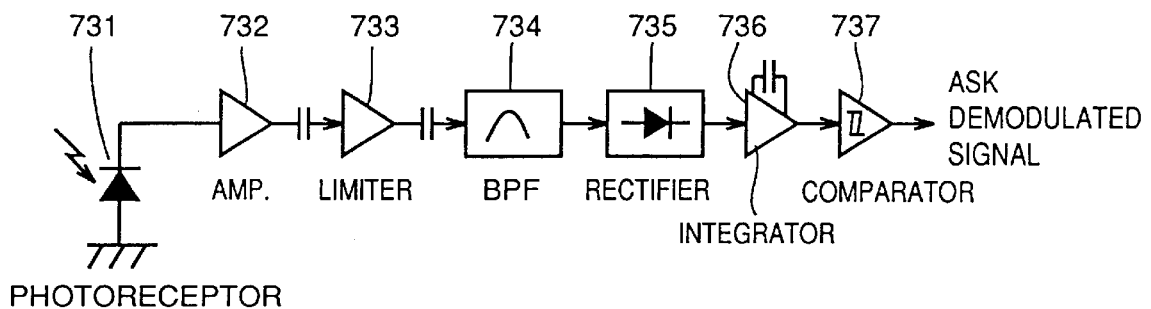
PHOTORECEPTOR
FIG. 5B
PRIOR ART
FIG. 5C
PRIOR ART
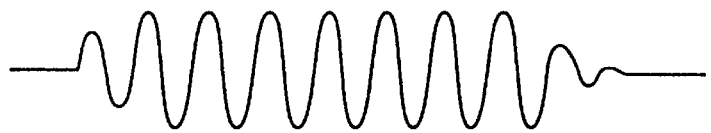
FIG. 5D
PRIOR ART
FIG. 5E
PRIOR ART
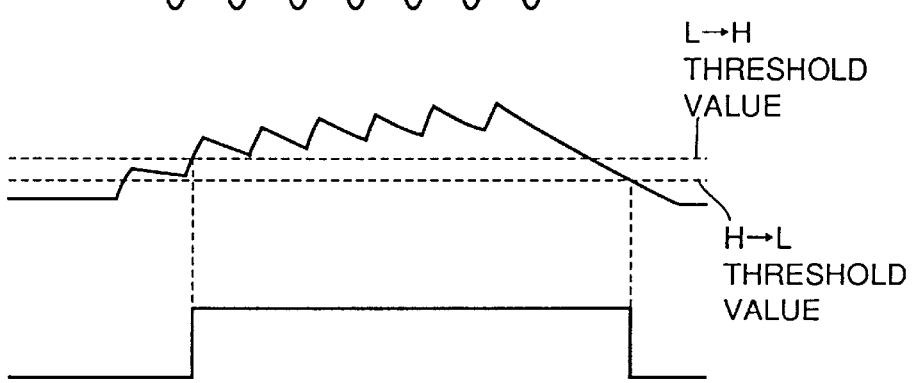

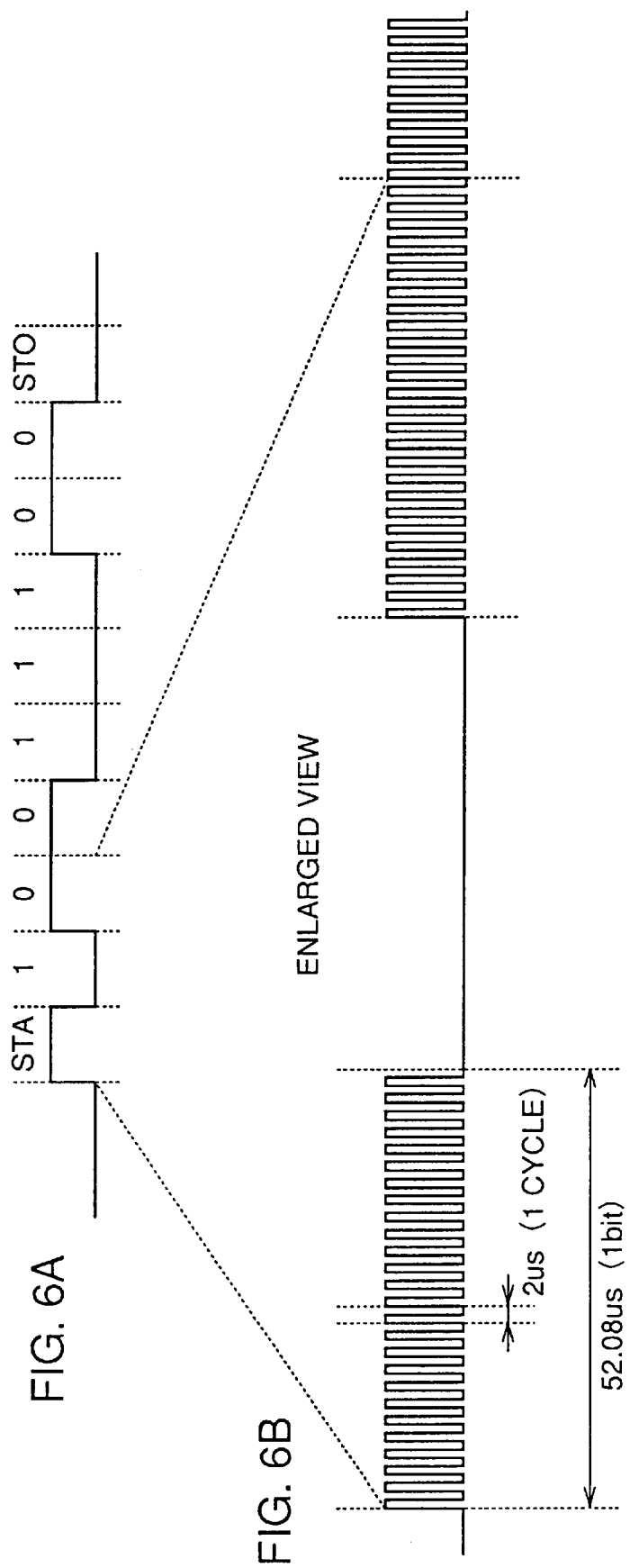

IRTx WAVEFORM GENERATION CIRCUIT

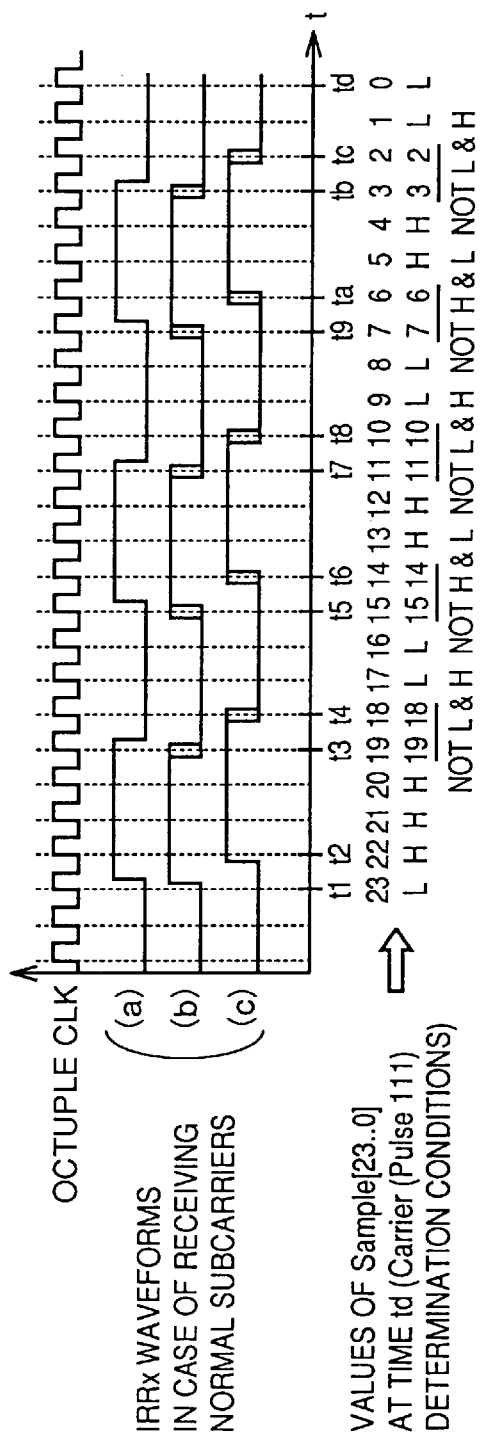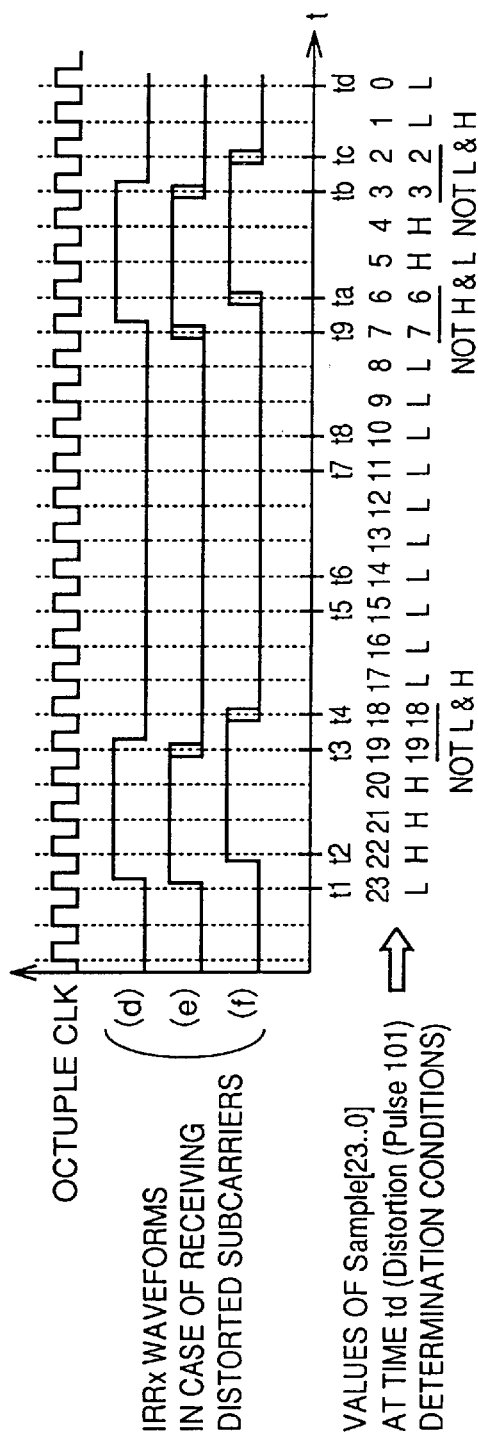

IRTx WAVEFORM GENERATION CIRCUIT

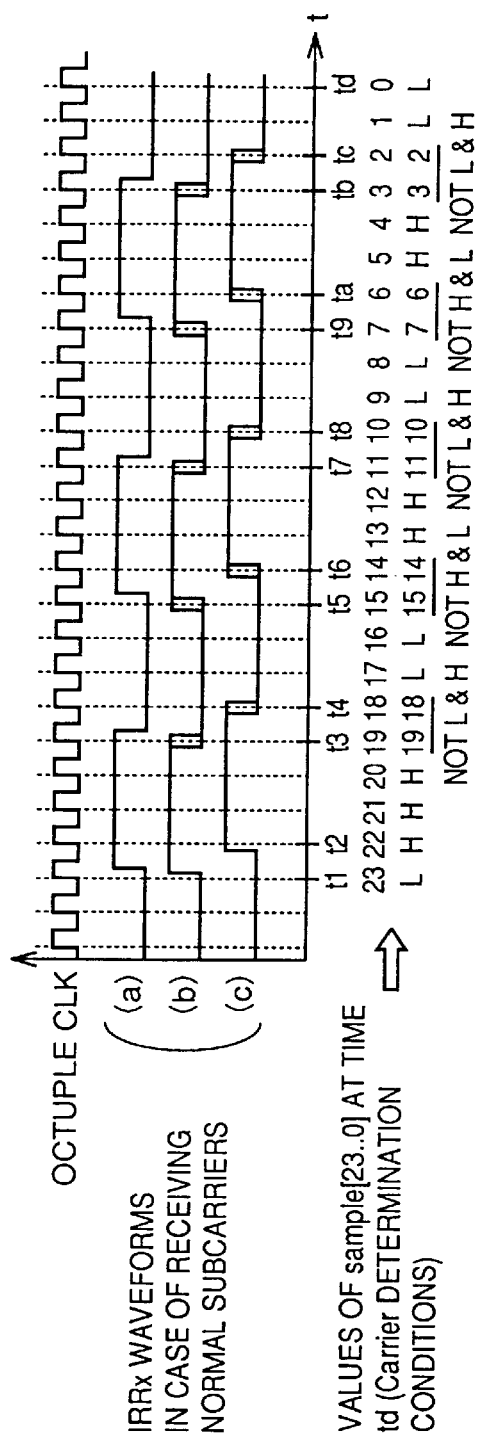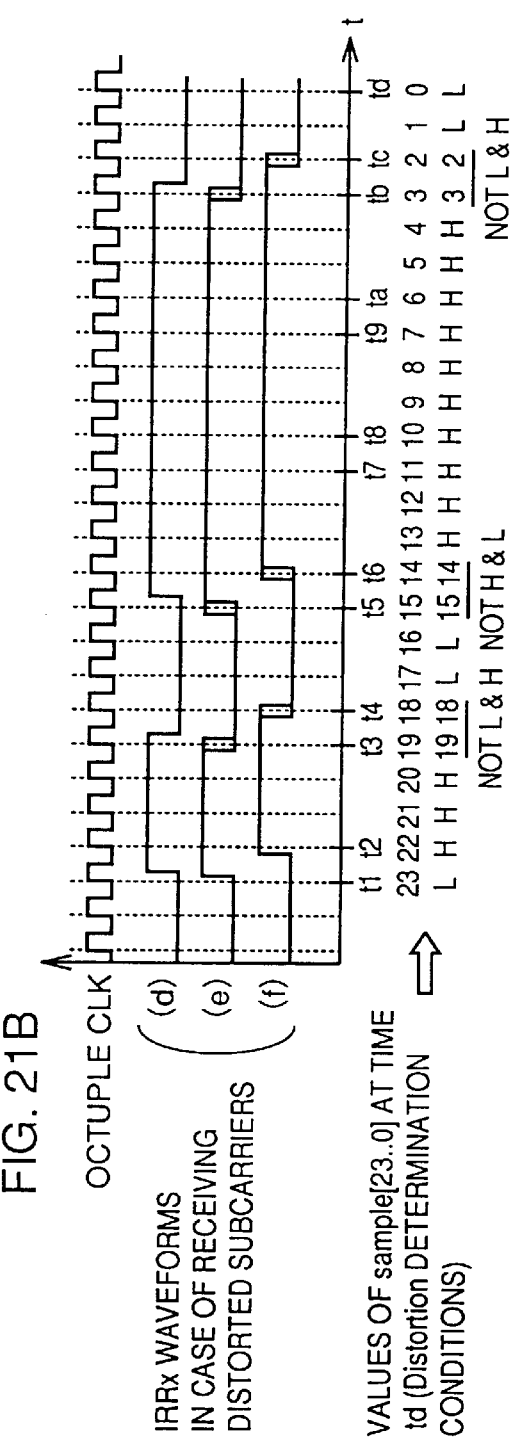

IRTx WAVEFORM GENERATION CIRCUIT

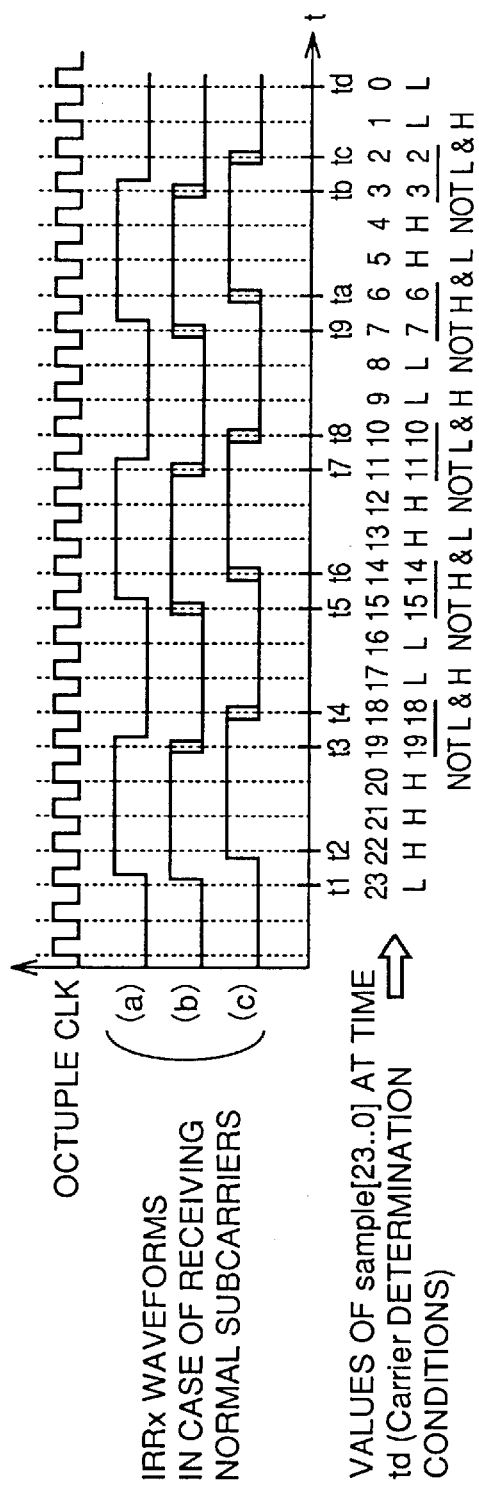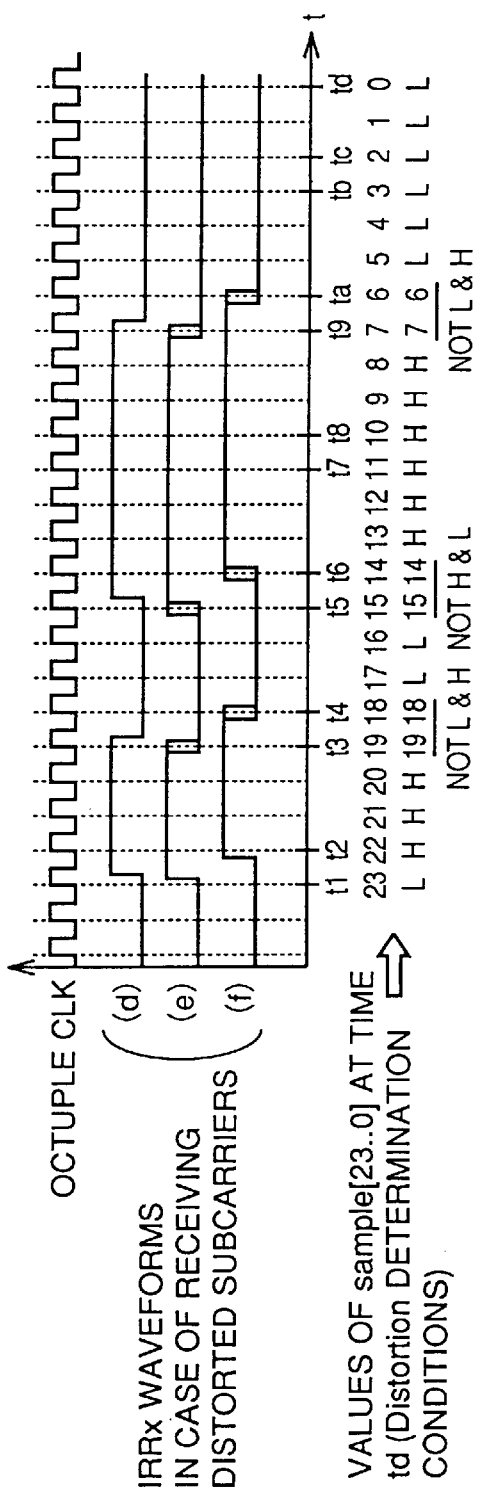

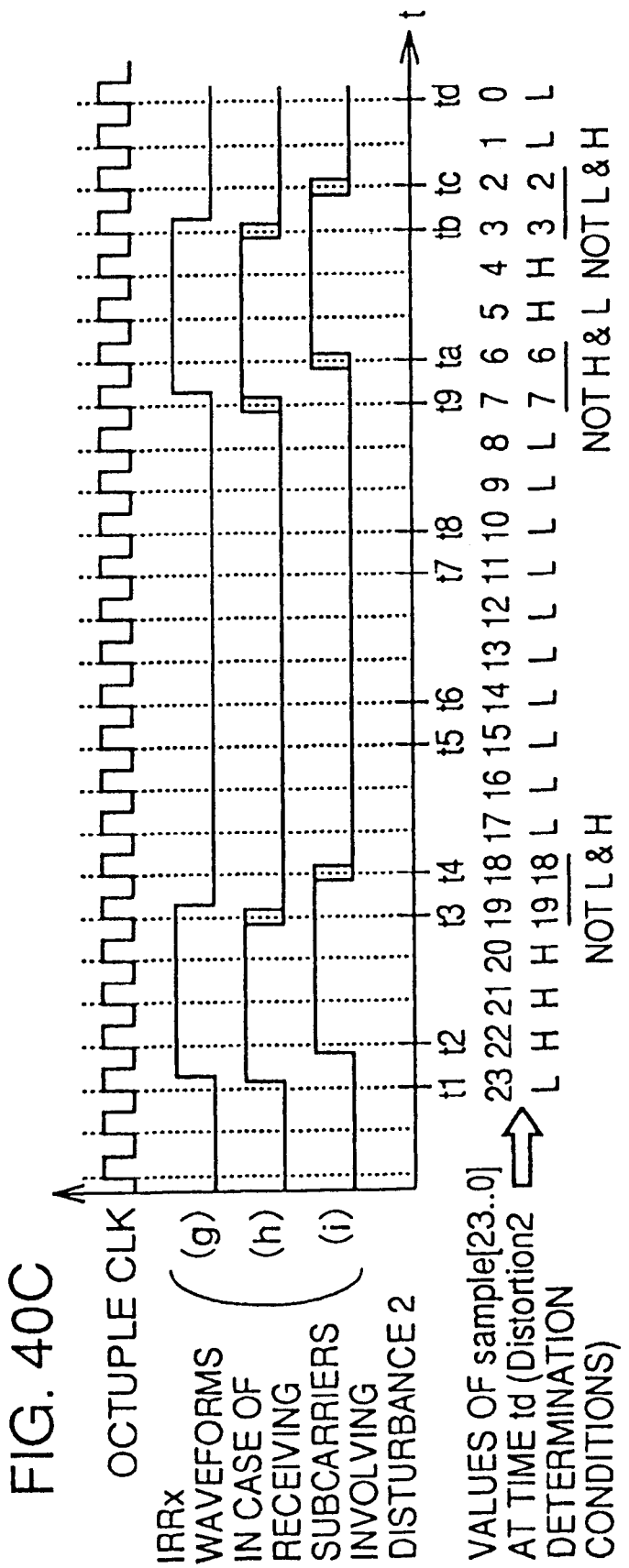

FIG. 45A
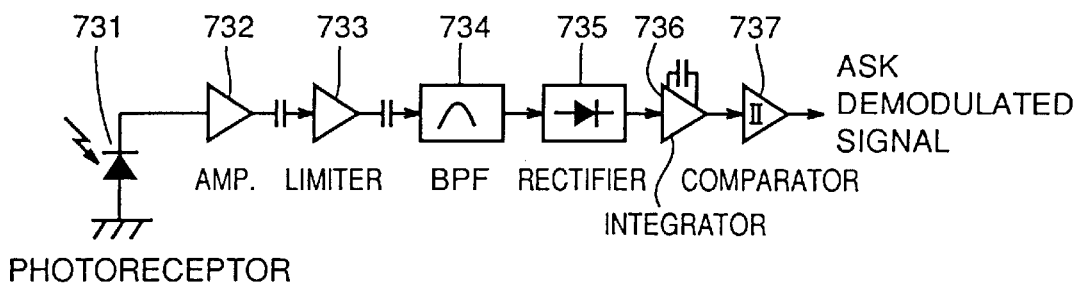
FIG. 45B
FIG. 45C
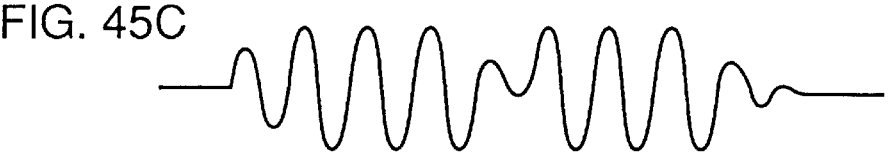
FIG. 45D
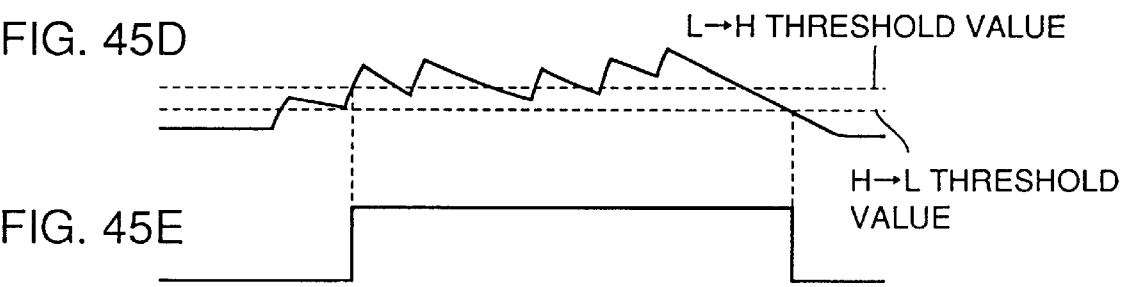
FIG. 45E

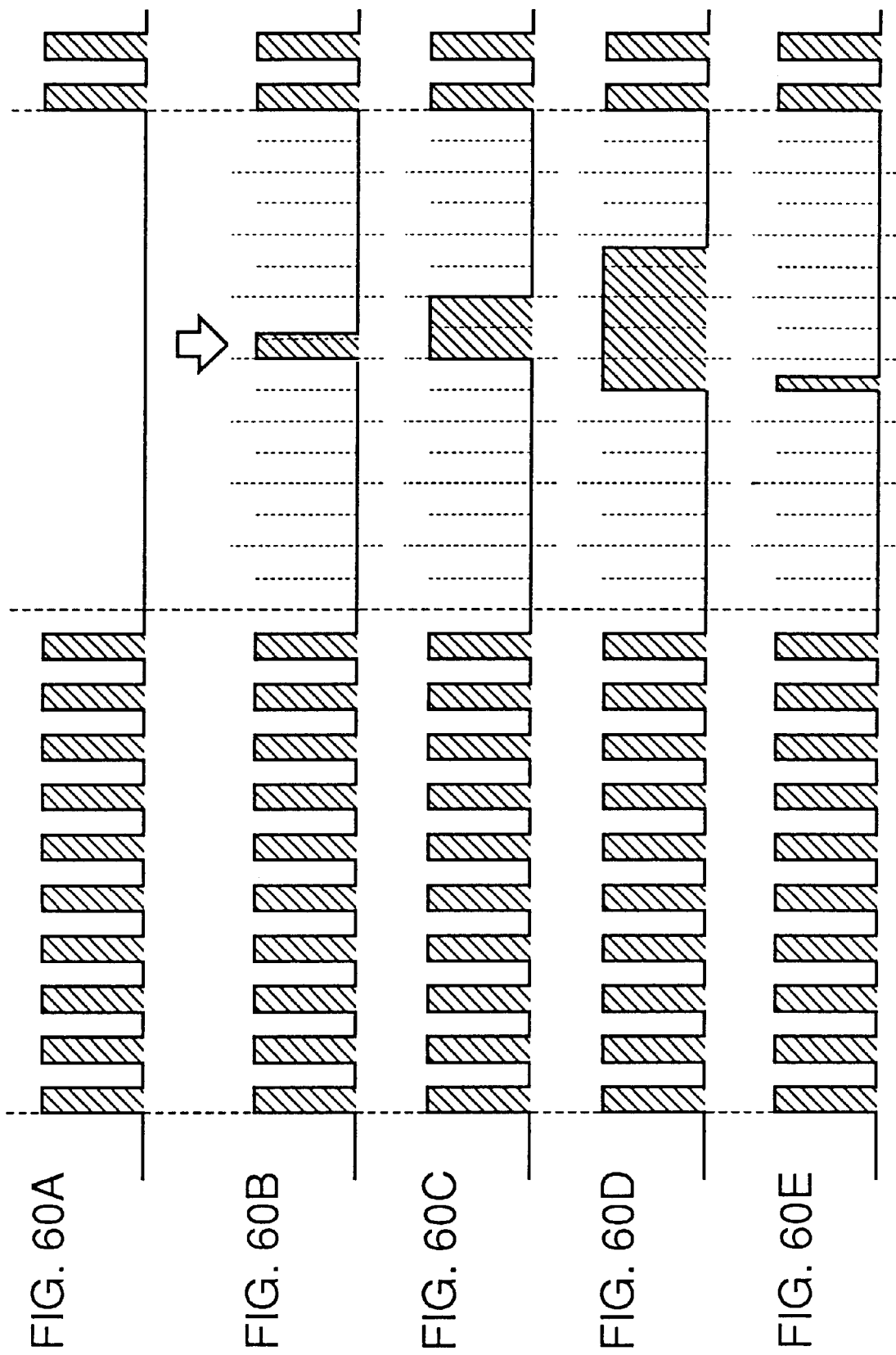

DIGITAL OPTICAL TRANSMITTER AND DIGITAL OPTICAL RECEIVER MAKING COMMUNICATION BY SUPERPOSING SUBDATA ON MODULATED WAVEFORM OF MAIN DATA

BACKGROUND OF THE INVENTION

1. Field of the Invention

The present invention relates to a digital optical communication device for transmitting and receiving optical signals involving subcarriers.

2. Description of the Background Art

Digital optical communication has been recently utilized over a wide range of application. For example, infrared digital optical communication is widely applied to remote control for household electric products such as televisions, videos and the like.

Various methods have heretofore been contrived as systems of digital optical communication. Typical examples of these systems are amplitude shift keying (ASK) modulation, frequency shift keying (FSK) modulation, phase shift keying (PSK) modulation, and the like. When applied to digital optical communication, these modulation systems can be roughly classified into two types of communications, coherent optical communications and incoherent optical communication. The coherent communication is adapted to perform modulation by employing an optical medium itself as carriers, and the incoherent communication is adapted to perform modulation by carriers simulatively created by on-off controlling light in a cycle considerably slower than its wavelength. The carriers simulatively created in case of the incoherent communication are generally called subcarriers.

FIGS. 1A to 1C show pulse signals of the respective modulation systems. FIG. 1A shows the pulse signal of the ASK modulation system. When sections ① to ⑤ divided by dotted lines are referred to as symbols, each symbol involves a plurality of pulses (subcarriers). The symbols ①, ③ and ④ involve subcarriers of the same frequency respectively, and indicate logic "1". On the other hand, the symbols ② and ⑤ involve no subcarriers respectively, and indicate logic "0".

FIG. 1B shows the pulse signal of the FSK modulation system. The symbols ①, ③ and ④ involve subcarriers, and indicate logic "1". The symbols ② and ⑤ also involve subcarriers, which are different in frequency from those in the symbols ①, ③ and ④. Due to the different frequency of the subcarriers, the symbols ② and ⑤ indicate logic "0".

FIG. 1C shows the pulse signal of the PSK modulation system. The symbols ①, ③ and ④ involve subcarriers, and indicate logic "1". The symbols ② and ⑤ also involve subcarriers, which are identical in frequency to but out of phase with those in the symbols ①, ③ and ④. Due to the phase difference between the subcarriers, the symbols ② and ⑤ indicate logic "0".

The subcarriers, which are generally formed by simply controlling light on-off as described above, are substituted not as sine waves but as rectangular waves in general. As shown in FIG. 2, light emission and no emission are repeated in each symbol in a constant cycle for generating subcarriers in the ASK modulation system. An interval corresponding to one cycle of the subcarriers is hereinafter referred to as a slot.

In the aforementioned infrared remote control, a technique of modulating transmit data by a PPM (pulse position modulation) system and modulating certain carriers again by a waveform modulated in the PPM system is generally employed as one of many data transmission systems. FIGS. 3A and 3B illustrate an exemplary waveform of this data transmission system. While FIG. 3A illustrates a PPM modulated waveform in a broad view, each pulse consists of subcarriers, as shown in FIG. 3B. The PPM modulation system is adapted to transmit data by pulse positions, and pulse spaces Tp and Tp/2 indicate "1" and "0" respectively in FIG. 3A.

FIGS. 4A and 4B illustrate a conventional digital optical transmitter 721 and a conventional digital optical receiver 725 for the transmission system generally employed in the aforementioned infrared remote control, for example. The digital optical transmitter 721 includes a PPM modulation part 722 for receiving transmit data and PPM-modulating the same, an ASK modulation part 723 for ASK-modulating a PPM modulated signal, and an electrical/optical (E/O) conversion part 724 for converting an electrical modulated signal to an optical modulated signal. The PPM modulation part 722 receives the transmit data, for generating and outputting the aforementioned PPM modulated signal shown in FIG. 3A with no superposition of subcarriers. The ASK modulation part 723 modulates subcarriers by the PPM modulated signal inputted therein, and outputs the signal shown in FIG. 3B. The E/O conversion part 724 converts the electrical modulated signal received from the ASK modulation part 723 to an optical on-off signal and outputs the same.

The digital optical receiver 725 includes an O/E (optical/ electrical) conversion part 726 for converting an optical modulated signal to an electrical modulated signal, an ASK demodulation part 727 for demodulating the electrical modulated signal from the O/E conversion part 726 in the ASK system, and a PPM demodulation part 728 for receiving the ASK demodulated signal and converting the same to receive data. The O/E conversion part 726 receives the optical modulated signal, and converts the optical on-off signal to an electrical modulated signal. The ASK demodulation part 727 outputs an ASK demodulated signal (PPM modulated signal) obtained by removing the subcarriers involved in the electrical modulated signal. The PPM demodulation part 728 converts the ASK modulated signal to receive data and outputs the same.

FIG. 5A is a circuit diagram of the O/E conversion part 726 and the ASK demodulation part 727, and FIGS. 5B to 5E illustrate output waveforms of the respective components. Referring to FIG. 5A, the O/E conversion part 726 includes a photoreceptor 731, which is an element converting received light to an electric current. The ASK demodulation part 727 includes an amplifier 732, a limiter 733, a bandpass filter (BPF) 734, a rectifier 735, an integrator 736, and a comparator 737. The amplifier 732 converts the current received from the photoreceptor 731 to a voltage and amplifies the same.

The limiter 733 suppresses a voltage exceeding a certain value. The BPF 734, which is adapted to remove noise components from subcarriers, matches its center frequency with the frequency of the subcarriers. When the photoreceptor 731 receives the optical signal shown in FIG. 5B, its output is converted to the signal shown in FIG. 5C through the amplifier 732, the limiter 733 and the BPF 734.

The rectifier 735 extracts only a plus component of the voltage. The integrator 736 integrates the output from the rectifier 735, and outputs the signal shown in FIG. 5D.

The comparator 737, which is formed by a Schmidt buffer, converts the output of the integrator 736 to a rectangular waveform as shown in FIG. 5E, and outputs the same.

While the digital optical transmitter and the digital optical receiver employing subcarriers have been described, an advantage of employment of the communication waveform using subcarriers is now described.

While the spectrum of a non-modulated signal (baseband signal) is generally distributed in a low-frequency region, this signal spectrum shifts to a band around the frequency of subcarriers when the subcarriers are modulated by a modulated signal. Particularly in the case of infrared communication, a number of external noises exist in the low-frequency region. Therefore, it is possible to improve the signal-to-noise ratio by modulating the modulated signal (baseband signal) by subcarriers and moving its signal spectrum to a high-frequency region having less noise. This is one of the preferable reasons why the communication waveform employing subcarriers is used in optical communications.

Description is now made with reference to a more concrete example.

Consider a transmission system employed in the aforementioned infrared remote control, for example. In this case, the modulated signal before modulation of the subcarriers is the PPM modulated signal shown in FIG. 3A, and the spectrum of this PPM modulated signal spreads in a low-frequency band of about 0 to 2 KHz. After modulation of subcarriers of 40 KHz, for example, the spectrum of the modulated signal (FIG. 3B) appears on either side of the frequency of the subcarriers. Thus, this spectrum appears in the range of 38 KHz to 42 KHz in the end. On the other hand, external infrared noise from by a general fluorescent lamp are distributed in the range of 50 to 60 Hz and harmonics thereof. While the frequency band of the spectrum of the original modulated signal (PPM modulated signal) itself overlaps with the same, it is understood that the spectrum of the signal after modulation of the subcarriers does not overlap with that of the infrared noise from by the fluorescent lamp and is hardly influenced by these noise sources.

On the other hand, a 500 KHz ASK system is also generally employed as a data transmission system for infrared data communication. FIGS. 6A and 6B illustrate an exemplary waveform of this data transmission system. The 500 KHz subcarriers are superposed on an unmodulated waveform, and each symbol involving the 500 KHz subcarriers indicates data "0", and that involving no 500 KHz subcarriers indicates data "1". Assuming that the transfer rate for main data is 19200 bps, the interval between the main data bits is 52.08 $\mu$s and hence it follows that 26 slots exist per symbol.

FIG. 7 is a block diagram showing the structure of a conventional digital optical communication device. This digital optical communication device includes an ASK transmitter 811 including an ASK modulation part 813 for receiving a serial data signal and ASK-modulating the same and an E/O (electrical/optical) conversion part 812 for converting an electrical modulated signal to an optical modulated signal, an ASK receiver 814 including an O/E (optical/electrical) conversion part 815 for converting the optical modulated signal to an electrical modulated signal and an ASK demodulation part 816 for demodulating the electrical modulated signal from the O/E conversion part 815 in the ASK system, inverters 817 and 818, and an UART (universal asynchronous receiver and transmitter) 819 for performing serial-parallel conversion of data.

The UART 819 converts parallel data received from a computer (not shown) or the like to 8-bit non-parity serial data and outputs the same, as shown in FIG. 6A. The serial data involves a start bit (STA), 8-bit data, and a stop bit (STO). The ASK modulation part 813 modulates subcarriers by the inputted serial data, and outputs the signal shown in FIG. 6B. The E/O conversion part 812 converts an electrical modulated signal received from the ASK modulation part 813 to an optical on-off signal and outputs the same.

The O/E conversion part 815 receives an infrared receive signal (optical modulated signal), and converts the optical on-off signal to an electrical modulated signal. The ASK demodulation part 816 outputs an ASK demodulated signal obtained by removing the subcarriers involved in the electrical modulated signal. The UART 819 converts an inverted signal of the ASK demodulated signal and converts the same to parallel data. The UART 819 outputs the parallel data to the computer (not shown) or the like.

In order to increase the data communication channel capacity in a device utilizing the aforementioned digital optical transmission system, the transfer rate may be increased or the communication system may be changed. In this case, however, the device utilizing the conventional digital optical transmission system cannot make communication with other conventional devices such as a computer, for example.

SUMMARY OF THE INVENTION

An object of the present invention is to provide a digital optical transmitter/receiver having a larger data communication channel capacity than the conventional digital optical communication device device while maintaining compatibility with other conventional devices such as computers.

According to a certain aspect of the present invention, a digital optical transmitter for transmitting data through a modulation system utilizing subcarriers includes a main/subdata modulation part for distorting a main data modulated waveform obtained by modulating subcarriers in main data in response to subdata, and an E/O conversion part for converting an electrical modulated signal obtained as a result to an optical modulated signal and outputting the same.

A subcarrier modulated signal by the main data is distorted in response to the subdata, whereby communication is made with attachment of the data contents of the subdata to the main data. Consequently, the data communication channel capacity can be increased.

According to another aspect of the present invention, a digital optical receiver for receiving data through a modulation system utilizing subcarriers includes an O/E conversion part for receiving an optical modulated signal, converting the same to an electrical modulated signal and outputting the same, and a main/subdata demodulation part for detecting a distortion in subcarriers forming the electrical modulated signal and extracting subdata superposed in the subcarriers.

The main/subdata demodulation part detects the distortion in the subcarriers, thereby extracting the subdata. Thus, the data communication channel capacity can be increased.

According to still another aspect of the present invention, a digital optical transmitter for transmitting data through a modulation system utilizing subcarriers includes a main/subdata modulation part for distorting a non-emitting symbol of a main data modulated waveform obtained by modulating subcarriers on the main data in response to subdata, and an E/O conversion part for converting an electrical modulated signal obtained as a result to an optical modulated signal and outputting the same.

The non-emitting symbol of the main data modulated waveform is distorted in response to the subdata, whereby communication can be made with attachment of the data contents of the subdata to the main data. Consequently, the data communication channel capacity can be increased.

According to a further aspect of the present invention, a digital optical receiver for receiving data through a modulation system utilizing subcarriers include an O/E conversion part for receiving an optical modulated signal, converting the same to an electrical modulated signal and outputting the same, and a main/subdata demodulation part for detecting a distortion of a non-emitting symbol forming the electrical modulated signal and extracting subdata superposed in the non-emitting symbol.

The main/subdata demodulation part detects the distortion of the non-emitting symbol and extracts the subdata. Thus, the data communication channel capacity can be increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A to 1C illustrate pulse signals of respective modulation systems;

FIG. 2 illustrates a symbol in an ASK modulation system in an enlarged manner;

FIGS. 3A and 3B illustrate an exemplary waveform of a data transmission system generally employed in infrared remote control;

FIG. 5A illustrates internal structures of an O/E conversion part and a main data demodulation part in a conventional ASK receiver, and FIGS. 5B to 5E illustrate waveforms transmitted from a conventional ASK transmitter and received by the ASK receiver;

FIGS. 6A and 6B illustrate another exemplary waveform of a data transmission system generally employed in infrared remote control;

FIGS. 14A and 14B are timing charts in the IRRx sampling circuit according to the first embodiment;

FIGS. 21A and 21B are timing charts in an IRRx sampling circuit according to the second embodiment;

FIGS. 28A and 28B are timing charts in an IRRx sampling circuit according to the third embodiment;

FIGS. 40A to 40C are timing charts in an IRRx sampling circuit according to the fifth embodiment;

FIG. 45A illustrates the internal structures of an O/E conversion part and a main data demodulation part in a conventional ASK receiver, and FIGS. 45B to 45E illustrate transmission waveforms transmitted from the inventive digital optical transmitter according to the embodiment 1 and received by the conventional ASK receiver;

FIGS. 60A to 60E illustrate a method of superposing pulses on non-emitting symbols.

DESCRIPTION OF THE PREFERRED EMBODIMENTS

Figure 4A:
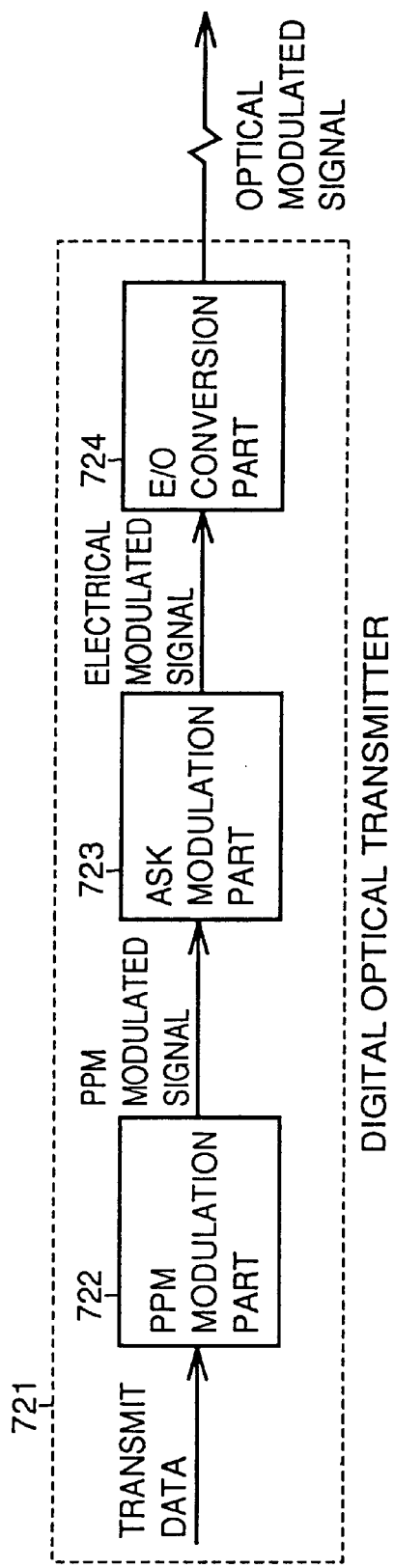
FIGS. 4A and 4B illustrate examples of a conventional digital optical transmitter and a conventional digital optical receiver.
Figure 4B:
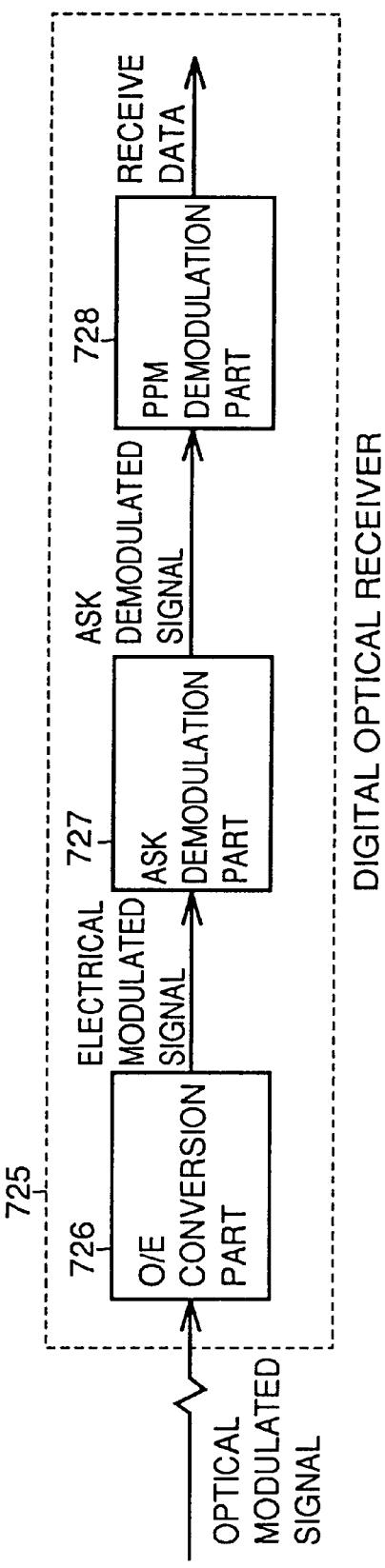
Figure 7:
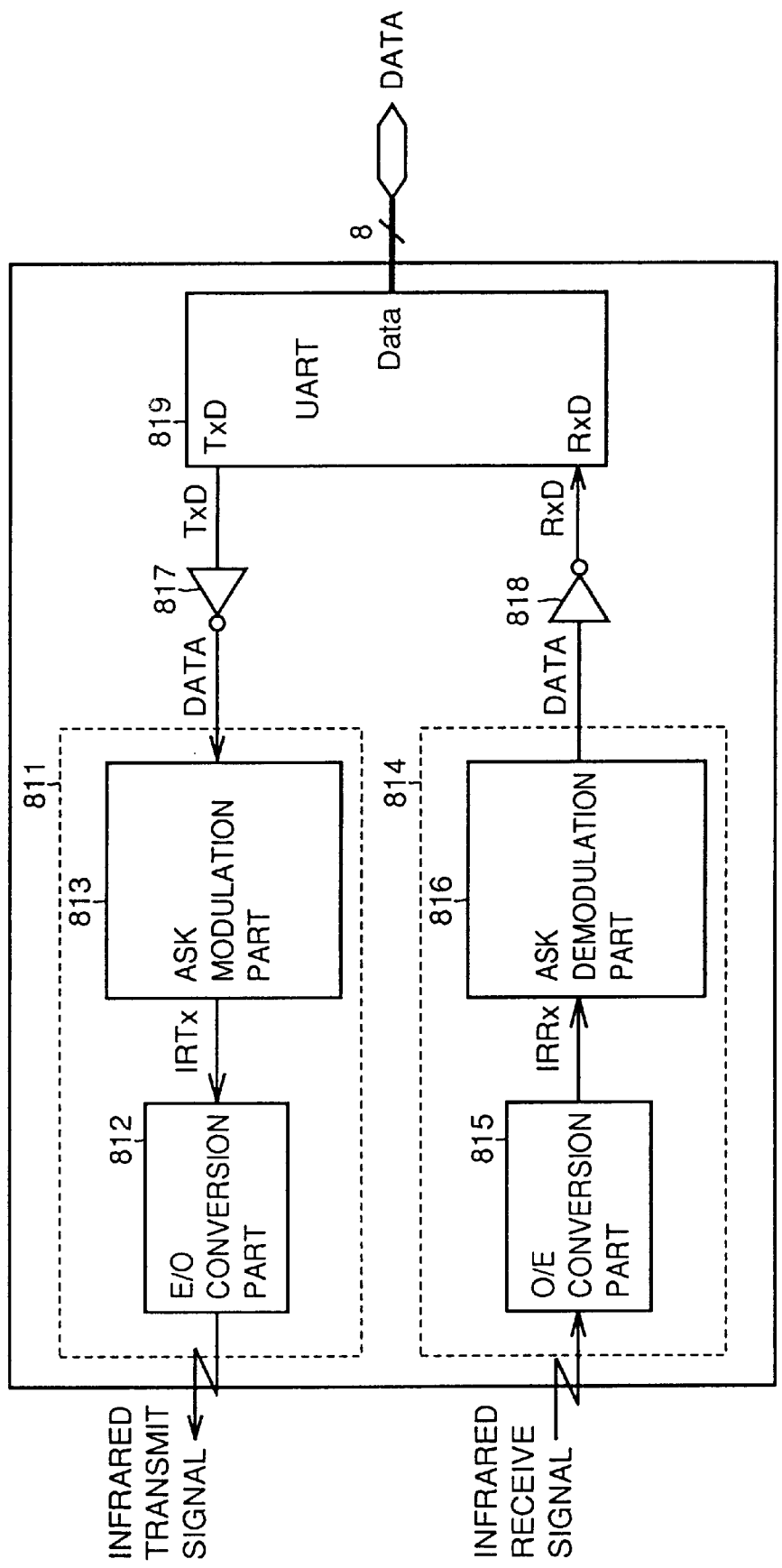
FIG. 7 illustrates other examples of a conventional optical transmitter and a conventional optical receiver.
Figure 8A:
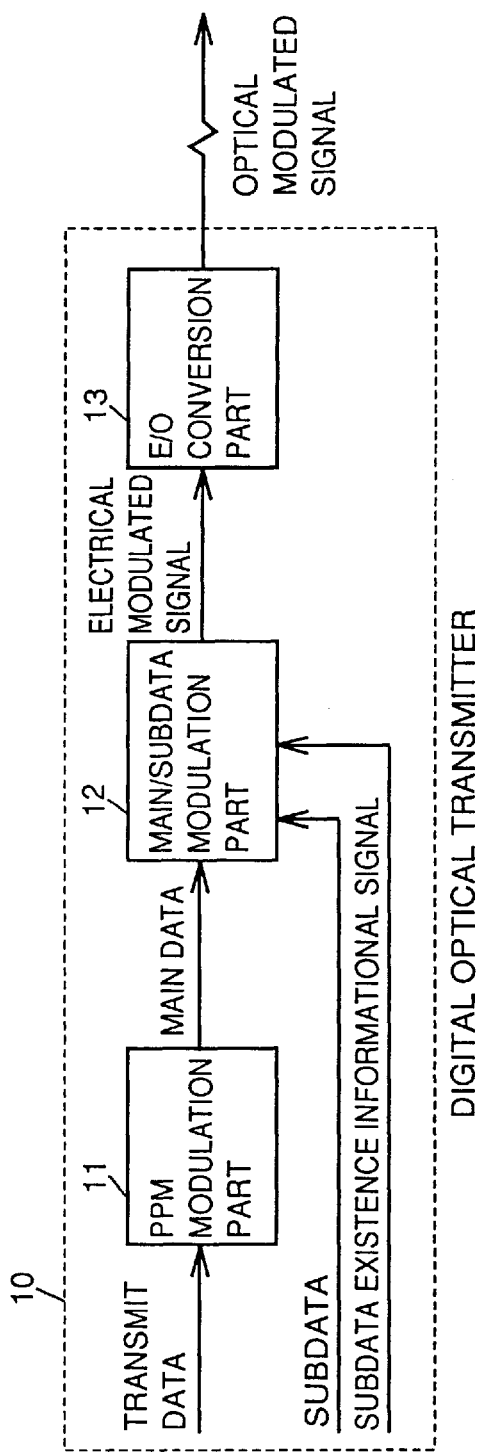
FIGS. 8A and 8B are block diagrams showing the internal structures of a digital optical transmitter and a digital optical receiver according to each of embodiment of the present invention.
Figure 8B:
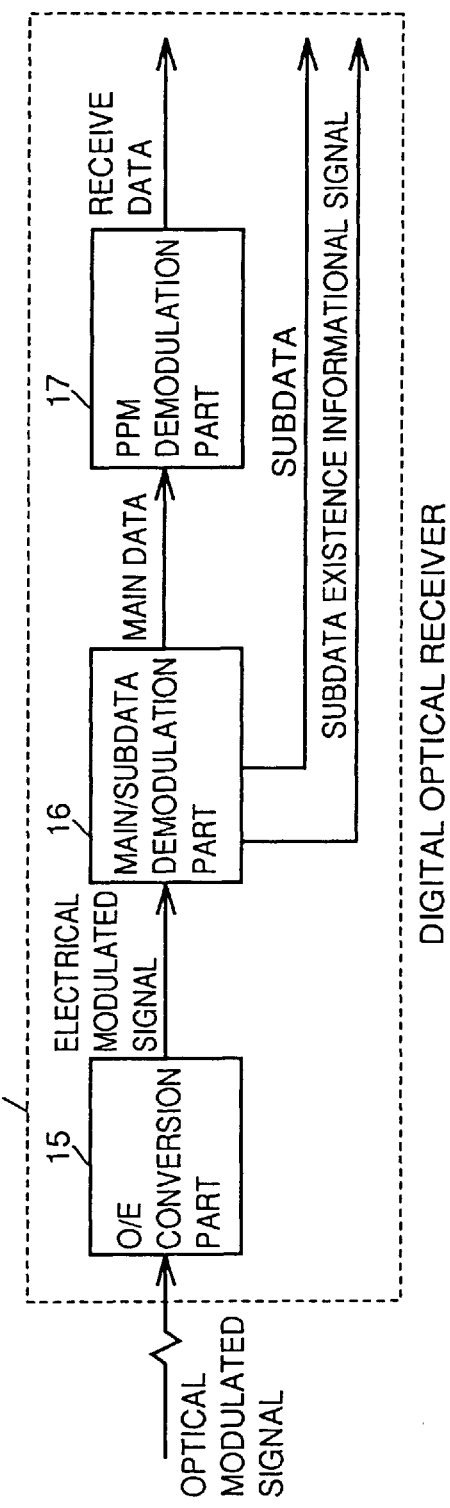

Referring to FIGS. 8A and 8B, a digital optical transmitter 10 includes a PPM modulation part 11, a main/subdata modulation part 12 for superposing subdata on main data and outputting the data as an electrical modulated signal, and an E/O (electrical/optical) conversion part 13 for converting the electrical modulated signal to an optical modulated signal and outputting the same. The PPM modulation part 11 receives transmit data and generates a pulse signal of the PPM transmission system. The PPM transmission system has been described with reference to FIG. 3A, and hence redundant description is omitted.

The main/subdata modulation part 12 distorts parts of subcarriers forming a main data modulated signal in response to the subdata when a subdata existence informational signal is active (indicates existence of the subdata) and outputs the same. The main/subdata modulation part 12, which is a principal part of the present invention, is described in detail with reference to each embodiment. The E/O conversion part 13 converts the electrical modulated signal received from the main/subdata modulation part 12 to an optical modulated signal and outputs the same to the exterior.

On the other hand, a digital optical receiver 14 includes an O/E (optical/electrical) conversion part 15, a main/subdata demodulation part 16 for receiving an electrical modulation signal from the O/E conversion part 15 and separating main data from subdata, and a PPM demodulation part 17. The O/E conversion part 15 converts an externally received optical modulated signal to an electrical modulated signal and outputs the same. The main/subdata demodulation part 16 receives the electrical modulated signal from the O/E conversion part 15 and detects whether or not subdata are superposed in subcarriers forming the electrical modulated signal while demodulating optical data from the electrical modulated signal for simultaneously demodulating the subdata and activating a subdata existence informational signal indicating the existence of the subdata if the subdata are superposed. The main/subdata demodulation part 16, which is another principal part of the present invention, is described in detail with reference to each embodiment. The PPM demodulation part 17 receives the main data from the main/subdata demodulation part 16, converts the same to receive data, and outputs the data. The main data is a pulse signal of the PPM transmission system (see FIG. 3A].

Figure 9:
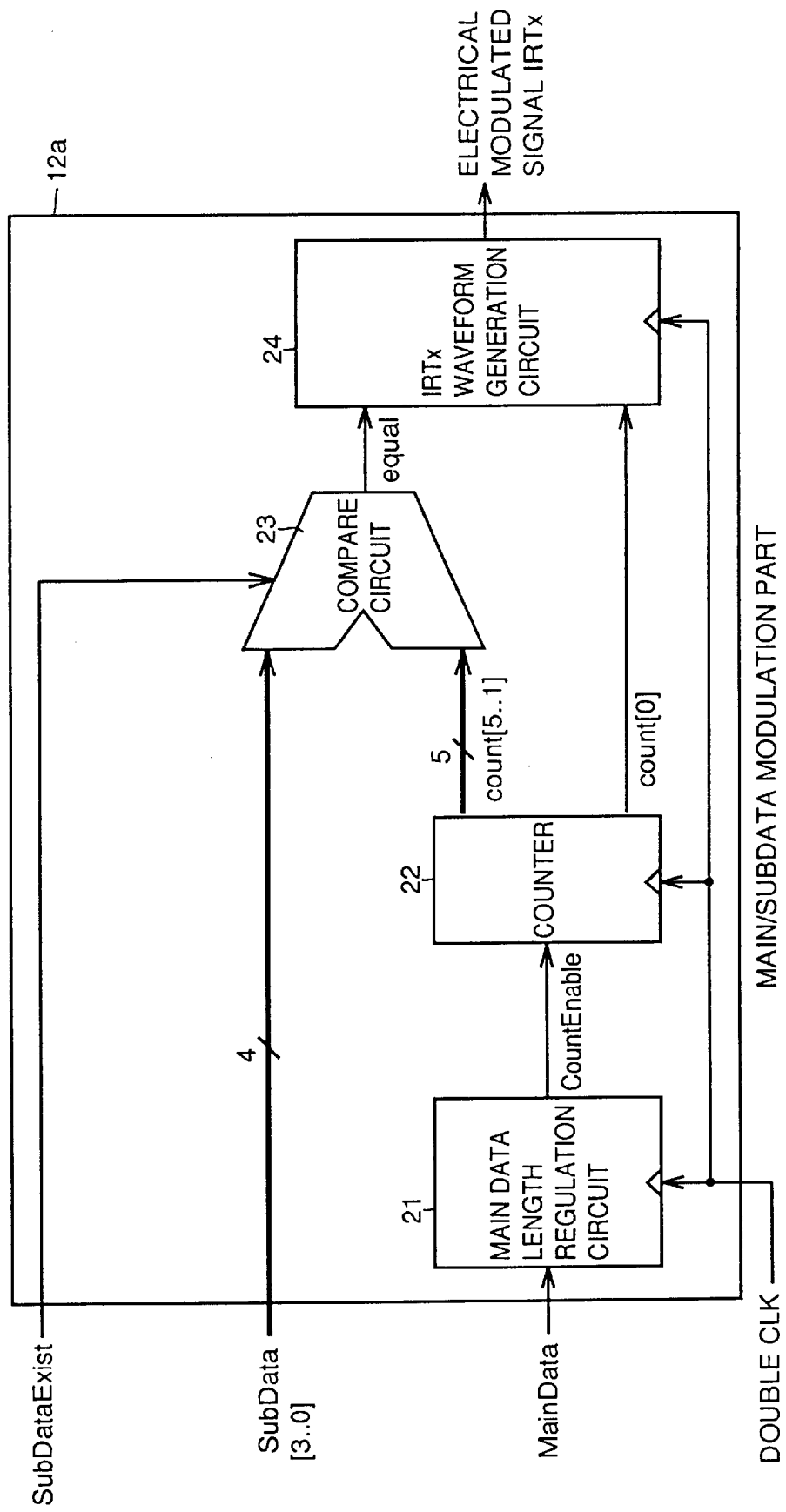
FIG. 9 is a block diagram showing the internal structure of a main/subdata modulation part according to the first embodiment.

FIG. 9 illustrates a first embodiment of the present application.

Referring to FIG. 9, a main/subdata modulation part 12a includes a main data length regulation circuit 21 for outputting main data in synchronization with a double CLK signal, a counter 22, a compare circuit 23, and an IRTx waveform generation circuit 24 for generating subcarriers involving subdata. The double CLK signal has a cycle twice that of the subcarriers.

The main data length regulation circuit 21 synchronizes a main data signal received from the PPM modulation part 11 with the double CLK signal. This synchronization can be implemented by inputting the main data (MainData) signal and the double CLK signal in a D (data) terminal and a C (clock) terminal of a D flip-flop respectively, for example. The synchronized signal is inputted in the counter 22 as a CountEnable signal.

The counter 22, which is formed by a 6-bit counter, starts a count operation when the CountEnable signal becomes "1" (active). A signal of the least significant bit count[0] of the counter 22 is used in case of generating subcarriers. Initial values 1DH and 0 are previously loaded in high-order bits count[5..1] and the least significant bit count[0] of the counter 22 respectively, and the counter 22 performs a count-up operation every time the double CLK signal is inputted after the CountEnable signal becomes "1". Noting only the high-order bits count[5..1], the counter 22 seems to perform a count-up operation every time the double CLK signal is inputted twice.

The compare circuit 23 outputs "0" for an equal signal when the subdata existence informational (SubDataExist) signal is "0" (inactive). When the SubDataExist signal is "1" (active), on the other hand, the compare circuit 23 outputs "1" if the subdata (SubData[3..0]) coincide with the high-order bit outputs (count[5..1]) of the counter 22, otherwise outputting "0". The compare circuit 23 regularly compares the count[5] signal with "0", while comparing the count [4..1] signals with the SubData[3..0] signals respectively.

Figure 11:
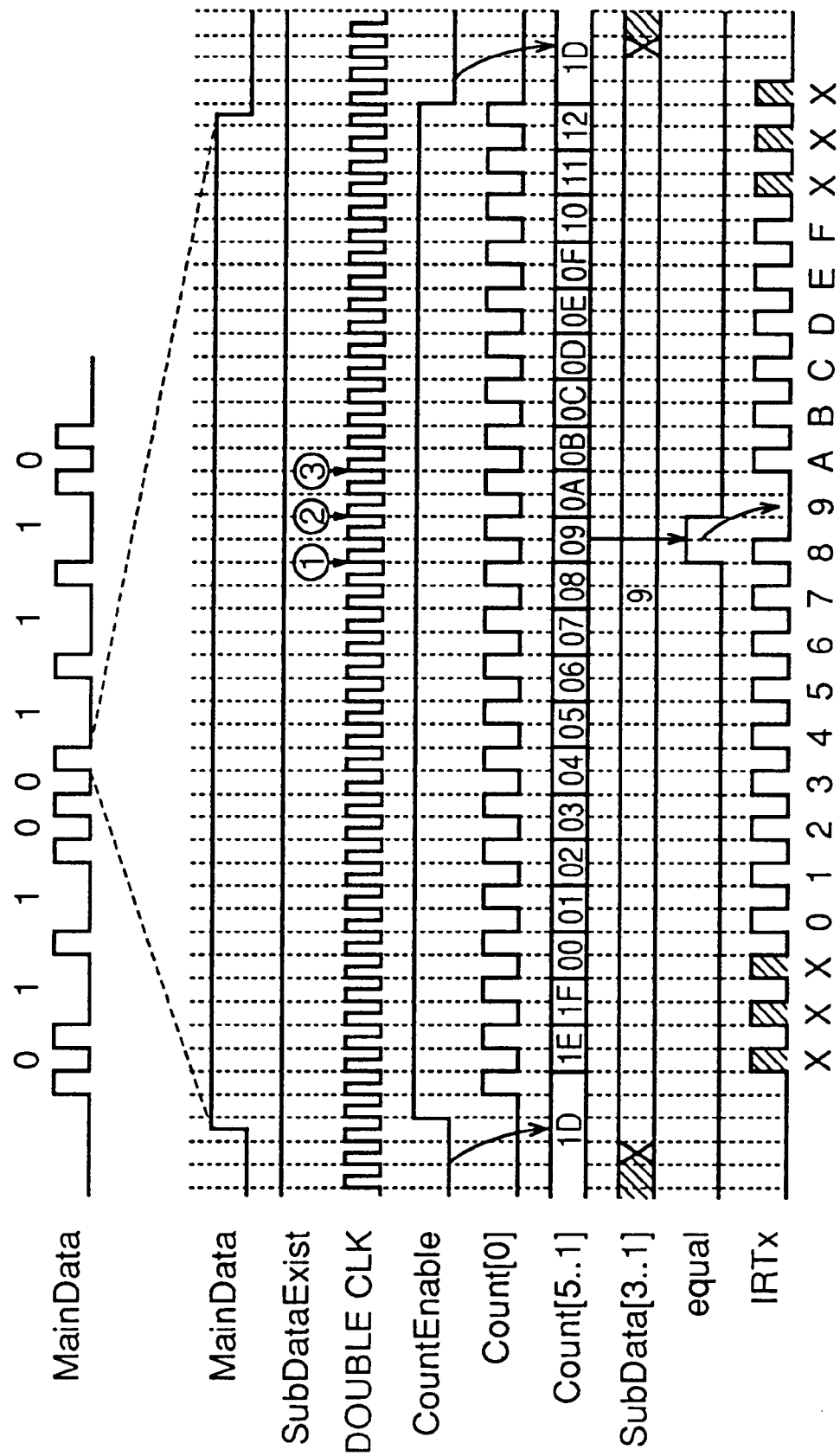
FIG. 11 is a timing chart of the main/subdata modulation part according to the first embodiment.

Referring to FIG. 11, the counter 22 starts counting the high-order bits count[5..1] from the initial value 1DH as hereinabove described, when the CountEnable signal becomes "1", i.e., the PPM modulation part 11 outputs a pulse signal. The counter 22 starts counting the high-order bits count[5..1] from the value 1DH, in order not to replace the first three light emitting sections (first three pulses denoted by "X" in the IRTx waveform) with non-emitting sections. When any of the first three light emitting sections of the subcarriers is replaced with a non-emitting section in case of regenerating the main data from an optical signal in the digital optical receiver 14, deviation results in rise timing of the main data. In order to prevent this, the first three light emitting sections are not replaced with non-emitting sections.

In this embodiment, 22 or 23 pulses of subcarriers are involved in one bit of the main data, the first three pulses are necessarily rendered light emitting sections, and any of following 16 pulses of light emitting sections can be replaced with a non-emitting section for superposition of subdata. Further, at least three or four subsequent pulses are necessarily rendered light emitting sections. If these light emitting sections are replaced with non-emitting sections, deviation results in fall timing of the main data. One bit of the main data involves 22 or 23 pulses of the subcarriers since the pulse width of the main data signal is not in an integral ratio to the cycle of the subcarriers. In general, this pulse number changes in the width of a single pulse.

Figure 10:
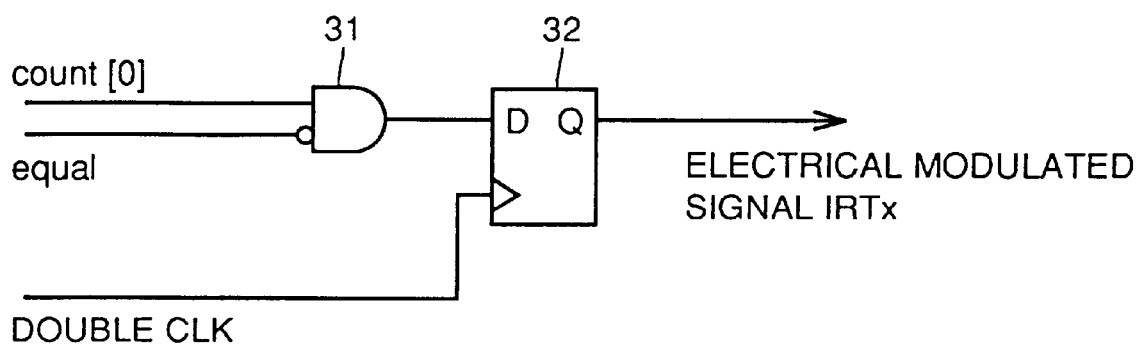
FIG. 10 is a block diagram showing the internal structure of an IRTx waveform generation circuit according to the first embodiment.

The counter 22 repeats a count-up operation, and the value of the high-order bits count[5..1] reaches 09H on the leading edge of the double CLK signal shown at ① in FIG. 11. A value 9H of subdata is previously set in the SubData [3..0] signals by a computer (not shown) or the like, and the equal signal outputted from the compare circuit 23 becomes "1" for a time of two clocks of the double CLK signal since the SubDataExist signal is "1" (active). An inverted signal of the equal signal is inputted in an AND gate 31 as shown in FIG. 10 showing an IRTx waveform generation circuit, and the count[0] signal is inputted in one input of the AND gate 31. Further, an output of the AND gate 31 and the double CLK signal are inputted in D and C terminals of a D flip-flop 32 respectively. Therefore, the AND gate 31 outputs the count[0] signal as such until the equal signal becomes "1", and hence the D flip-flop 32 outputs an IRTx signal having the same signal waveform as the count[0] signal in a delay by a time corresponding to one clock of the double CLK signal. When the equal signal becomes "1", however, the AND gate 31 masks the count[0] signal, and hence the IRTx signal does not become "1" at the timing ② in FIG. 11.

At the timing ③ in FIG. 11, the equal signal returns to "0" again and hence outputting of the subcarriers forming the IRTx signal is re-started. The counter 22 stops the count-up operation when the MainData signal and the CountEnable signal become "0", and hence no subcarriers are thereafter outputted for the IRTx signal. Assuming that N(0 to FH) represents values set as the subdata, the (N+4)-th light emitting section in the subcarriers is replaced with a non-emitting section. Therefore, 4-bit information can be superposed on one bit of the main data as the subdata.

Figure 12:
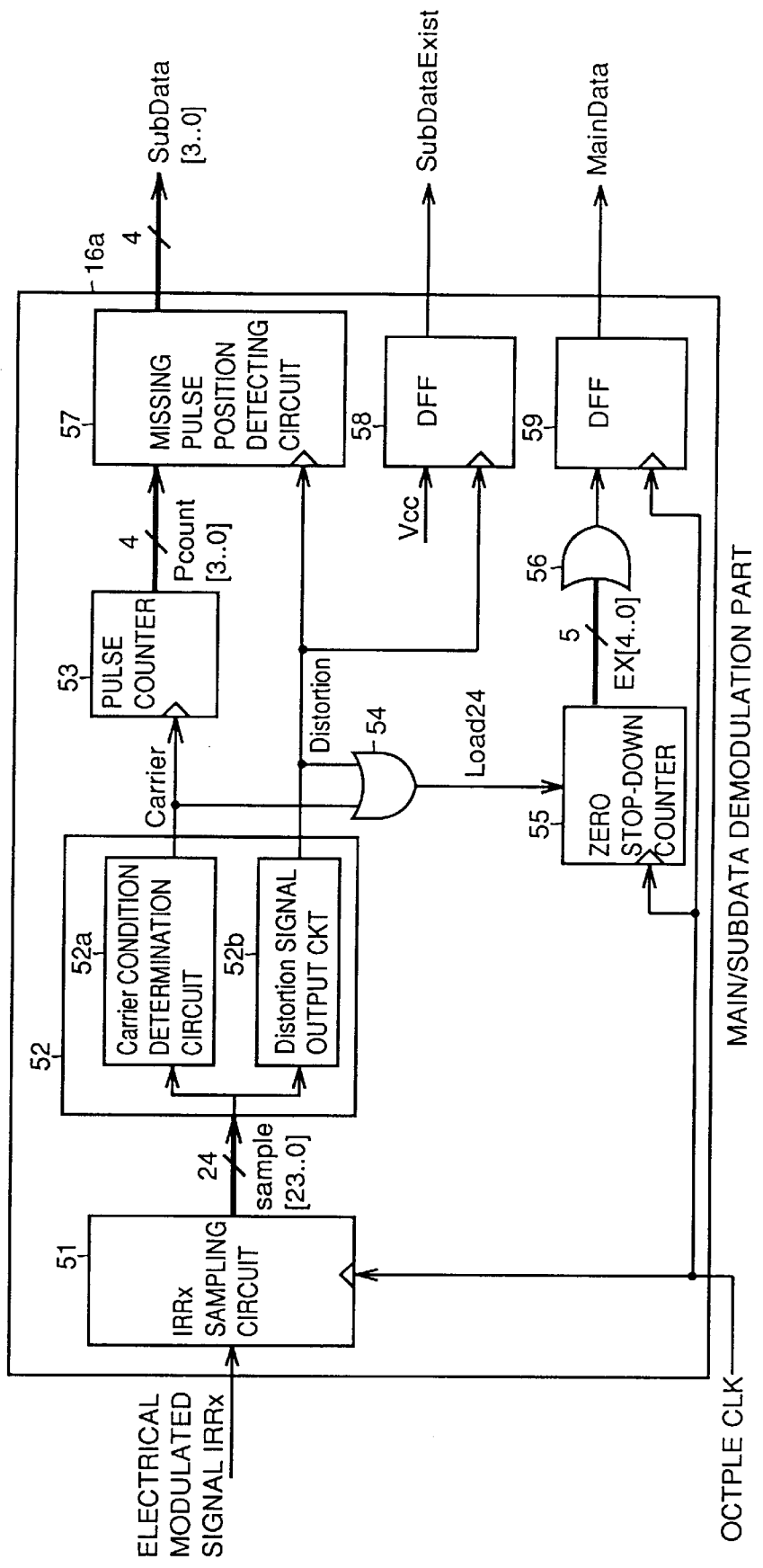
FIG. 12 is a block diagram showing the internal structure of a main/subdata demodulation part according to the first embodiment.

Referring to FIG. 12, a main/subdata demodulation part 16a includes an IRRx sampling circuit 51 for sampling and outputting an electrical modulated signal IRRx, a waveform pattern matching circuit 52 for extracting a specific waveform from those sampled by the IRRx sampling circuit 51, a pulse counter 53, a zero stop-down counter 55 loading a prescribed value, starting a count-down operation, and stopping the count-down operation when its count value becomes zero, a missing pulse position detecting circuit 57 for detecting positions where light emitting sections are replaced with non-emitting sections, OR gates 54 and 56, and D flip-flops 58 and 59. The waveform pattern matching circuit 52 includes a Carrier condition determination circuit 52a and a Distortion signal output circuit 52b described later.

Figure 13:
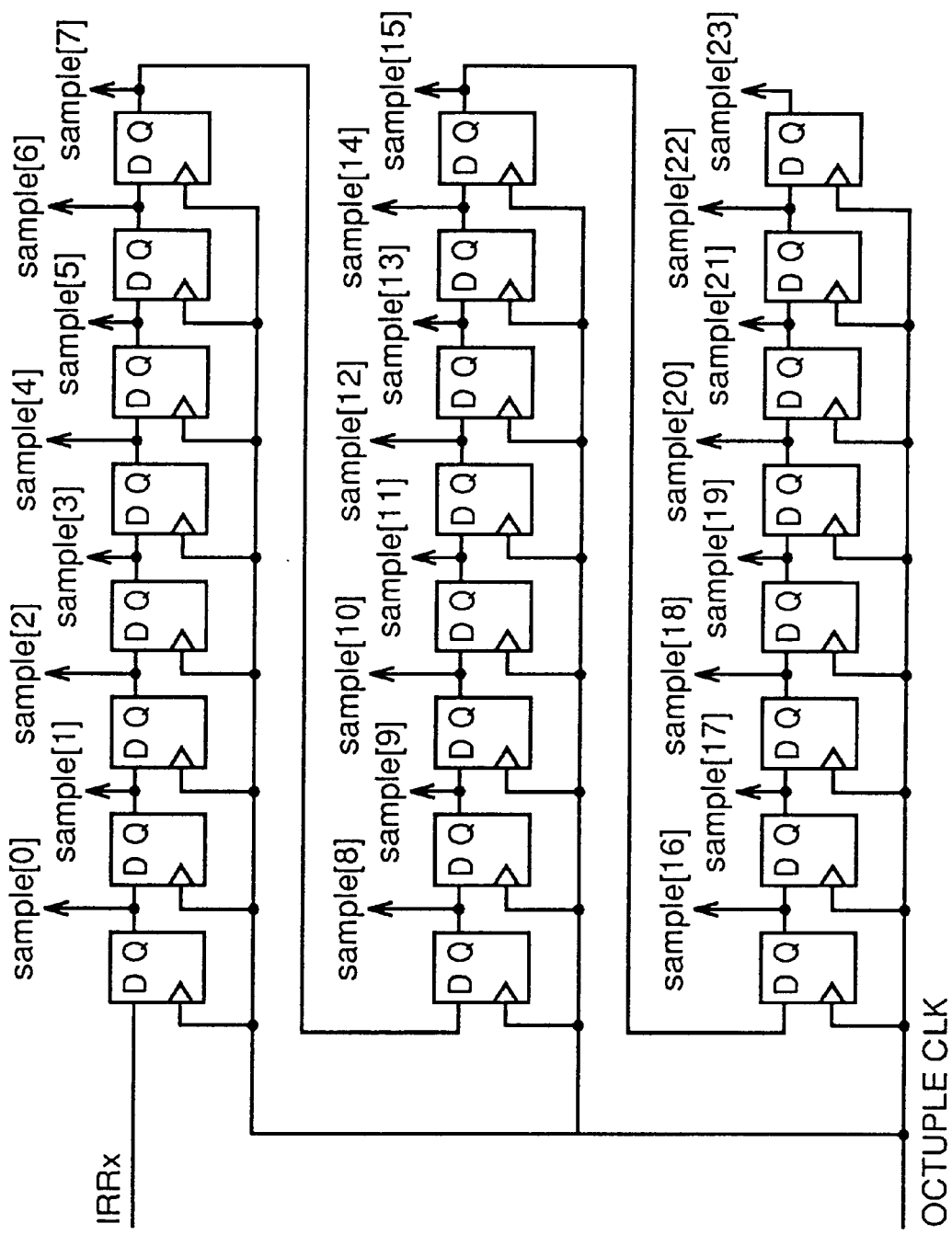
FIG. 13 illustrates the internal structure of an IRRx sampling circuit according to the first embodiment.

The IRRx sampling circuit 51 is formed by 24 stages of shift registers serially connecting 24 D flip-flops shown in FIG. 13. FIGS. 14A and 14B are timing charts in the IRRx sampling circuit 51. An octuple CLK signal is a clock signal having a cycle of eight times that of the subcarriers. It is unknown in what timing the electrical modulation signal IRRx, which is asynchronous with the octuple CLK signal, changes with respect to the leading edge of the octuple CLK signal.

FIGS. 14A and 14B show IRRx waveforms providing all sample patterns assumed in case of receiving three continuous pulses of subcarriers and rising between times t1 and t2 at (a) to (c) in the form of a timing chart.

The timing of the IRRx signal and that of the octuple CLK signal are now described.

Referring to (a) in FIG. 14A, a change point of the IRRX signal is not close to the leading edge of the octuple CLK signal (a setup time and a hold time of the D flip-flops can be sufficiently taken). In this timing, the output signal sample[0] reliably changes on the leading edges of the octuple CLK signal at times t2, t4, t6, t8, ta and tc in the first D flip-flop in the IRRx sampling circuit 51.

Referring to (b) in FIG. 14A, the IRRx signal first changes in the vicinity of the leading edge of the octuple CLK signal at the time t1 and the output signal sample[0] remains unchanged on this leading edge. In this timing, the next change point of the IRRx signal is in the vicinity of the leading edge of the octuple CLK signal at the time t3, and hence it is unknown whether the sample[0] signal changes on the leading edge of the octuple CLK signal at the time t3 or t4. This also applies to the following change points of the IRRx signal.

Referring to (c) in FIG. 14A, the IRRx signal first changes in the vicinity of the leading edge of the octuple CLK signal at the time t2 and the output signal sample[0] changes on this leading edge. In this timing, the next change point of the IRRx signal is in the vicinity of the leading edge of the octuple CLK signal at the time t4, and hence it is unknown whether the output signal sample[0] changes on the leading edge of the octuple CLK signal at the time t4 or on the next leading edge. This also applies to the following change points of the IRRx signal.

Consider the values of sample[23..0] signals at a time td when the IRRx signal shown at (a), (b) or (c) in FIG. 14A is inputted. The sample[23] signal goes low ("0") at what timing the IRRx signal is inputted. Similarly, the sample[22] to sample[20] signals go high ("0"). The sample[19] and sample[18] signals go high and low respectively in case of (a), go low and low or high and low respectively in case of (b), and go high and low or high and high respectively in case of (c). Therefore, the sample[19] and [18] signals can never go low and high respectively.

Similarly, the sample[15] and sample[14] signals and the sample[7] and sample[6] signals can never go high and low respectively, and the sample[11] and sample[10] signals and the sample[3] and sample[2] signals can never go low and high respectively.

FIG. 14B shows IRRx waveforms providing all sample patterns assumed in case of replacing the central light emitting section of three continuous subcarriers with a non-emitting section and rising between the times t1 and t2 at (d) to (f) in the form of a timing chart. For the same reason as that described with reference to (a) to (c) in FIG. 14A, the sample[19] and sample[18] signals and the sample[3] and sample[2] signals can never go low and high respectively, and the sample[7] and sample[6] signals can never go high and low respectively.

Figure 15B:
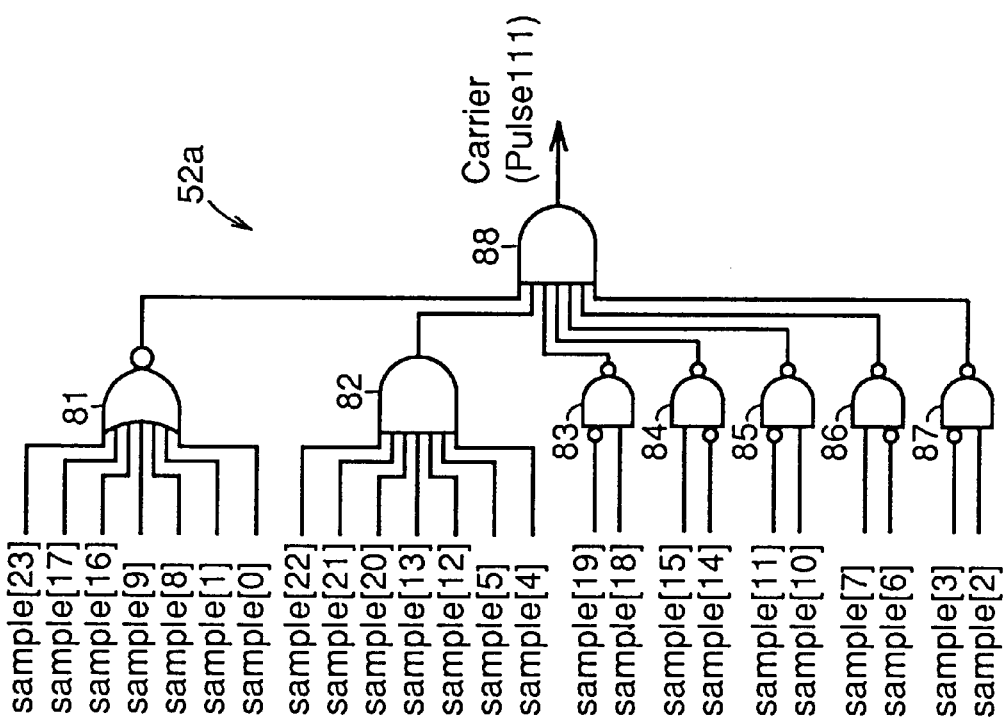
FIGS. 15A and 15B illustrate the internal structure of a waveform pattern matching circuit according to the first embodiment.
Figure 15A:
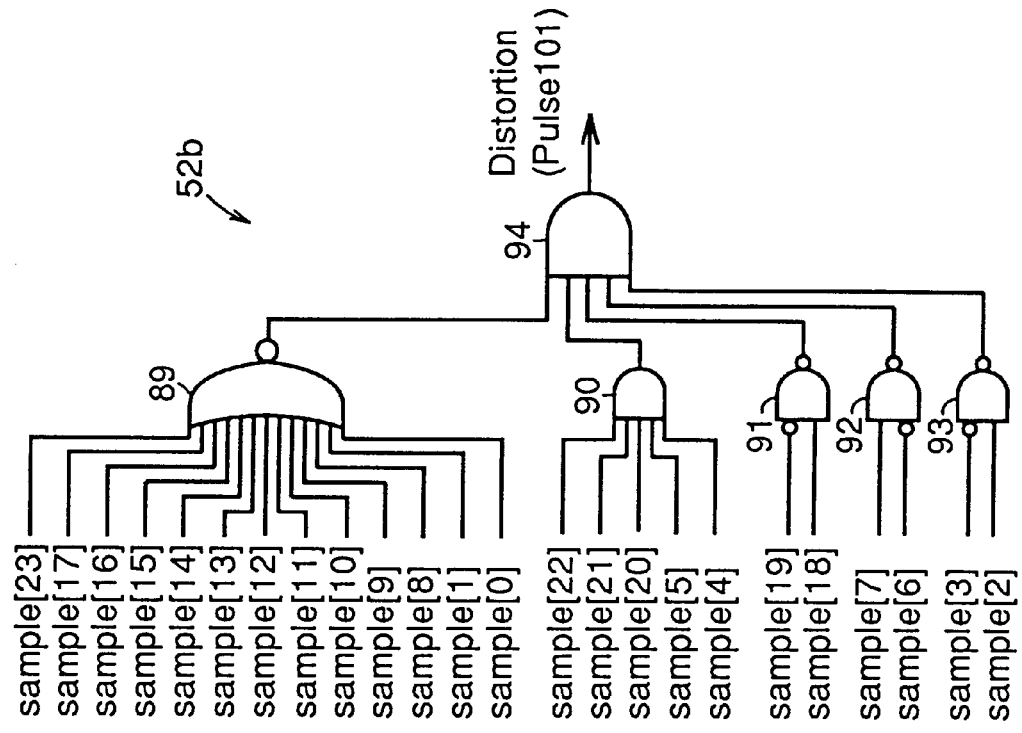

On the basis of the above description, FIG. 15A shows a circuit detecting that three pulses of subcarriers are continuously inputted. This circuit is the Carrier condition determination circuit 52a shown in FIG. 12. Namely, the Carrier condition determination circuit 52a generates pulses only when Carrier determination conditions shown in FIG. 14A are satisfied. A NOR gate 81 becomes "1" when all of the sample[23], sample[17], sample[16], sample[9], sample[8], sample[1] and sample[0] signals are "0". An AND gate 82 becomes "1" when all of the sample[22], sample[21], sample[20], sample[13], sample[12], sample[5] and sample [4] signals are "1". NAND gates 83, 85 and 87 become "1" when the sample[19] and sample[18] signals and the sample [11] and sample[10] signals and the sample[3] and sample [2] signals are not at low and high levels respectively. NAND gates 84 and 86 become "1" when the sample[15] and sample[14] signals and the sample[7] and sample[6] signals are not at high and low levels respectively. An output of an AND gate 88 becomes "1" only when all of the NOR gate 81, the AND gate 82 and the NAND gates 83 to 87 become "1", i.e., when the Carrier determination conditions shown in FIG. 14A are satisfied.

FIG. 15B shows the Distortion signal output circuit 52b shown in FIG. 12, which detects that subcarriers involving a central light emitting section replaced with a non-emitting section are inputted. Namely, this circuit generates pulses only when Distortion determination conditions shown in FIG. 14B are satisfied. A NOR gate 89 becomes "1" when all of the sample[23], sample[17] to sample[8], sample[1] and sample[0] signals are "1". An AND gate 90 becomes "1" when all of the sample[22] to sample[20], sample[5] and sample[4] signals are "1". NAND gates 91 and 93 become "1" when the sample[19] and sample[18] signals and the sample[3] and sample[2] signals are not at low and high levels respectively. A NAND gate 92 becomes "1" when the sample[7] and sample[6] signals are not at high and low levels respectively. An output of an AND gate 94 becomes "1" only when all of the NOR gate 89, the AND gate 90 and the NAND gates 91 to 93 become "1", i.e., when the Distortion determination conditions shown in FIG. 14B are satisfied.

Figure 16:
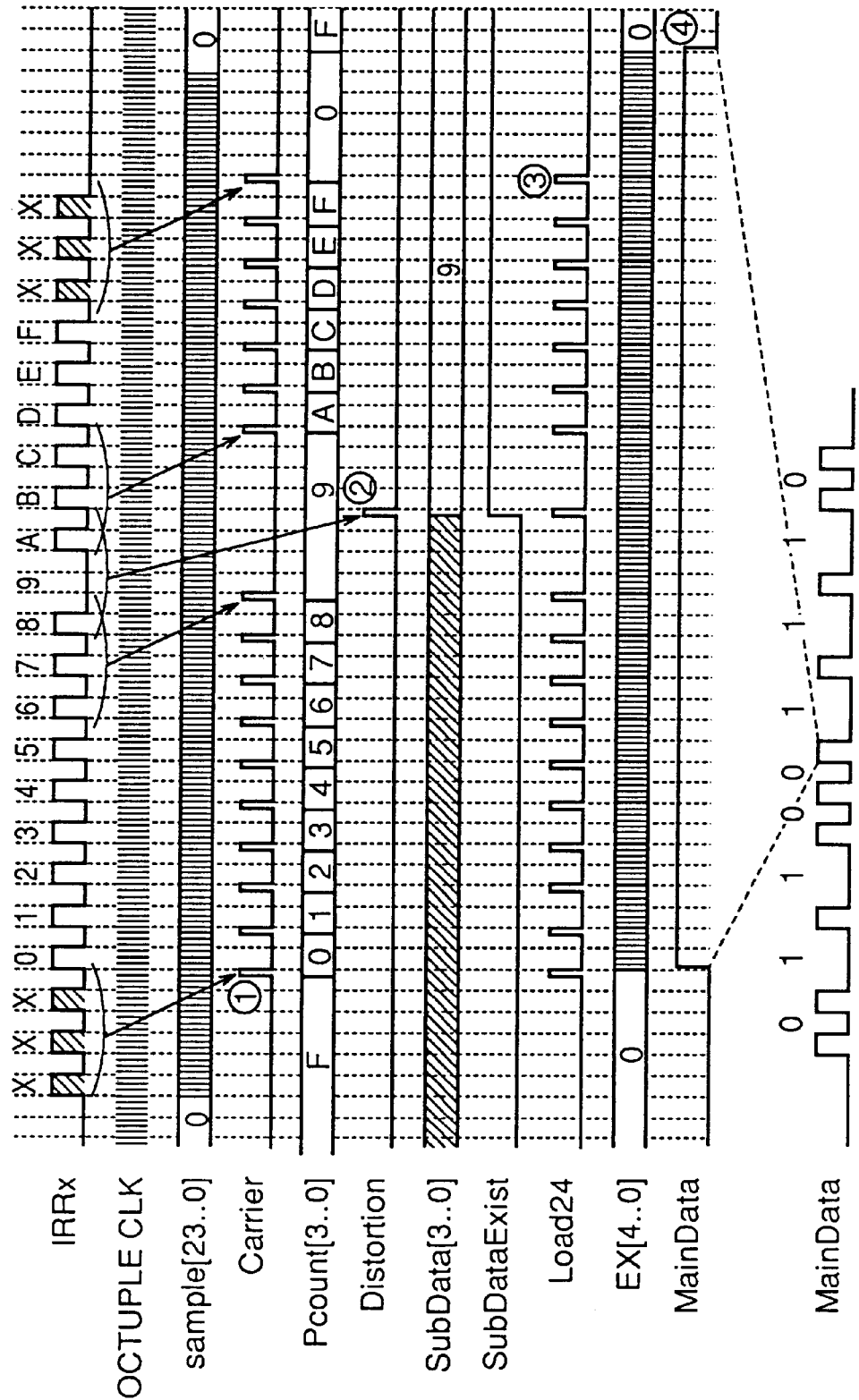
FIG. 16 is a timing chart of the main/subdata demodulation part according to the first embodiment.

Referring to FIG. 16, the waveform pattern matching circuit 52 detects the first continuous the three pulses (three pulses correlate to the first three light emitting sections of the subcarriers, and are designated not to be replaced by nonlight-emitting sections denoted by "X") of the IRRx signal, and outputs a Carrier signal at the timing ①. The pulse counter 53 is a 4-bit counter in which a value FH (all outputs Pcount[3..0] are "1") is set, and performs a count-up operation every time the Carrier signal becomes "1". Therefore, the pulse counter 53 outputs 0H at the timing ⓪.

The waveform pattern matching circuit 52 generates a pulse every time the inputted sample[23..0] signals coincide with the Carrier determination conditions shown in FIG. 14A, and hence a pulse is outputted for the Carrier signal every time one pulse of the IRRx signal is inputted until a pulse "8" of the IRRx signal is inputted. Therefore, 10 pulses of the Carrier signal are outputted before a pulse "9", at the time where a light emitting section of the IRRx signal is replaced with a non-emitting section and inputted in the IRRx sampling circuit 51. Consequently, the count value of the pulse counter 53 becomes 9H.

On the other hand, a Load24 signal outputted from the OR gate 54 receiving the Carrier signal and the Distortion signal is inputted in a load terminal of the zero stop-down counter 55. Further, the octuple CLK signal is inputted in a C terminal of the zero stop-down counter 55. Therefore, the zero stop-down counter 55 loads a value 24 (decimal) and starts a count-down operation every time a pulse is outputted for the Carrier or Distortion signal.

Outputs EX[4] to EX[0] of the zero stop-down counter 55 are inputted in the five-input OR gate 56. Further, an output of the OR gate 56 is inputted in a D terminal of the D flip-flop 59. The octuple CLK signal is inputted in a C terminal of the D flip-flop 59. The OR gate 56 outputs "1" unless the count value of the zero stop-down counter 55 is 0H, and hence the MainData signal becomes "1" on the leading edge of the octuple CLK signal following fall of the Carrier signal which becomes "1" (the timing ① in FIG. 16).

When the subcarrier "9" replaced with the non-emitting section is inputted in the IRRx sampling circuit 51, no pulse is outputted for the Carrier signal for a period of three cycles of the subcarriers. The waveform pattern matching circuit 52 detects the Distortion determination conditions shown in FIG. 14B, and outputs a pulse for the Distortion signal at the timing ② in FIG. 16.

The missing pulse position detecting circuit 57 holds the outputs Pcount[3..0] of the pulse counter 53 on the leading edge of the Distortion signal. This circuit is formed by a 4-bit D flip-flop. As shown in FIG. 16, the missing pulse position detecting circuit 57 holds the value of the pulse counter 53 at the timing ②, and outputs the held value 9H for the SubData[3..0] signals. The Distortion signal and a voltage Vcc (+5 V) are inputted in C and D terminals of the D flip-flop 58 respectively, whereby the SubDataExist signal becomes "1" at the timing ②. The calculator or the like connected with the digital optical receiver 14 detects that the SubDataExist signal becomes "1", recognizes that the subdata are superposed on the subcarriers, and recognizes the contents of the subdata by reading the SubData[3..0] signals.

When a subcarrier "C" of the IRRx signal is inputted in the IRRx sampling circuit 51, the Carrier determination conditions are satisfied again and hence outputting of the Carrier signal is re-started. When the final subcarrier "X" of the IRRx signal is thereafter inputted in the IRRx sampling circuit 51, the waveform pattern matching circuit 52 outputs the final Carrier signal, as shown at the timing ③ in FIG. 16. At the same time, the final pulse is inputted in a Load24 signal input of the zero stop-down counter 55. After the zero stop-down counter 55 loads the value 24 first (① in FIG. 16) and starts the count-down operation, the value is loaded again before the count value becomes 0H and hence the output of the OR gate 56 remains "1". After the timing ③ in FIG. 16, however, the Load24 signal does not become "1" and hence the zero stop-down counter 55 outputs 0H when the octuple CLK signal is inputted by 24 clocks. Consequently, the OR gate 56 outputs "0" and the MainData signal becomes "0" after one clock of the octuple CLK signal (④ in FIG. 16). Therefore, it can be said that the zero stop-down counter 55 serves the function of regulating the length of the main data to the normal one (22 cycles of the subcarriers).

As hereinabove described, the digital optical transmitter 10 replaces light emitting sections of the subcarriers with non-emitting sections thereby superposing subdata on main data, and the digital optical receiver 14 detects the light emitting sections of the subcarriers replaced with the non-emitting sections thereby extract the subdata superposed on the main data.

While the first embodiment is adapted to decide positions for replacing light emitting sections of subcarriers with non-emitting sections in response to subdata, thereby transmitting the subdata, it is also possible to regularly replace a specific light emitting section of the subcarriers with a non-emitting section. In this case, the receiving end can at least recognize that the transmitter has a function of transmitting the subdata, due to the existence of this non-emitting section. Further, it is possible to provide the subdata with various meanings through an arrangement between the transmitter and the receiver. This is not restricted to the first embodiment, but also applies to the following embodiments.

Figure 17:
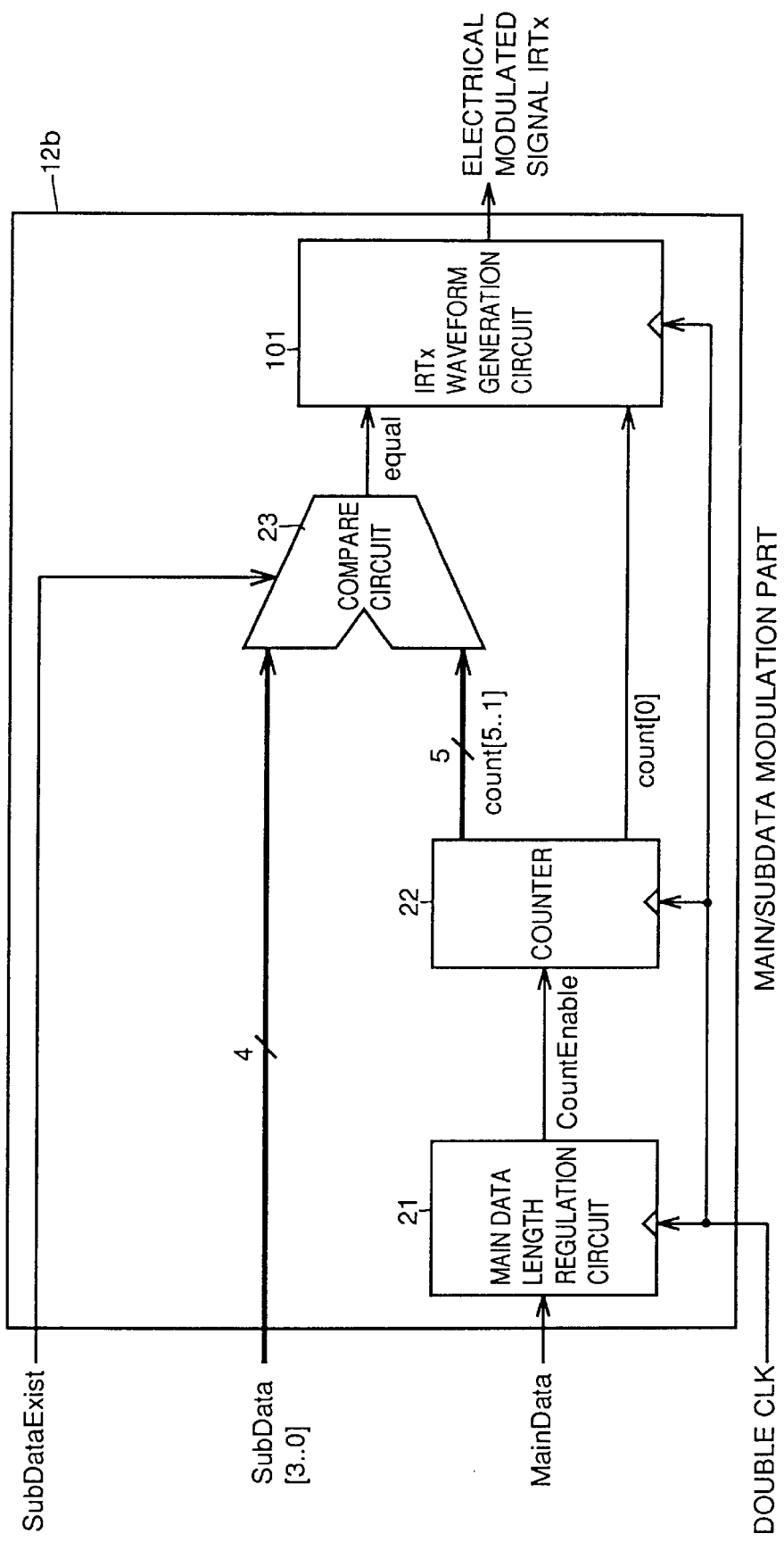
FIG. 17 is a block diagram showing the internal structure of a main/subdata modulation part according to the second embodiment.

FIG. 17 illustrates a second embodiment of the present application

Referring to FIG. 17, a main data length regulation circuit 21, a counter 22 and a compare circuit 23 of a main/subdata modulation part 12b are identical in structure and function to those included in the main/subdata modulation part 12a according to the first embodiment of FIG. 9, and hence description will not be repeated here. However, it is assumed that initial values 1CH and 0 are previously loaded in high-order bits count[5..1] and the least significant bit count [0] of the counter 22 respectively.

Figure 19:
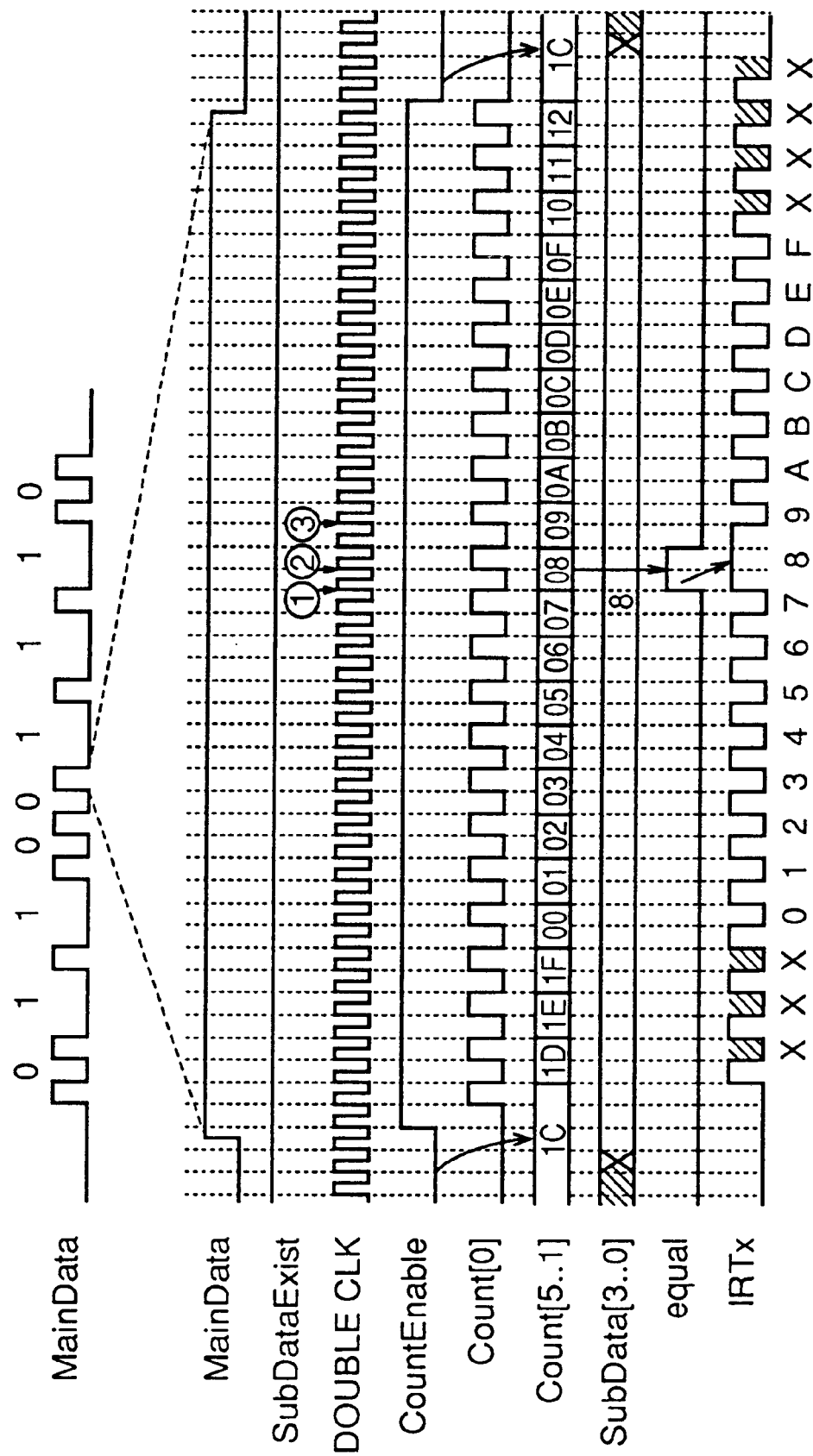
FIG. 19 is a timing chart of the main/subdata modulation part according to the second embodiment.

Referring to FIG. 19, the counter 22 starts counting the high-order bits count[5..1] from the initial value 1CH when a CountEnable signal becomes "1", i.e., when a PPM modulation part 11 outputs a pulse signal. According to this embodiment, one bit of main data involves 23 or 24 pulses of subcarriers, sections following first three pulses respectively are necessarily rendered non-emitting sections, and following non-emitting sections of 16 pulses are replaced with light emitting sections for superposing subdata. Further, sections following subsequent four or five pulses are necessarily rendered non-emitting sections. If these non-emitting sections are replaced with light emitting sections, deviation results in fall timing of the main data.

Figure 18:
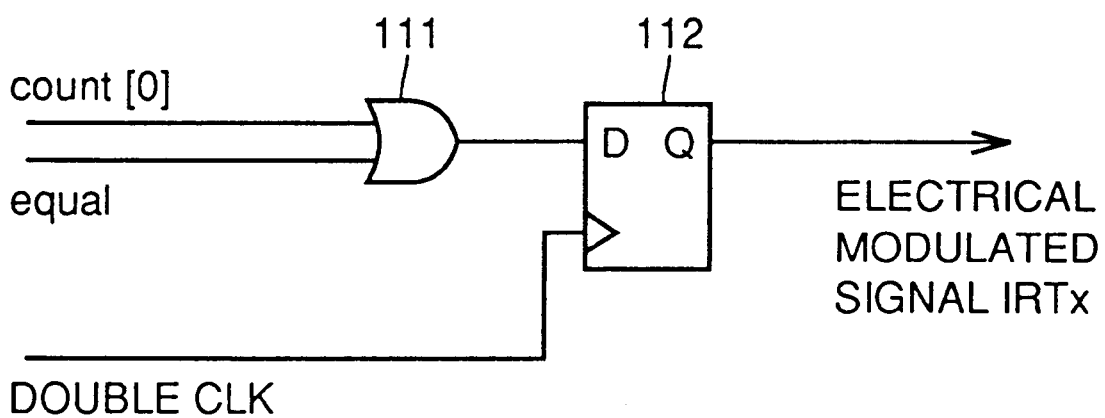
FIG. 18 is a block diagram showing the internal structure of an IRTx waveform generation circuit according to the second embodiment.

The counter 22 repeats a count-up operation, and the value of the high-order bits count[5..1] becomes 08H on the leading edge of a double CLK signal shown at ① in FIG. 19. A value 8H of the subdata is previously set in SubData [3..0] signals by a computer (not shown) or the like, and an equal signal outputted from the compare circuit 23 becomes "1" for a time of two clocks of the double CLK signal since a SubDataExist signal is "1" (active). The equal signal is inputted in an OR gate 111 of an IRTx waveform generation circuit as shown in FIG. 18, and a count[0] signal is inputted in one input of the OR gate 111. Further, an output of the OR gate 111 and the double CLK signal are inputted in D and C terminals of a D flip-flop 112 respectively. Therefore, the OR gate 111 outputs the count[0] signal as such until the equal signal becomes "1", and hence the D flip-flop 112 outputs an IRTx signal having the same signal waveform as the count [0] signal in a delay by a time corresponding to one clock of the double CLK signal. However, the OR gate 111 outputs "1" when the equal signal becomes "1", and hence the IRTx signal does not become "0" at the timing ② in FIG. 19.

At the timing ③ in FIG. 19, the equal signal returns to "0" again and hence outputting of a non-emitting section of the IRTx signal is re-started. The counter 22 stops its count-up operation when a MainData signal and the CountEnable signal become "0", and hence no subcarriers are thereafter outputted for the IRTx signal. Assuming that N(0 to FH) represents values set as the subdata, a non-emitting section following the (N+4)-th light emitting section in the subcarriers is replaced with a light emitting section. Therefore, 4-bit information can be superposed on one bit of the main data as the subdata.

Figure 20:
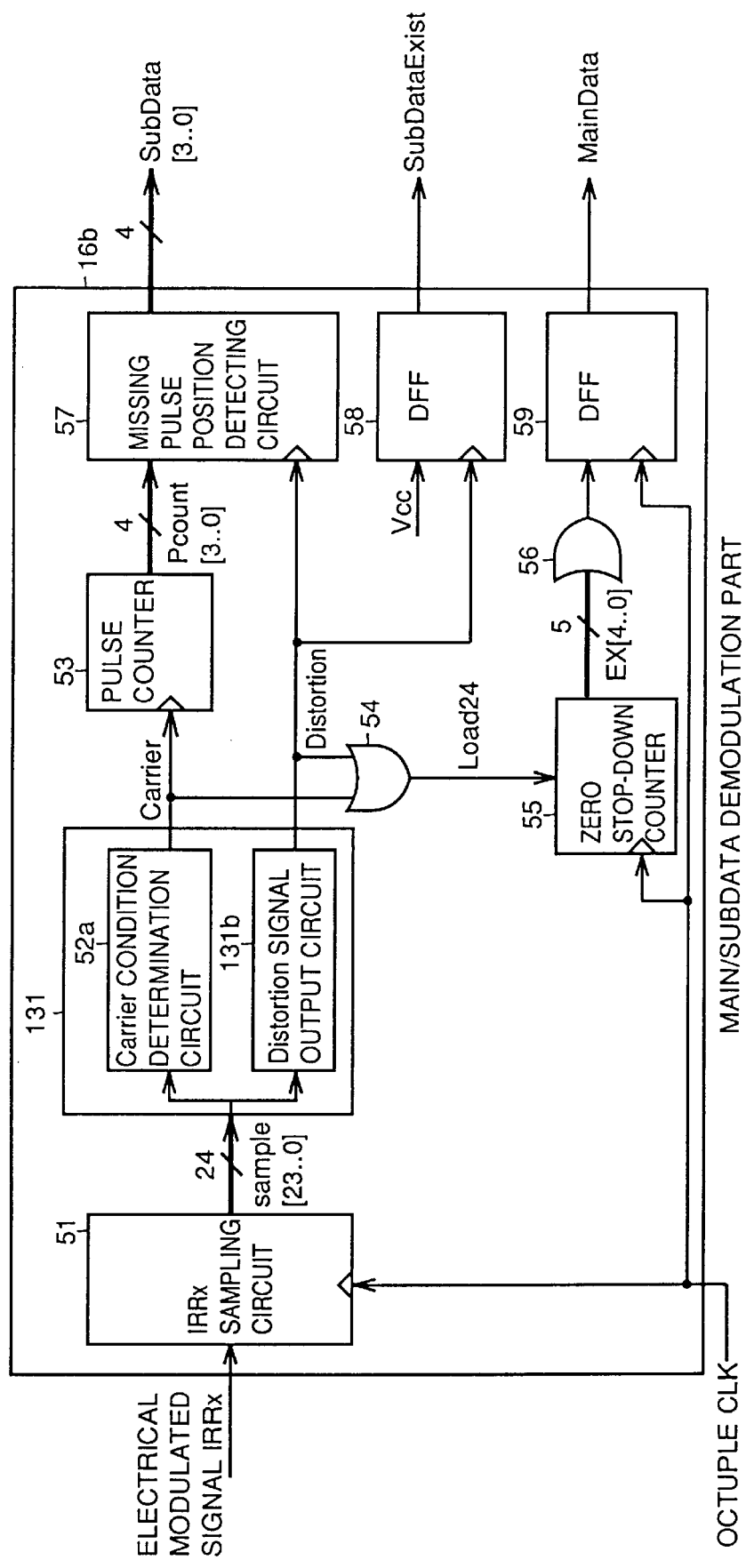
FIG. 20 is a block diagram showing the internal structure of a main/subdata demodulation part according to the second embodiment.

Referring to FIG. 20, an IRRx sampling circuit 51, a pulse counter 53, a zero stop-down counter 55, a missing pulse position detecting circuit 57, OR gates 54 and 56 and D flip-flops 58 and 59 of a main/subdata demodulation part 16b are identical in structure and function to those included in the main/subdata demodulation part 16a according to the embodiment 1 shown in FIG. 12, and hence description will not be repeated here. While a waveform pattern matching circuit 131 is similar to the waveform pattern matching circuit 52 shown in FIG. 12, the former is different from the latter in a point including a Distortion signal output circuit 131b described later in place of the Distortion signal output circuit 52b.

FIGS. 21A and 21B are timing charts showing sampling in the IRRx sampling circuit 51. Referring to FIG. 21A, (a) to (c) are identical to those described with reference to FIG. 14A, and hence description will not be repeated here.

FIGS. 21A and 21B show IRRx waveforms providing all sample patterns assumed in case of replacing a non-emitting section following the central light emitting section of three continuous subcarriers with a light emitting section and rising between times t1 and t2 at (d) to (f) in the form of a timing chart. For the same reason as that described with reference to (a) to (c) in FIG. 14A, sample[19] and sample [18] signals and sample[3] and sample[2] signals can never go low and high respectively, and sample[15] and sample [14] signals can never go high and low respectively.

A circuit detecting that three subcarriers are continuously inputted is similar to the Carrier condition determination circuit 52a shown in FIG. 15A, and hence description will not be repeated here.

Figure 22:
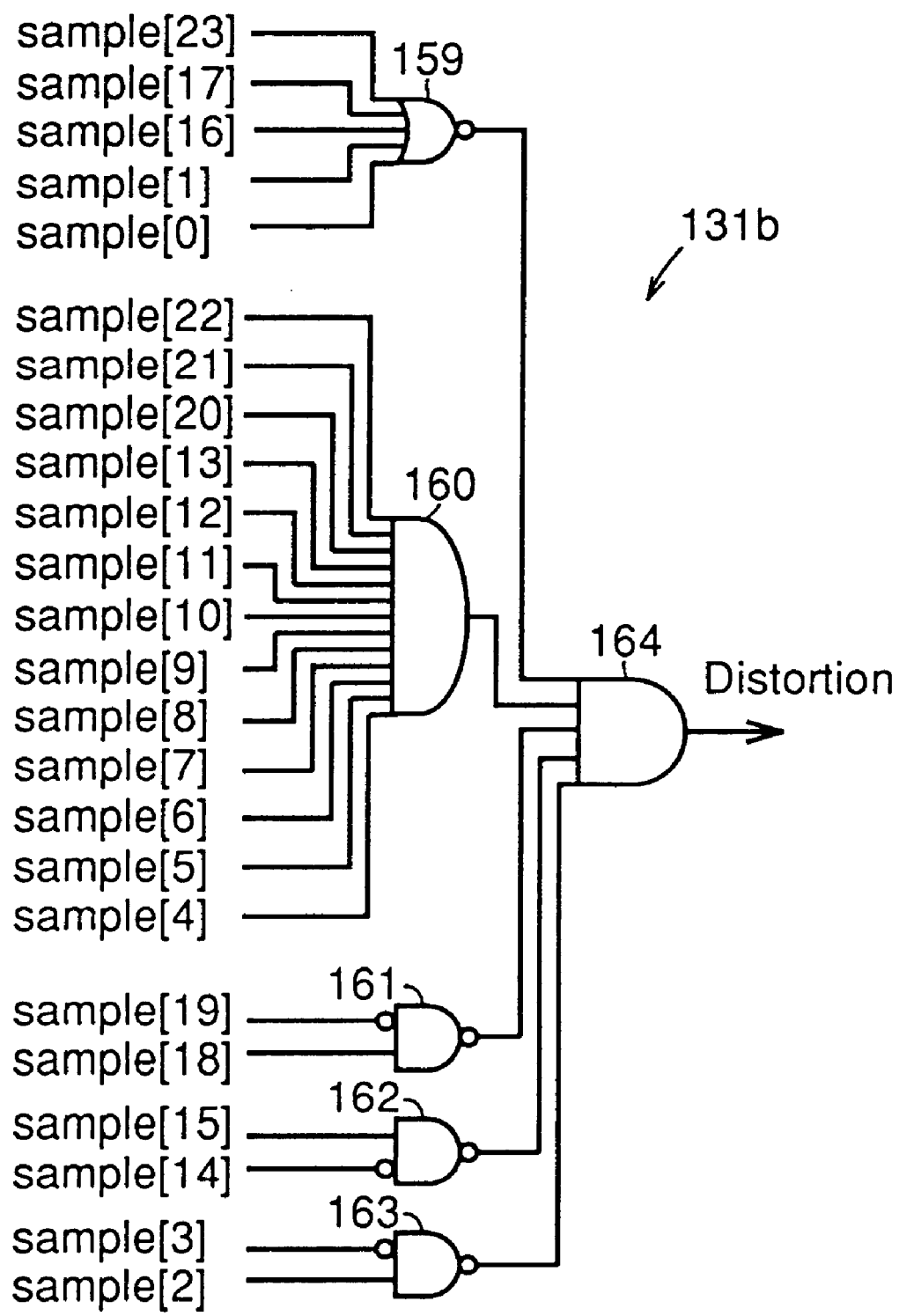
FIG. 22 illustrates the internal structure of a waveform pattern matching circuit according to the second embodiment.

FIG. 22 shows the Distortion signal output circuit 131b shown in FIG. 20, which detects that subcarriers having a non-emitting section, following a central light emitting section, replaced with an emitting section are inputted. Namely, this circuit generates pulses only when Distortion determination conditions shown in FIG. 21B are satisfied. A NOR gate 159 becomes "1" when all of sample[23], sample [17], sample[16], sample[1] and sample[0] signals are "0". An AND gate 160 becomes "1" when all of sample[22] to sample[20] and sample[13] to sample[4] signals are "1". NAND gates 161 and 163 become "1" when sample[19] and sample[18] signals and sample[3] and sample[2] signals are not at low and high signals respectively. A NAND gate 162 becomes "1" when sample[15] and sample[14] signals are not at high and low levels respectively. An output of an AND gate 164 becomes "1" only when all of the NOR gate 159, the AND gate 160 and the NAND gates 161 to 163 become "1", i.e., when the Distortion determination conditions shown in FIG. 21B are satisfied.

Figure 23:
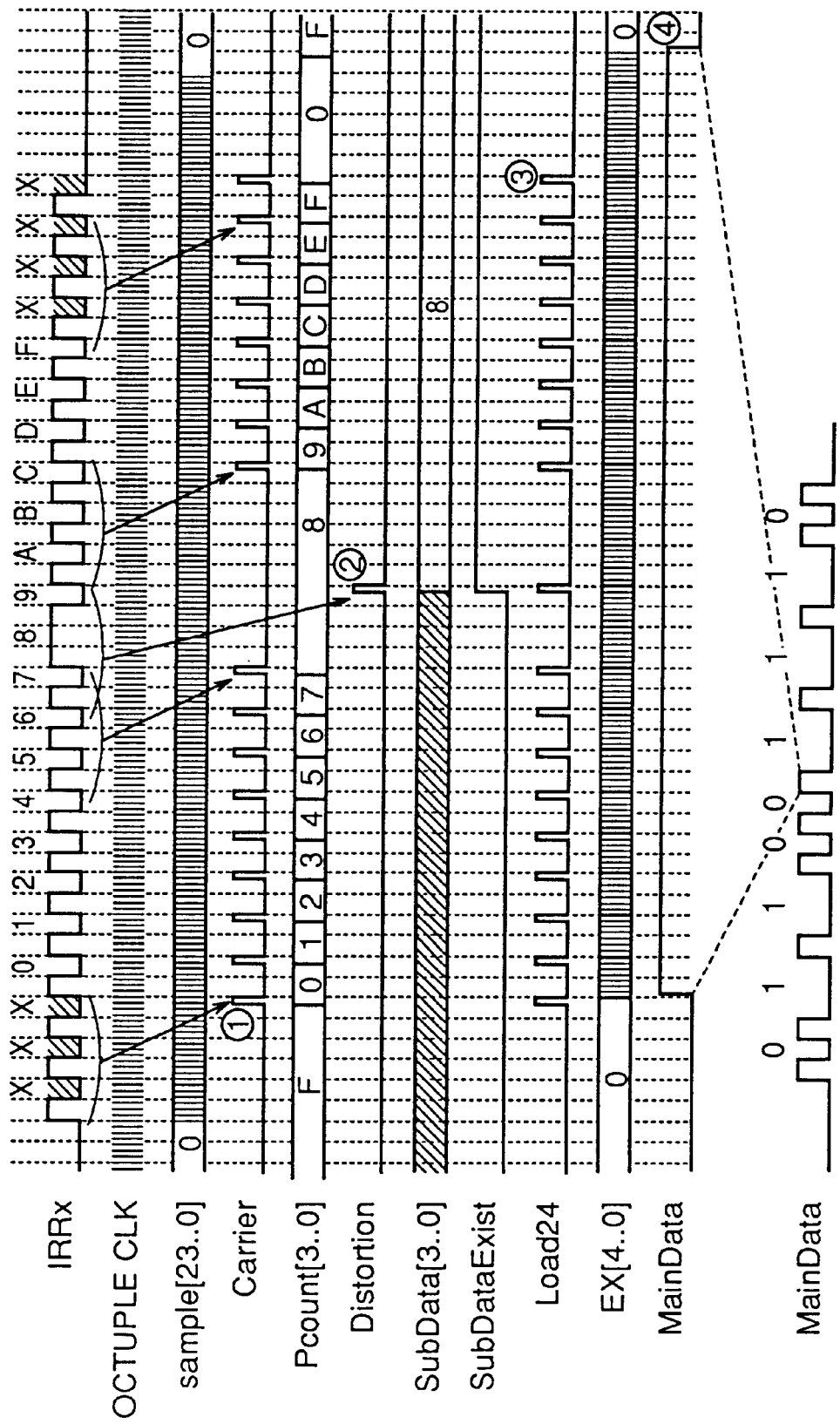
FIG. 23 is a timing chart of the main/subdata demodulation part according to the second embodiment.

Referring to FIG. 23, the waveform pattern matching circuit 131 detects first continuous three pulses of the IRRx signal, and outputs a Carrier signal at the timing ①. The pulse counter 53 is a 4-bit counter in which a value FH (all outputs Pcount[3..0] are "1") is set, and performs a count-up operation every time the Carrier signal becomes "1". Therefore, the pulse counter 53 outputs 0H at the timing ①.

The waveform pattern matching circuit 131 generates a pulse every time inputted sample[23..0] signals coincide with Carrier determination conditions shown in FIG. 21A, and hence a pulse is outputted for the Carrier signal every time one pulse of the IRRx signal is inputted until a non-emitting section "7" of the IRRx signal is inputted. Therefore, nine pulses of the Carrier signal are outputted before a subcarrier "8" in which a non-emitting section of the IRRx signal is replaced with a light emitting section is inputted in the IRRx sampling circuit 51. Consequently, the count value of the pulse counter 53 becomes 8H.

On the other hand, a Load24 signal outputted from the OR gate 54 receiving the Carrier signal and the Distortion signal is inputted in a load terminal of the zero stop-down counter 55. Further, an octuple CLK signal is inputted in a C terminal of the zero stop-down counter 55. Therefore, the zero stop-down counter 55 loads a value 24 (decimal) and starts a count-down operation every time a pulse is outputted for the Carrier or Distortion signal.

Outputs EX[4] to EX[0] of the zero stop-down counter 55 are inputted in the five-input OR gate 56. Further, an output of the OR gate 56 is inputted in a D terminal of the D flip-flop 59. The octuple CLK signal is inputted in a C terminal of the D flip-flop 59. The OR gate 56 outputs "1" unless the count value of the zero stop-down counter 55 is 0H, and hence the MainData signal becomes "1" on the leading edge of the octuple CLK signal following fall of the Carrier signal which becomes "1" (the timing ① in FIG. 16).

When the non-emitting section "8" replaced with the emitting section is inputted in the IRRx sampling circuit 51, no pulses are outputted for the Carrier signal for a period of four cycles of the subcarriers. The waveform pattern matching circuit 131 detects the Distortion determination conditions shown in FIG. 21B, and outputs a pulse for the Distortion signal at the timing ② in FIG. 23.

The missing pulse position detecting circuit 57 holds the outputs Pcount[3..0] of the pulse counter 53 on the leading edge of the Distortion signal. This circuit is formed by a 4-bit D flip-flop. As shown in FIG. 23, the missing pulse position detecting circuit 57 holds the value of the pulse counter 53 at the timing ②, and outputs the held value 8H for the SubData[3..0] signals. The Distortion signal and a voltage Vcc (+5 V) are inputted in C and D terminals of the D flip-flop 58 respectively, whereby the SubDataExist signal becomes "1" at the timing ②. A computer or the like connected with the digital optical receiver 14 detects that the SubDataExist signal becomes "1", recognizes that subdata are superposed on the subcarriers, and recognizes the contents of the subdata by reading the SubData[3..0] signals.

When a non-emitting section "C" of the IRRx signal is inputted in the IRRx sampling circuit 51, the Carrier determination conditions are satisfied again and hence outputting of the Carrier signal is re-started. when the final non-emitting section "X" of the IRRx signal is thereafter inputted in the IRRx sampling circuit 51, the waveform pattern matching circuit 131 outputs the final Carrier signal, as shown at the timing ③ in FIG. 23. At the same time, the final pulse is inputted in a Load24 signal input of the zero stop-down counter 55. After the zero stop-down counter 55 loads the value 24 first (① in FIG. 23) and starts the count-down operation, the value is loaded again before the count value becomes 0H and hence the output of the OR gate 56 remains "1". After the timing ③ in FIG. 23, however, the Load24 signal does not become "1" and hence the zero stop-down counter 55 outputs 0H when the octuple CLK signal is inputted by 24 clocks. Consequently, the OR gate 56 outputs "0" and the MainData signal becomes "0" after one clock of the octuple CLK signal (④ in FIG. 23). Therefore, it can be said that the zero stop-down counter 55 serves the function of regulating the length of the main data to the normal one (23 cycles of the subcarriers).

As hereinabove described, the digital optical transmitter 10 replaces non-emitting sections of the subcarriers with light emitting sections thereby superposing subdata on main data, and the digital optical receiver 14 detects the non-emitting sections of the subcarriers replaced with the light emitting sections thereby extracting the subdata superposed on the main data.

While the second embodiment is adapted to decide positions for replacing non-emitting sections of the subcarriers with light emitting sections by the subdata, it is also possible to superpose 1-bit information by replacing one specific non-emitting section of the subcarriers with a light emitting section.

Figure 24:
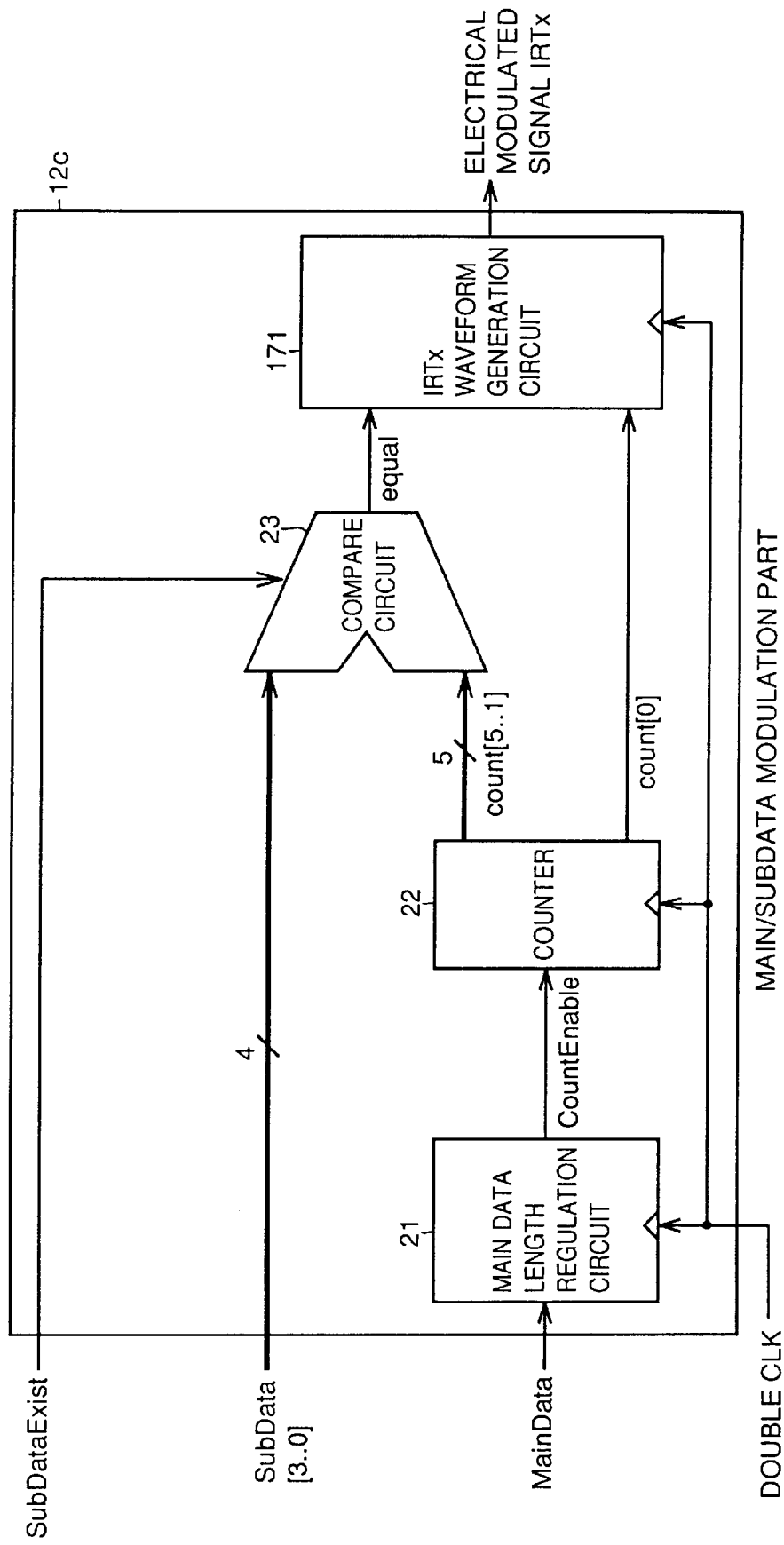
FIG. 24 is a block diagram showing the internal structure of a main/subdata modulation part according to the third embodiment.

FIG. 24 illustrates a third embodiment in accordance with the present application. Referring to FIG. 24, a main data length regulation circuit 21, a Counter 22 and a compare circuit 23 of a main/subdata modulation part 12b are identical in structure and function to those included in the main/subdata modulation part 12a according to the first embodiment of FIG. 9, and hence description will not be repeated here. However, it is assumed that initial values 1CH and 0 are previously loaded in high-order bits count[5..1] and the least significant bit count[0] of the counter 22 respectively.

Figure 26:
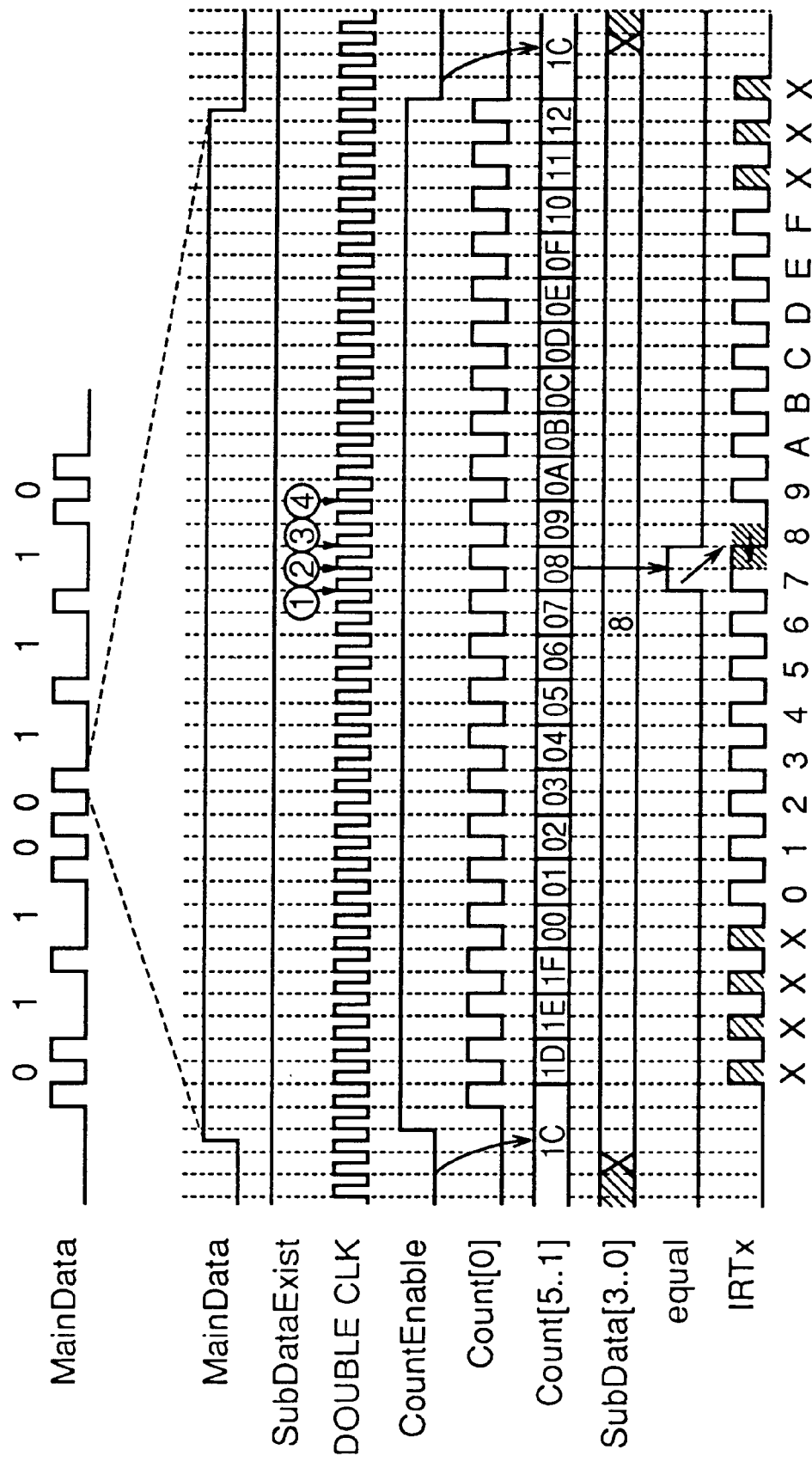
FIG. 26 is a timing chart of the main/subdata modulation part according to the third embodiment.

Referring to FIG. 26, the counter 22 starts counting the high-order bits count[5..1] from the initial value 1CH when a CountEnable signal becomes "1", i.e., when a PPM modulation part 11 outputs a pulse signal. According to this embodiment, one bit of main data involves 23 or 24 pulses of subcarriers, and subdata are superposed without displacing positions of the first four pulses while displacing those of following light emitting sections of 16 pulses. Further, the pulse positions are necessarily not displaced as to subsequent three or four pulses. If the positions of the light emitting sections are displaced, deviation results in fall timing of the main data.

Figure 25:
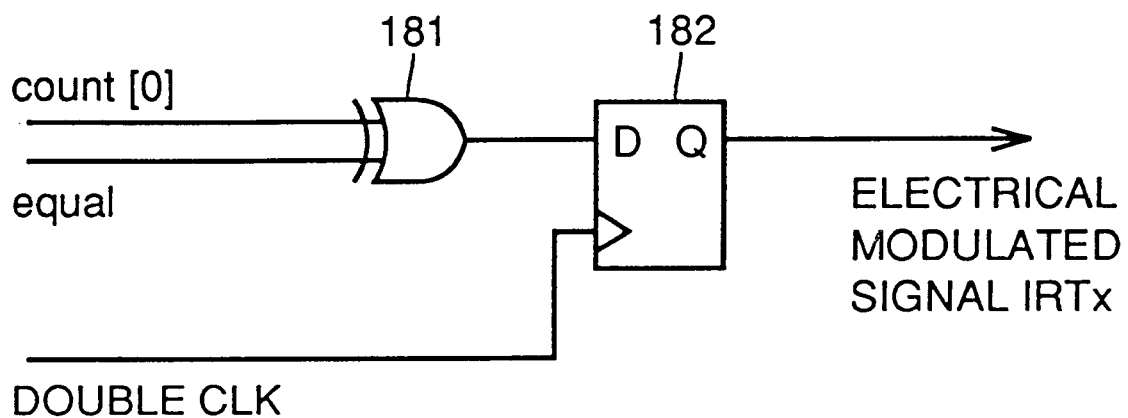
FIG. 25 is a block diagram showing the internal structure of an IRTx waveform generation circuit according to the third embodiment.

The counter 22 repeats a count-up operation, and the value of the high-order bits count[5..0] becomes 08H on the leading edge of a double CLK signal shown at ① in FIG. 26. A value 8H of the subdata is previously set in SubData[3..0] signals by a computer (not shown) or the like, and an equal signal outputted from the compare circuit 23 becomes "1" for a time of two clocks of the double CLK signal since a SubDataExist signal is "1" (active). The equal signal is inputted in an EXOR gate 181 of an IRTx waveform generation circuit as shown in FIG. 25, and a count[0] signal is inputted in one input of the EXOR gate 181. Further, an output of the EXOR gate 181 and the double CLK signal are inputted in D and C terminals of a D flip-flop 182 respectively. Therefore, the EXOR gate 181 outputs the count[0] signal as such until the equal signal becomes "1", and hence the D flip-flop 182 outputs an IRTx signal having the same signal waveform as the count[0] signal in a delay by a time corresponding to one clock of the double CLK signal. However, the EXOR gate 181 outputs an inverted signal of the count[0] signal when the equal signal becomes "1", and hence the IRTx signal becomes "1" at the timing ② in FIG. 26 and becomes "0" at the timing ③.

At the timing ④ in FIG. 26, the equal signal returns to "0" again and hence outputting of non-displaced subcarriers is re-started. The counter 22 stops the count-up operation when a MainData signal and the CountEnable signal become "0", and no subcarriers are thereafter outputted for the IRTx signal. Assuming that N(0 to FH) represents values set as the subdata, the (N+5)-th light emitting section in the subcarriers is displaced frontward by one clock of the double CLK signal. Thus, 4-bit information can be superposed with respect to one bit of the main data as the subdata.

Figure 27:
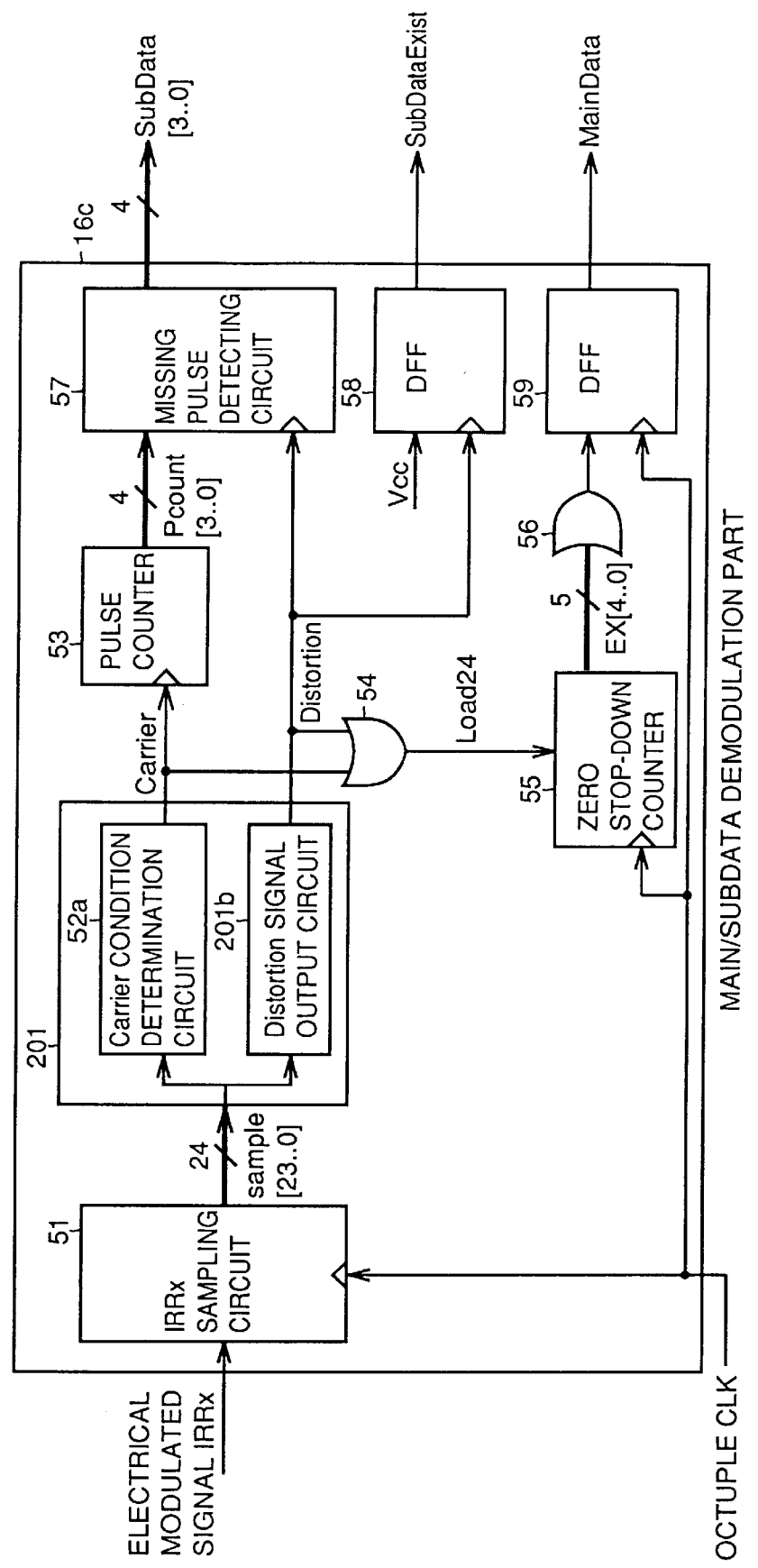
FIG. 27 is a block diagram showing the internal structure of a main/subdata demodulation part according to the third embodiment.

Referring to FIG. 27, an IRRx sampling circuit 51, a pulse counter 53, a zero stop-down counter 55, a missing pulse position detecting circuit 57, OR gates 54 and 56 and D flip-flops 58 and 59 of a main/subdata demodulation part 16c are identical in structure and function to those included in the main/subdata demodulation part 16a according to the embodiment 1 shown in FIG. 12, and hence description will not be repeated here. FIGS. 29A and 28B is a timing chart showing sampling in the IRRx sampling circuit 51. Referring to FIG. 28A, (a) to (c) are identical to those described with reference to FIG. 14A, and hence description will not be repeated here.

FIGS. 28A and 28B show IRRx waveforms providing all sample patterns assumed in such a case that a third light emitting section of three continuous subcarriers is displaced frontward and rising between times t1 and t2 at (d) to (f) in the form of a timing chart. For the same reason as that described with reference to (a) to (c) in FIG. 14A, sample [19] and sample[18] signals and sample[7] and sample[6] signals can never go low and high respectively, and sample [15] and sample[14] signals can never go high and low respectively.

A circuit detecting that three subcarriers are continuously inputted is similar to that shown in FIG. 15A.

Figure 29:
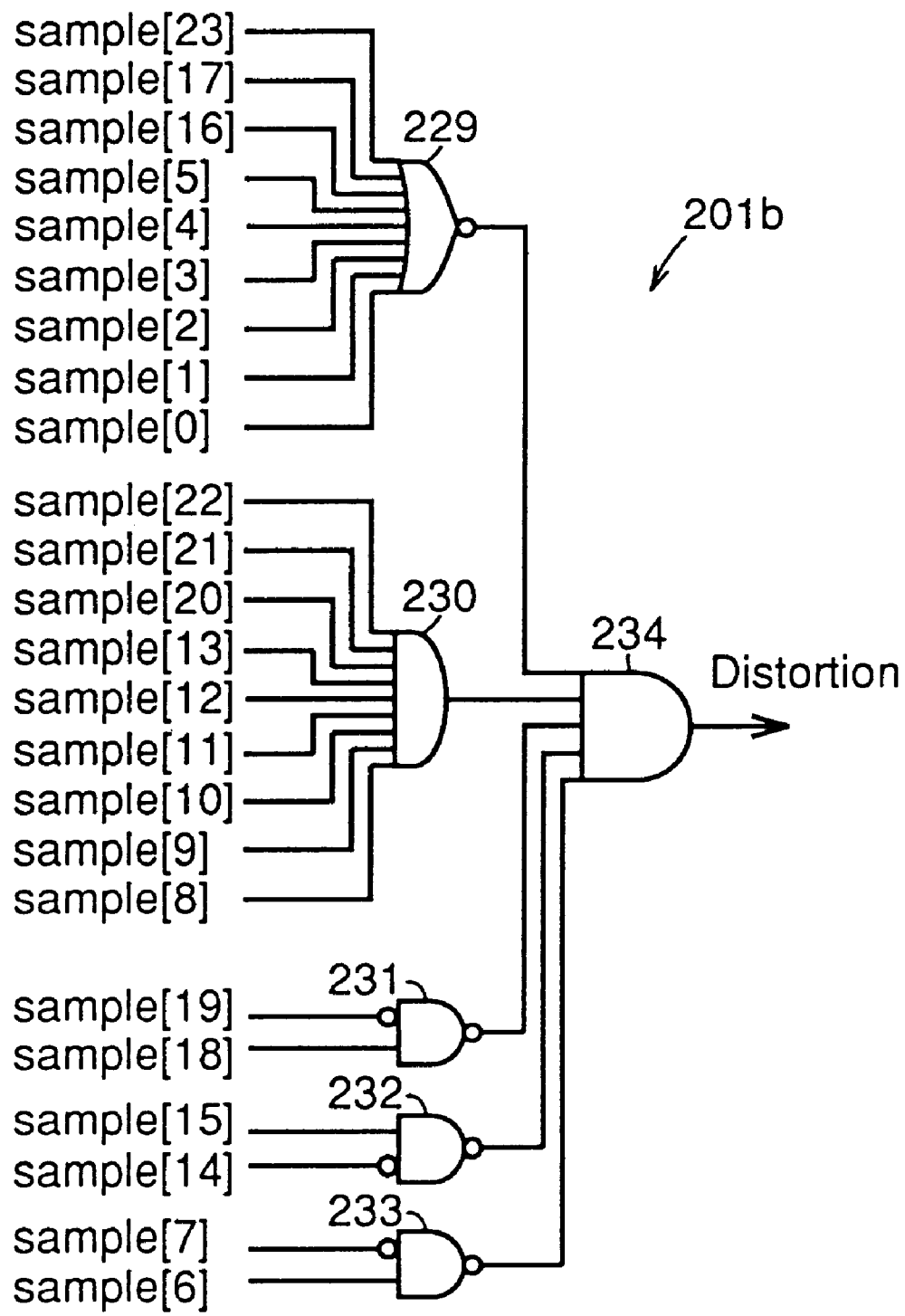
FIG. 29 illustrates the internal structure of a waveform pattern matching circuit according to the third embodiment.

FIG. 29 shows a circuit detecting that subcarriers in which a third light emitting section is displaced frontward. Namely, this circuit generates pulses only when Distortion determination conditions shown in FIG. 28B are satisfied. A NOR gate 229 becomes "1" when all of sample[23], sample[17], sample[16] and sample[5] to sample[0] signals are "0". An AND gate 230 becomes "1" when all of sample[22] to sample[20] and sample[13] to sample[8] signals are "1". NAND gates 231 and 233 become "1" when sample[19] and sample[18] signals and sample[7] and sample[6] signals are not at low and high levels respectively. A NAND gate 232 becomes "1" when sample[15] and sample[14] signals are not at high and low levels respectively. An output of an AND gate 234 becomes "1" only when all of the NOR gate 229, the AND gate 230 and the NAND gates 231 to 233 become "1", i.e., when the Distortion determination conditions shown in FIG. 28B are satisfied.

Figure 30:
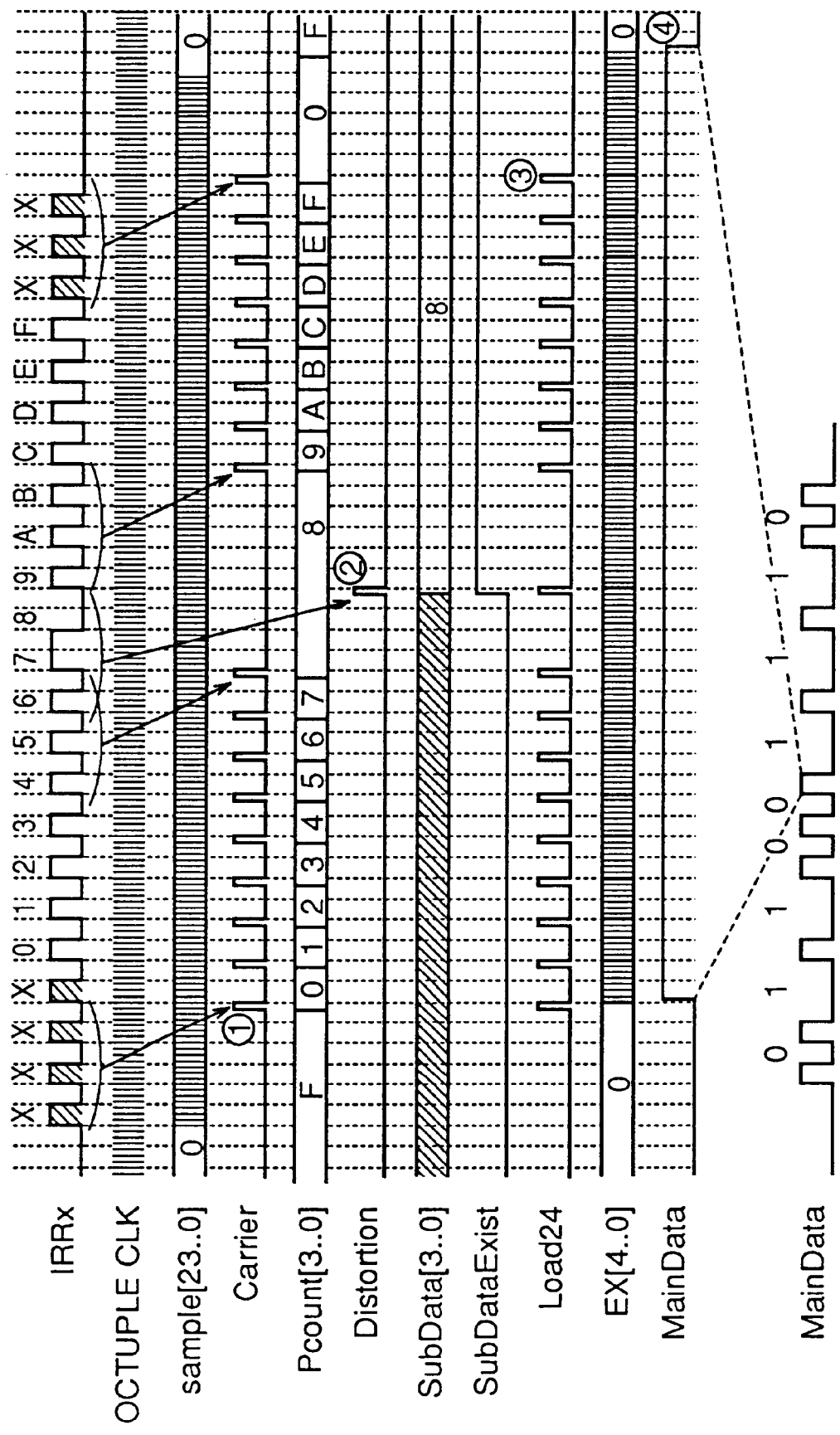
FIG. 30 is a timing chart of the main/subdata demodulation part according to the third embodiment.

Referring to FIG. 30, a waveform pattern matching circuit 201 detects first continuous three pulses of the IRRx signal, and outputs a Carrier signal at the timing ①. The pulse counter 53 is a 4-bit counter in which a value FH (all outputs Pcount[3..0] are "1") is set, and performs a count-up operation every time the Carrier signal becomes "1". Therefore, the pulse counter 53 outputs 0H at the timing ①.

The waveform pattern matching circuit 201 generates a pulse every time inputted sample[23..0] signals coincide with Carrier determination conditions shown in FIG. 28A, and hence a pulse is outputted for the Carrier signal every time one pulse of the IRRx signal is inputted until a pulse "6" of the IRRx signal is inputted. Therefore, nine pulses of the Carrier signal are outputted before a light emitting section "8" of the IRRx signal which is displaced frontward to be continuous with the preceding light emitting section "7" is inputted in the IRRx sampling circuit 51. Consequently, the count value of the pulse counter 53 becomes 8H.

On the other hand, a Load24 signal outputted from the OR gate 54 receiving the Carrier signal and the Distortion signal is inputted in a load terminal of the zero stop-down counter 55. Further, an octuple CLK signal is inputted in a C terminal of the zero stop-down counter 55. Therefore, the zero stop-down counter 55 loads a value 24 (decimal) and starts a count-down operation every time a pulse is outputted for the Carrier or Distortion signal.

Outputs EX[4..0] of the zero stop-down counter 55 are inputted in the five-input OR gate 56. Further, an output of the OR gate 56 is inputted in a D terminal of the D flip-flop 59. The octuple CLK signal is inputted in a C terminal of the D flip-flop 59. The OR gate 56 outputs "1" unless the count value of the zero stop-down counter 55 is 0H, and hence the MainData signal becomes "1" on the leading edge of the octuple CLK signal following fall of the Carrier signal which becomes "1" (the timing ① in FIG. 30).

When the light emitting section "8" displaced frontward to be continuous with the preceding light emitting section "7" is inputted in the IRRx sampling circuit 51, no pulses are outputted for the Carrier signal for a period of four cycles of the subcarriers. The waveform pattern matching circuit 201 detects the Distortion determination conditions shown in FIG. 28B, and outputs a pulse for the Distortion signal at the timing ② in FIG. 30.

The missing pulse position detecting circuit 57 holds the outputs Pcount[3..0] of the pulse counter 53 on the leading edge of the Distortion signal. This circuit is formed by a 4-bit D flip-flop. As shown in FIG. 30, the missing pulse position detecting circuit 57 holds the value of the pulse counter 53 at the timing ②, and outputs the held value 8H for the SubData[3..0] signals. The Distortion signal and a voltage Vcc (+5 V) are inputted in C and D terminals of the D flip-flop 58 respectively, whereby the SubDataExist signal becomes "1" at the timing ②. A computer or the like connected with the digital optical receiver 14 detects that the SubDataExist signal becomes "1", recognizes that subdata are superposed on the subcarriers, and recognizes the contents of the subdata by reading the SubData[3..0] signals.

When a subcarrier "B" of the IRRx signal is inputted in the IRRx sampling circuit 51, the Carrier determination conditions are satisfied again and hence outputting of the Carrier signal is re-started. When the final subcarrier "F" of the IRRx signal is thereafter inputted in the IRRx sampling circuit 51, the waveform pattern matching circuit 201 outputs the final Carrier signal, as shown at the timing ③ in FIG. 30. At the same time, the final pulse is inputted in a Load24 signal input of the zero stop-down counter 55. After the zero stop-down counter 55 loads the value 24 first (① in FIG. 30) and starts the count-down operation, the value is loaded again before the count value becomes 0H and hence the output of the OR gate 56 remains "1". After the timing ③ in FIG. 30, however, the Load24 signal does not become "1" and hence the zero stop-down counter 55 outputs 0H when the octuple CLK signal is inputted by 24 clocks. Consequently, the OR gate 56 outputs "0" and the MainData signal becomes "0" after one clock of the octuple CLK signal (④ in FIG. 30). Therefore, it can be said that the zero stop-down counter 55 serves the function of regulating the length of the main data to the normal one (23 cycles of the subcarriers).

As hereinabove described, the digital optical transmitter 10 frontwardly displaces light emitting sections of subcarriers thereby superposing subdata on main data, while the digital optical receiver 14 detects the sections of the subcarriers where the light emitting sections are displaced thereby extracting the subdata superposed on the main data.

For example, data such as a current time changing with time may be superposed as the subdata and transmitted on the digital optical transmitter 10 side. It is possible to improve the reliability of security by extracting the subdata and determining whether or not the value thereof is correct on the digital optical receiver 14 side. However, innumerable possibilities are conceivable as to what data are employed as subdata, and hence no further description is made here.

Figure 31:
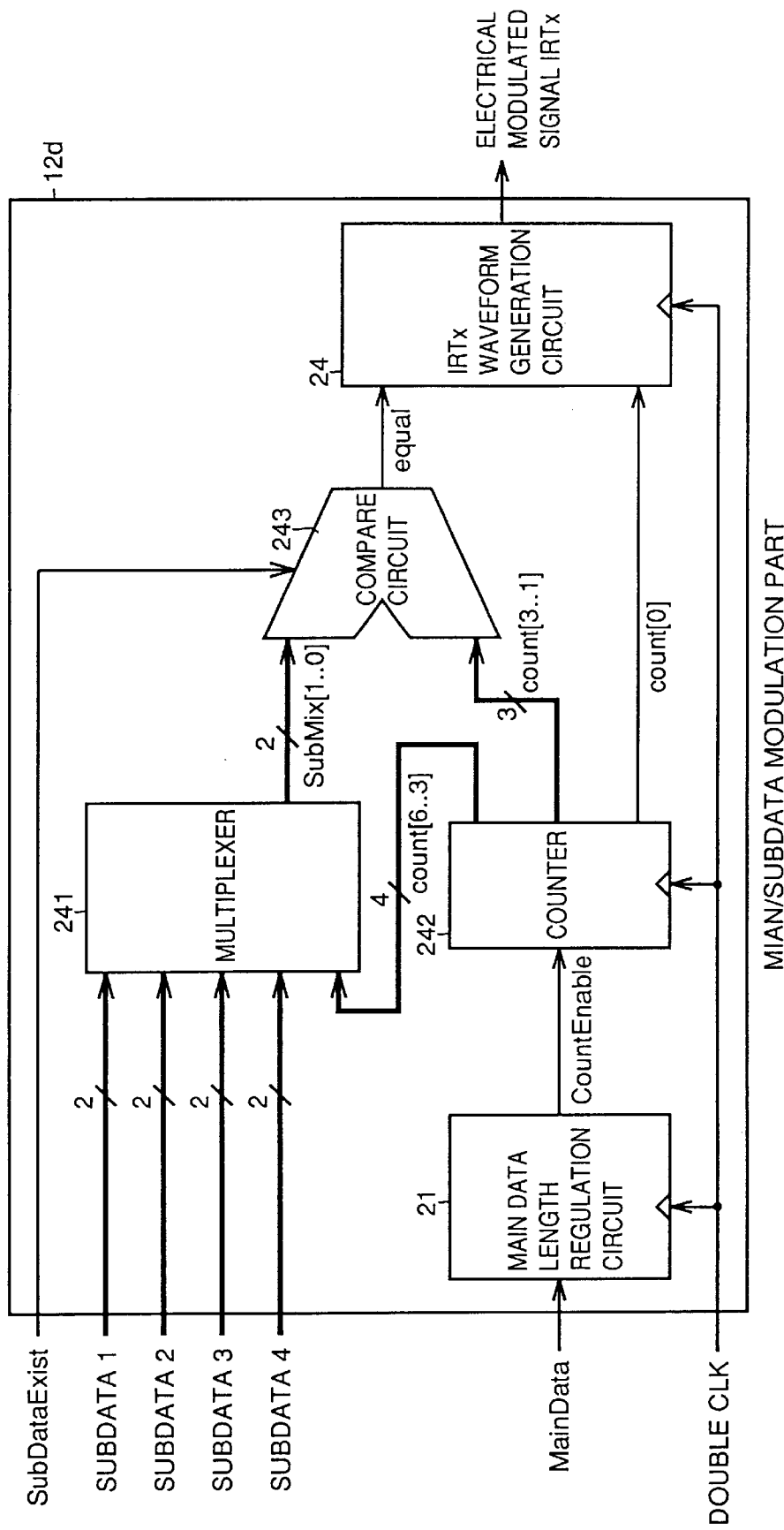
FIG. 31 is a block diagram showing the internal structure of a main/subdata modulation part according to the fourth embodiment.

FIG. 31 illustrates a fourth embodiment of the present application

Referring to FIG. 31, a main data length regulation circuit 21 and an IRTx waveform generation circuit 24 of a main/subdata modulation part 12d are identical in structure and function to those included in the main/subdata modulation part 12a according to the first embodiment of FIG. 9, and hence description will not be repeated here.

A multiplexer 241 selects single subdata from a plurality of subdata inputted at the same timing and outputs the same. According to this embodiment, four types of subdata 1 to 4 having 2-bit data are inputted in the multiplexer 241, and subdata to be outputted are selected by high-order four bits count[6..3] of the count value of a counter 242 and outputted as SubMix[1..0] signals.

The counter 242, which is formed by a 7-bit counter, starts a count operation when a CountEnable signal becomes "1". A signal of the least significant bit count[0] of the counter 242 is used in case of generating subcarriers. Prescribed initial values are previously loaded in the counter 242, which performs a count-up operation every time a double CLK signal is inputted after the CountEnable signal becomes "1". It is assumed that initial values 3DH and 0 are previously loaded in high-order bits count[6..1] and the least significant bit count[0] of the counter 242 respectively.

A compare circuit 243 outputs "0" for an equal signal when a subdata existence informational (SubDataExist) signal is "0". When the SubDataExist signal is "1", on the other hand, the compare circuit 243 compares the SubMix[1..0] signals outputted from the multiplexer 241 with count[2..1] signals outputted from the counter 242, for outputting "1" for the equal signal when these signals coincide with each other, otherwise outputting "0".

Figure 32:
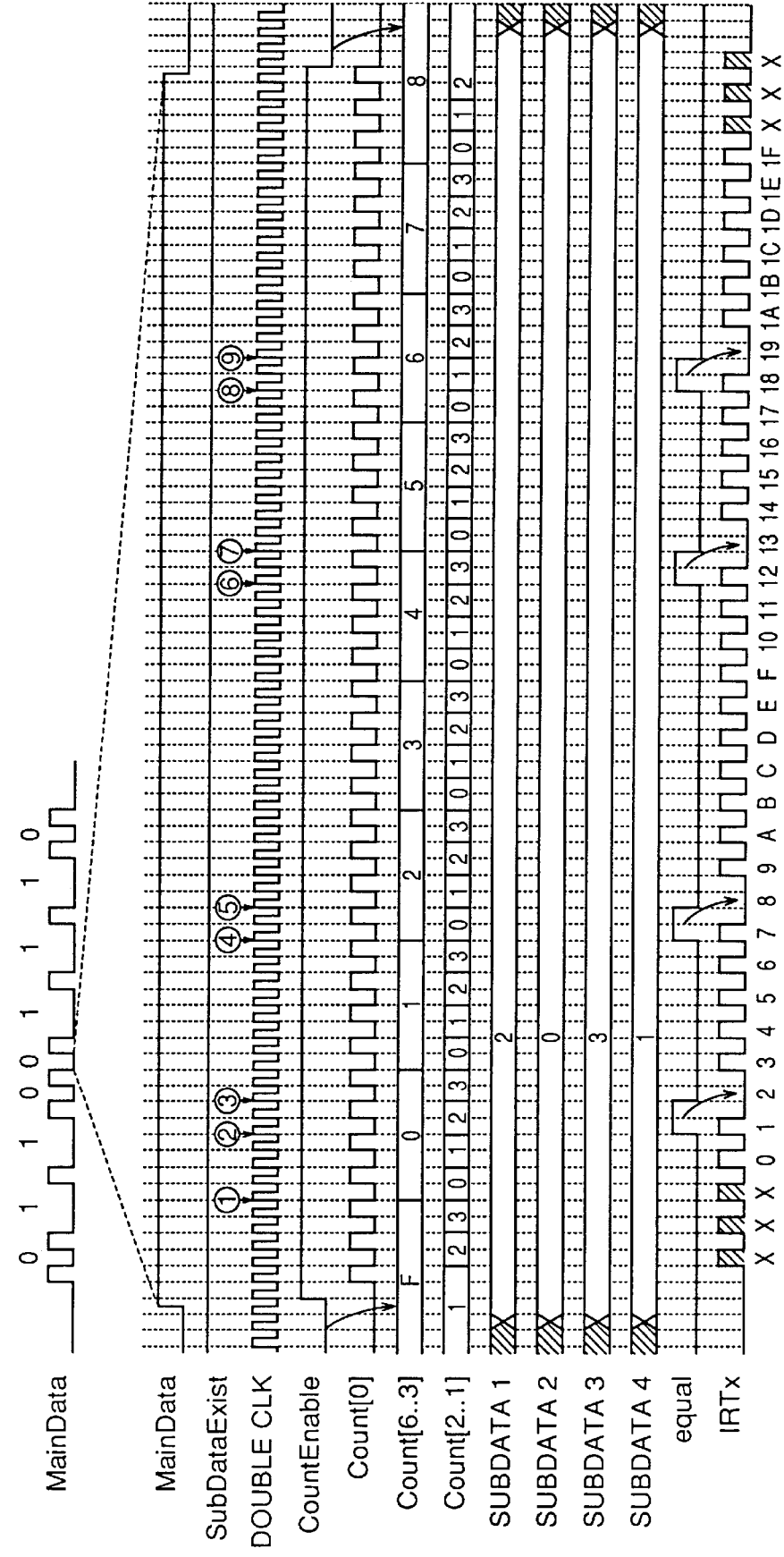
FIG. 32 is a timing chart of the main/subdata modulation part according to the fourth embodiment.

Operations of the main/subdata modulation part 12d according to this embodiment are now described properly with reference to a timing chart shown in FIG. 32. When the CountEnable signal becomes "1", i.e., when a PPM modulation part 11 outputs a pulse signal, the counter 242 starts counting its high-order bits count[6..1] from the initial value 3DH. According to this embodiment, it is assumed that one bit of main data involves 38 or 39 pulses of subcarriers, respective light emitting sections of first three pulses are necessarily not replaced with non-emitting sections, and following light emitting sections of 32 pulses are replaced with non-emitting sections for superposing the subdata. Further, respective light emitting sections of at least a subsequent three or four pulses are necessarily not replaced with non-emitting sections.

The counter 242 repeats the count-up operation and the value of the high-order bits count[6..3] becomes 0H on the leading edge of the double CLK signal at ① in FIG. 32. Values 2H, 0H, 3H and 1H are set for the subdata 1 to 4 respectively by a computer (not shown) or the like. When the value of the high-order bits count[6..3] is 0H, the multiplexer 241 selects the value of the subdata 1 and outputs the same for the SubMix[1..0] signals. The counter 242 repeats the count-up operation, and the value of the count[2..1] signals reaches 2H and coincides with the value of the SubMix[1..0] signals on the leading edge of the double CLK signal at ② in FIG. 32. At this time, the subdata existence informational signal SubDataExist is "1" (active), and hence the equal signal outputted from the compare circuit 243 becomes "1" for a period of two clocks of the double CLK signal. An inverted signal of the equal signal is inputted in the AND gate 31, and the count[0] signal is inputted in one input of the AND gate 31, as shown in the IRTx waveform generation circuit in FIG. 10. Further, an output of the AND gate 31 and the double CLK signal are inputted in D and C terminals of the D flip-flop 32 respectively. Therefore, the AND gate 31 outputs the count[0] signal as such until the equal signal becomes "1", and hence the D flip-flop 32 outputs an IRTx signal having the same signal waveform as the count[0] signal in a delay by a time corresponding to one clock of the double CLK signal. However, the AND gate 31 masks the count[0] signal when the equal signal becomes "1", and hence the IRTx signal does not become "1" at the timing ③ in FIG. 32.

The compare circuit 243 compares the count[3] signal with "0", and the equal signal remains "0" when the value of the count[6..3] signals is 1H, for example.

The counter 242 further repeats the count-up operation, and the value of the counter high-order bits count[6..3] reaches 2H on the leading edge of the double CLK signal at ④ in FIG. 32. When the value of the high-order bits count[6..3] becomes 2H, the multiplexer 241 selects the value of the subdata 2 and outputs the same for the SubMix [1..0] signals. Therefore, the compare circuit 243 compares the count[2..1] signals with the value of the subdata 2, and hence the equal signal becomes "1" at the timing ④ in FIG. 32 and the IRTx signal does not become "1" at the timing ⑤ in FIG. 32.

The counter 242 further repeats the count-up operation, and the value of the count[2..1] signals becomes 3H at the timing ⑥ in FIG. 32. At this time, the value of the counter high-order bits count[6..3] is 4H, and the multiplexer 241 selects the value of the subdata 3 and outputs the same for the SubMix[1..0] signals. Therefore, the equal signal becomes "1" at the timing ⑥ in FIG. 32, and the IRTx signal does not become "1" at the timing ⑦ in FIG. 32.

The counter 242 further repeats the count-up operation, and the value of the count[2..1] signals becomes 1H at the timing ⑧ in FIG. 32. At this time, the value of the counter high-order bits count[6..3] is 6H, and the multiplexer 241 selects the value of the subdata 4 and outputs the same for the SubMix[1..0] signals. Therefore, the equal signal becomes "1" at the timing ⑧ in FIG. 32, and the IRTx signal does not become "1" at the timing ⑨ in FIG. 32.

Thus, 8-bit information can be superposed with respect to one bit of main data as the subdata.

Figure 33:
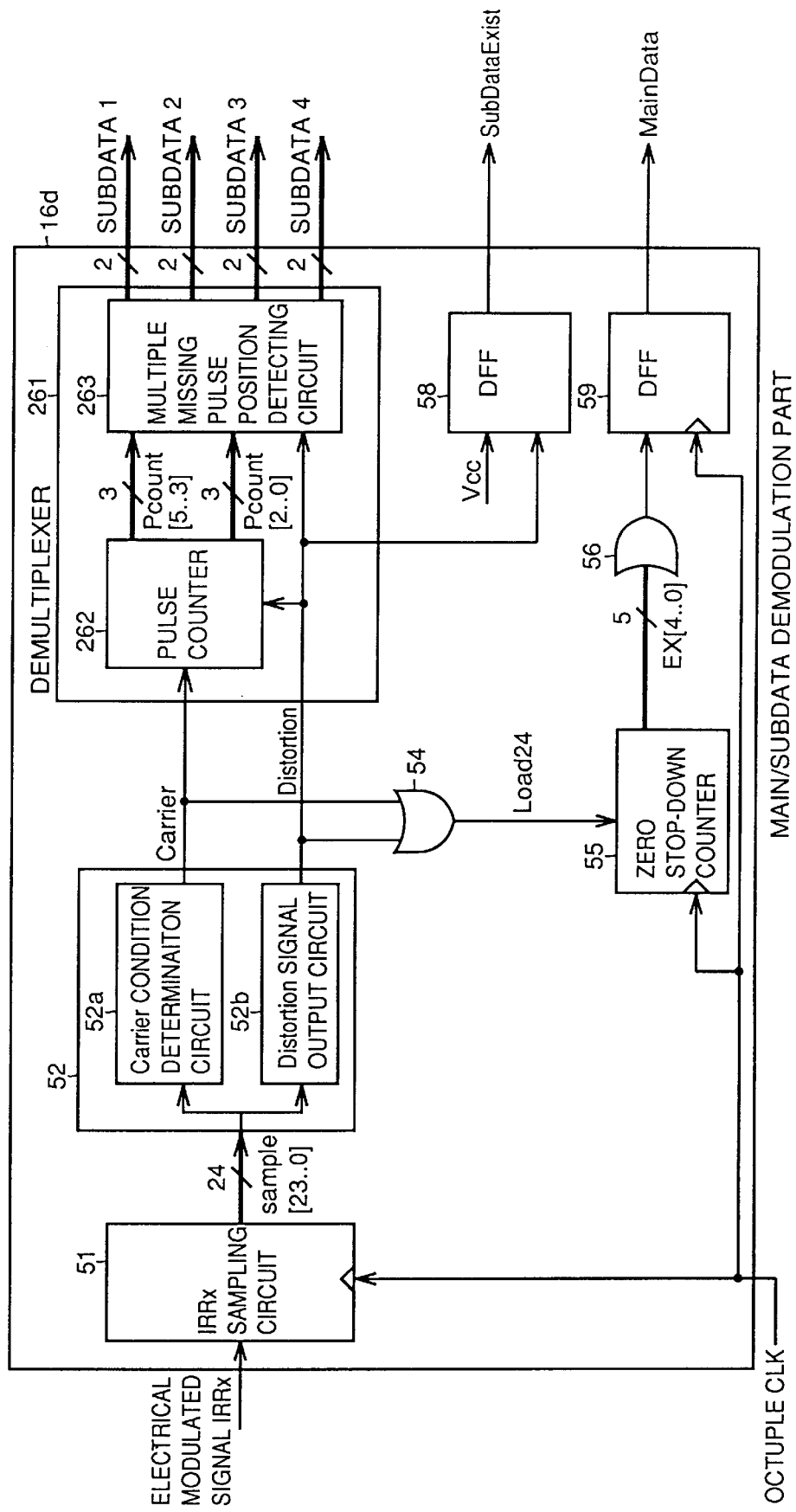
FIG. 33 is a block diagram showing the internal structure of a main/subdata demodulation part according to the fourth embodiment.

Referring to FIG. 33, an IRRx sampling circuit 51, a waveform pattern matching circuit 52, a zero stop-down counter 55, OR gates 54 and 56 and D flip-flops 58 and 59 of a main/subdata demodulation part 16d are identical in structure and function to those included in the main/subdata demodulation part 16a according to the embodiment 1 shown in FIG. 12, and hence description will not be repeated here. A demultiplexer 261 includes a 6-bit pulse counter 262 for counting the number of pulses outputted for a Carrier signal from the waveform pattern matching circuit 52, and a multiple missing pulse position detecting circuit 263 for detecting positions where light emitting sections are replaced with non-emitting sections. The pulse counter 262 outputs 6-bit signals Pcount. When a pulse exists in a Distortion signal before the value of Pcount[2..0] signals reaches 4H, the pulse counter 262 increments the value of Pcount[5..3] signals at the same time when the value reaches 0H in the next count-up operation. When no pulse exists in the Distortion signal before the value of the Pcount[2..0] signals reaches 4H, on the other hand, the pulse counter 262 repeats the count-up operation until the value reaches 7H, and increments the value of the Pcount[5..3] signals at the same time when the value reaches 0 in the next count-up operation.

The multiple missing pulse position detecting circuit 263 holds the Pcount[1..0] signals outputted from the pulse counter 262 and outputs the same for any of the subdata 1 to 4 in response to the value of the Pcount[5..3] signals on the leading edge of the Distortion signal. Namely, the multiple missing pulse position detecting circuit 263 holds the value of the Pcount[1..0] signals and outputs the same for the subdata 1, 2, 3 or 4 on the leading edge of the Distortion signal when the value of the Pcount[5..3] signals is 0H, 1H, 2H or 3H.

Figure 34:
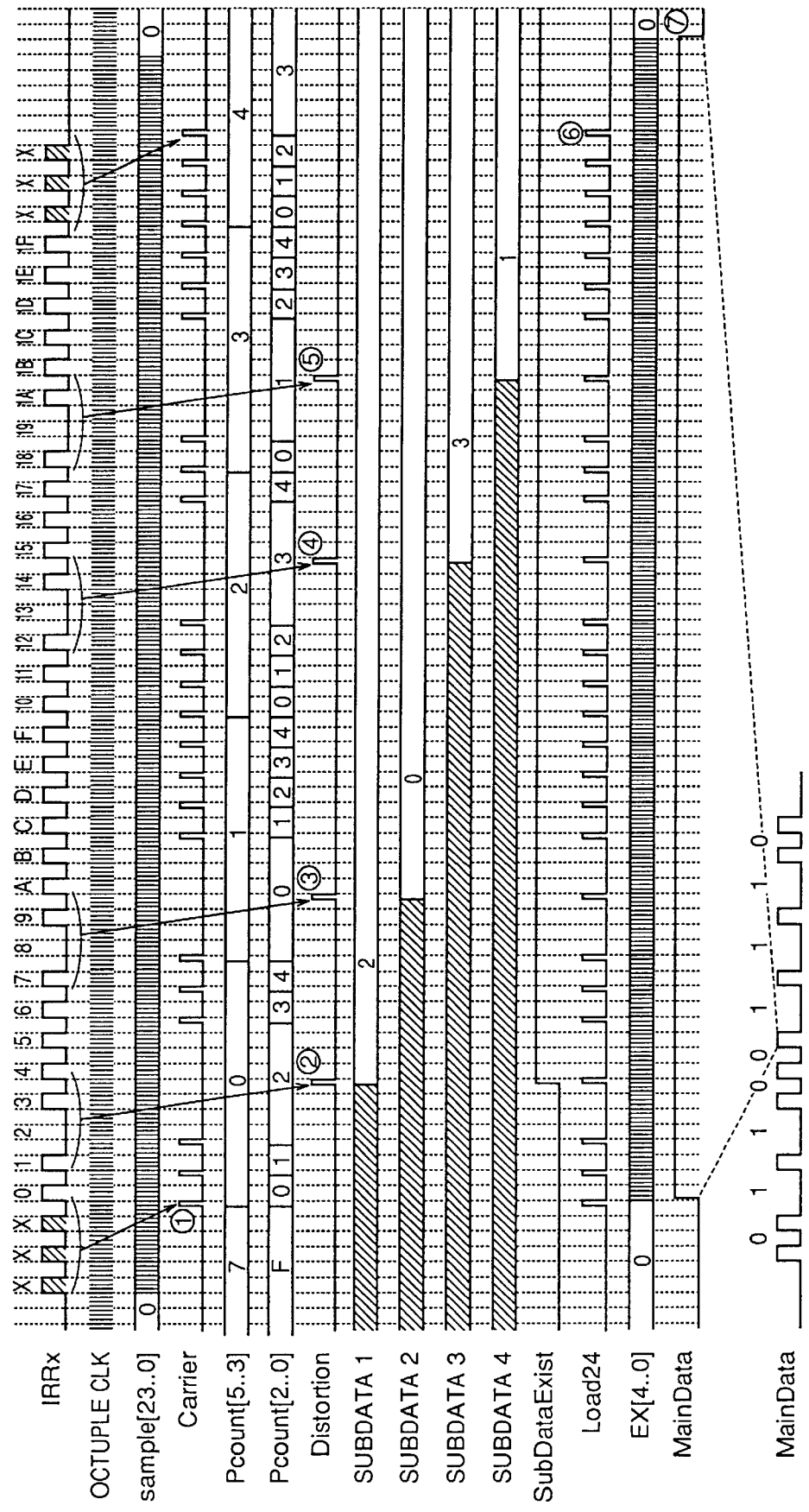
FIG. 34 is a timing chart (1) of the main/subdata demodulation part according to the fourth embodiment.

Referring to FIG. 34, the waveform pattern matching circuit 52 detects first continuous three pulses of an IRRx signal and outputs a Carrier signal at the timing ①. Initial values of 4 and 7H are respectively loaded in high-order bits Pcount[5..3] and low-order bits Pcount[2..0] of the pulse counter 262, which performs a count-up operation every time the Carrier signal becomes "1". Therefore, the output of the pulse counter 262 becomes 0H at the timing ①.

The waveform pattern matching circuit 52 generates a pulse every time inputted sample[23..0] signals coincide with the Carrier determination conditions shown in FIG. 14A, and hence a pulse is outputted for the Carrier signal every time one pulse of the IRRx signal is inputted until a pulse "1" of the IRRx signal is inputted. Therefore, three pulses of the Carrier signal are outputted before a light-emitting section "2" of the IRRx signal replaced with a non-emitting section is inputted in the IRRx sampling circuit 51. Consequently, the count value of the pulse counter 262 becomes 2H.

On the other hand, a Load24 signal outputted from the OR gate 54 receiving the Carrier signal and the Distortion signal is inputted in a load terminal of the zero stop-down counter 55. Further, an octuple CLK is inputted in a C terminal of the zero stop-down counter 55. Therefore, the zero stop-down counter 55 loads a value 24 (decimal) and then starts a count-down operation every time a pulse is outputted for the Carrier or Distortion signal.

Outputs EX[4..0] of the zero stop-down counter 55 are inputted in the five-input OR gate 56. Further, an output of the OR gate 56 is inputted in a D terminal of the D flip-flop 59. The octuple CLK signal is inputted in a C terminal of the D flip-flop 59. The OR gate 56 outputs "1" when the count value of the zero stop-down counter 55 is other than 0H, and hence a MainData signal becomes "1" on the leading edge of the octuple CLK signal after the Carrier signal becomes "1" and falls (timing ① in FIG. 34).

When the light emitting section "2" replaced with the non-emitting section is inputted in the IRRx sampling circuit 51, no pulse is outputted for the Carrier signal for a period of four cycles of subcarriers. The waveform pattern matching circuit 52 detects the Distortion determination conditions shown in FIG. 14B and outputs a pulse for the Distortion signal at the timing ② in FIG. 34.

As shown in FIG. 34, the multiple missing pulse position detecting circuit 263 holds the value of the Pcount[1..0] signals at the timing ②, and outputs the held value 2H for the subdata 1, since the value of the Pcount[5..3] signals is 0H. The Distortion signal and a voltage Vcc (+5 V) are inputted in C and D terminals of the D flip-flop 58 respectively, whereby the SubDataExist signal becomes "1" at the timing ②. The computer or the like connected with the digital optical receiver 14 detects that the SubDataExist signal becomes "1" and recognizes that the subdata are superposed on the subcarriers, and can recognize the contents of the subdata by reading 8-bit subdata after the subdata 1 to 4 are complete.

When a light emitting section "8" replaced with a non-emitting section is inputted in the IRRx sampling circuit 51, the waveform pattern matching circuit 52 outputs a pulse for the Distortion signal at the timing ③. The value of the Pcount[5..3] signals is 1H at the timing ③, and hence the multiple missing pulse position detecting circuit 263 holds the value of the Pcount[1..0] signals and outputs the held value 0H for the subdata 2. Similarly, the multiple missing pulse position detecting circuit 263 outputs the value 3H for the subdata 3 at the timing ④, and outputs the value 1H for the subdata 4 at the timing ⑤.

After the zero stop-down counter 55 first loads the value 24 (① in FIG. 34) and starts the count-down operation, the value is loaded again before the count value becomes 0H and hence the output of the OR gate 56 remains "1". After the timing ⑥ in FIG. 34, however, the Load24 signal does not become "1" and hence the zero stop-down counter 55 outputs 0H when the octuple CLK signal is inputted by 24 clocks. Consequently, the OR gate 56 outputs "0" and the MainData signal becomes "0" after one clock of the octuple CLK signal (⑦ in FIG. 34). Therefore, it can be said that the zero stop-down counter 55 serves the function of regulating the length of the main data to the normal one (38 cycles of the subcarriers).

Figure 35:
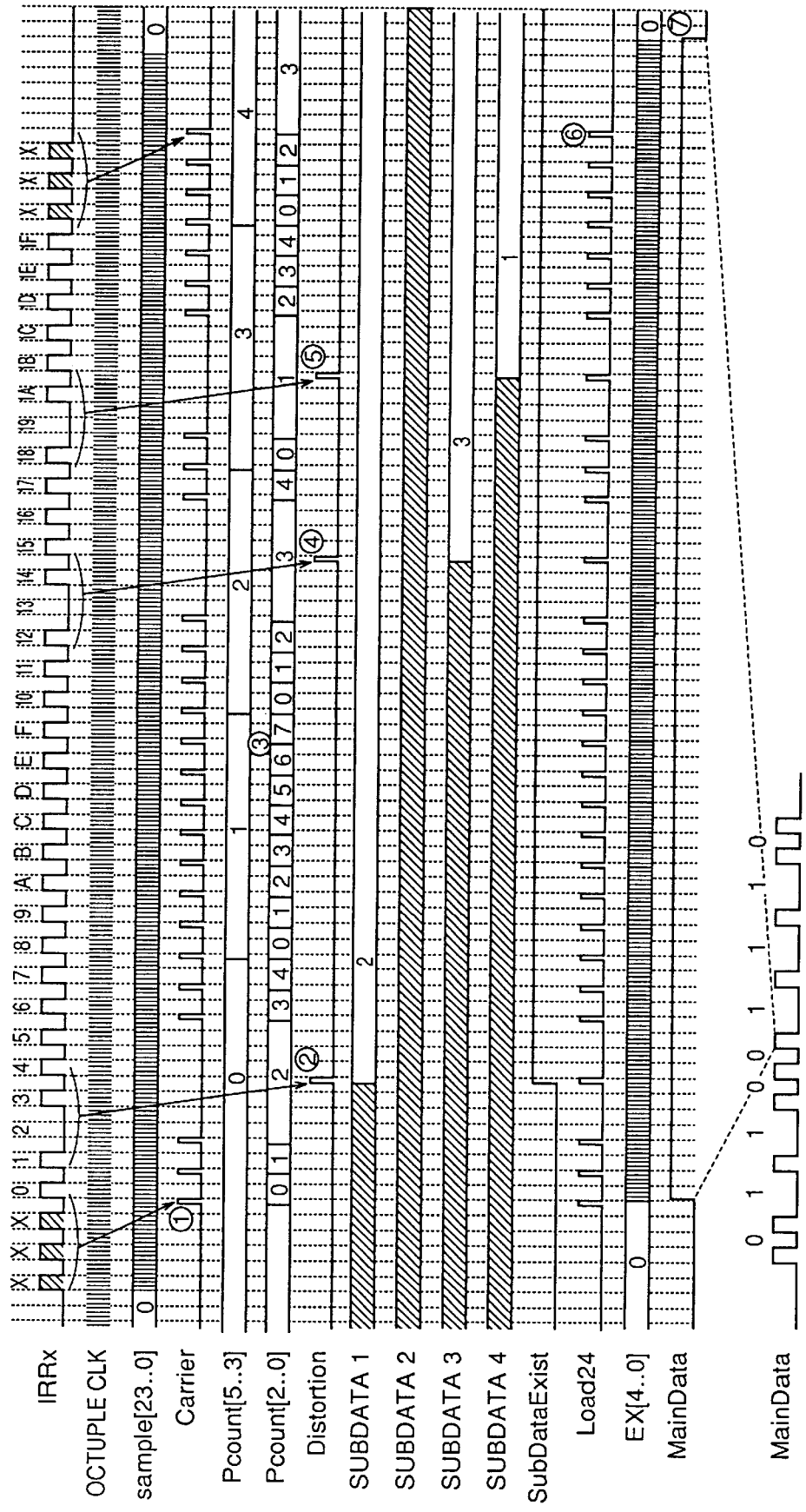
FIG. 35 is a timing chart (2) of the main/subdata demodulation part according to the fourth embodiment.

Referring to FIG. 35, the pulse "8" of the IRRx signal is not replaced with a non-emitting section as compared with the timing chart shown in FIG. 34. In this case, the value of the Pcount[2..0] signals becomes 7H at the timing ③ and becomes 0H on the next leading edge of the Carrier signal, and the value of the Pcount[5..3] signals is incremented. Thus, the main/subdata demodulation part 16d can correctly demodulate the subdata despite missing thereof.

The data rate of the main data is generally not integral times the cycle of the subcarriers, and hence the number of pulses of the subcarriers involved in each symbol includes an error of about one pulse. Therefore, it is also possible to superpose the subdata on the main modulated waveform by arranging the number of pulses of the subcarriers included in each symbol between the optical transmitter 10 and the optical receiver 14 and increasing/decreasing the number of pulses of the subcarriers.

As hereinabove described, the digital optical transmitter 10 superposes subdata on main data by replacing a plurality of light emitting sections of the subcarriers with non-emitting sections, and the digital optical receiver 14 extracts the subdata superposed on the main data by detecting the plurality of light emitting sections replaced with the non-emitting sections in the subcarriers.

The optical receiver 14 in each of the aforementioned embodiments can not necessarily correctly regenerate received subcarriers, but may first lose several pulses of the subcarriers due to the characteristics of an amplification circuit or a bandpass filter provided in the optical receiver 14.

An optical transmitter 10/receiver according to this embodiment makes it possible to correctly transmit/receive subdata even if first several pulses of subcarriers are lost in the optical receiver 14.

Figure 36:
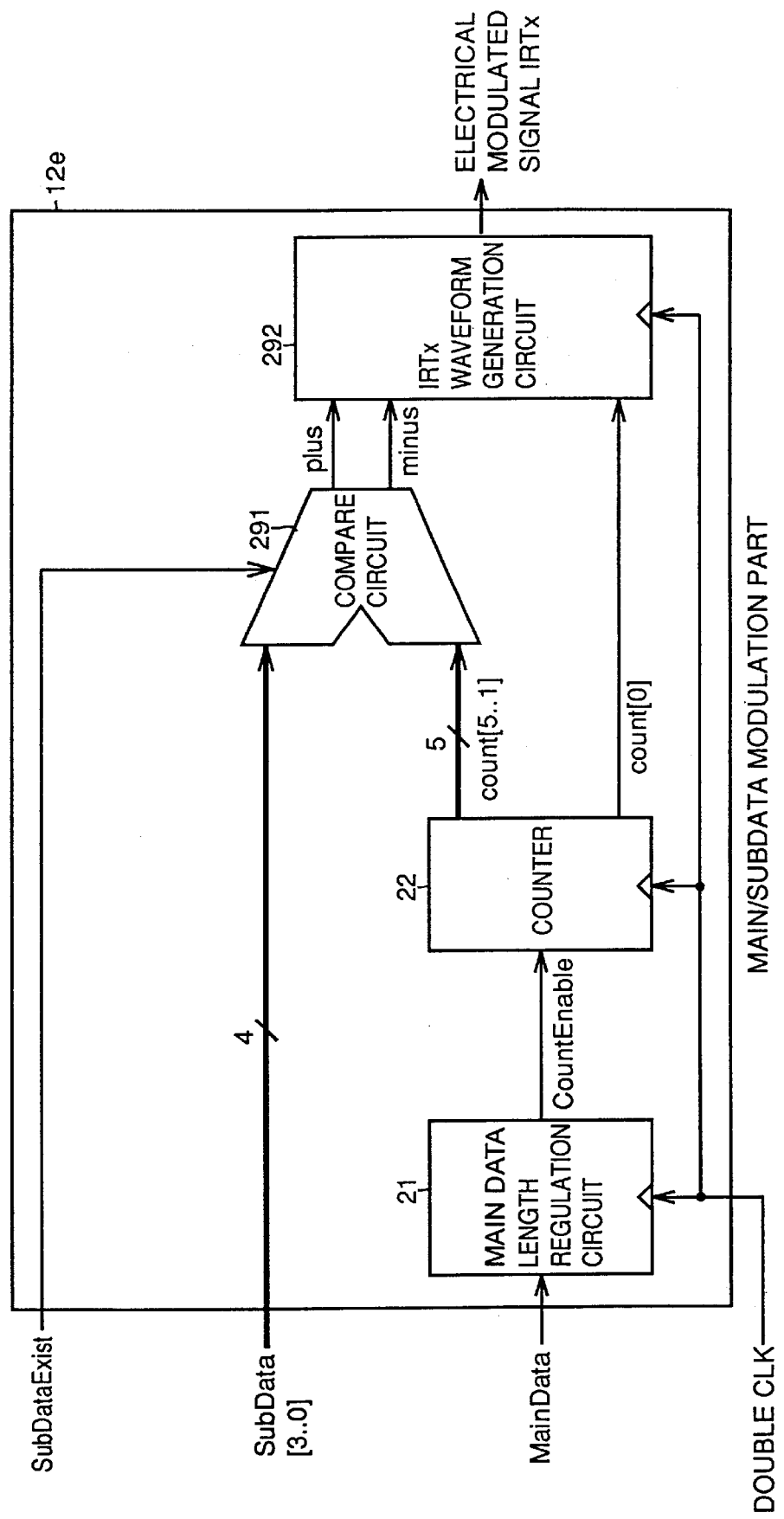
FIG. 36 is a block diagram showing the internal structure of a main/subdata modulation part according to the fifth embodiment.

FIG. 36 is a block diagram showing the internal structure of a main/subdata modulation part 12e according to a fifth embodiment of the present invention. In this main/subdata modulation part 12e, a main data length regulation circuit 21 and a counter 22 are identical in structure and function to those included in the main/subdata modulation part 12a according to the first embodiment of FIG. 9, and hence description will not be repeated here. However, it is assumed that initial values 19H and 0 are previously loaded in high-order bits count[5..1] and the least significant bit count [0] of the counter 22 respectively. In the following description, it is assumed that a value 9H is supplied to subdata SubData[3..0].

A compare circuit 291 outputs "0" for a plus signal and a minus signal when a subdata existence informational (SubDataExist) signal is "0" (inactive). When the SubDataExist signal is "1", on the other hand, the compare circuit 291 outputs "1" for the minus signal if the subdata (SubData [3..0]) coincide with high-order bit outputs (count[5..1]) of the counter 22, otherwise outputting "0" for the minus signal. However, the count[5] signal is regularly compared with "0", and the count[4..1] signals are compared with the SubData[3..0] signals respectively. The compare circuit 291 holds a 5-bit prescribed value in its interior, and outputs "1" for the plus signal if the prescribed value coincides with the high-order bit outputs count[5..1] when the SubDataExist signal is "1", otherwise outputting "0" for the plus signal. The following description is made on the assumption that the prescribed value is 1DH.

Figure 38:
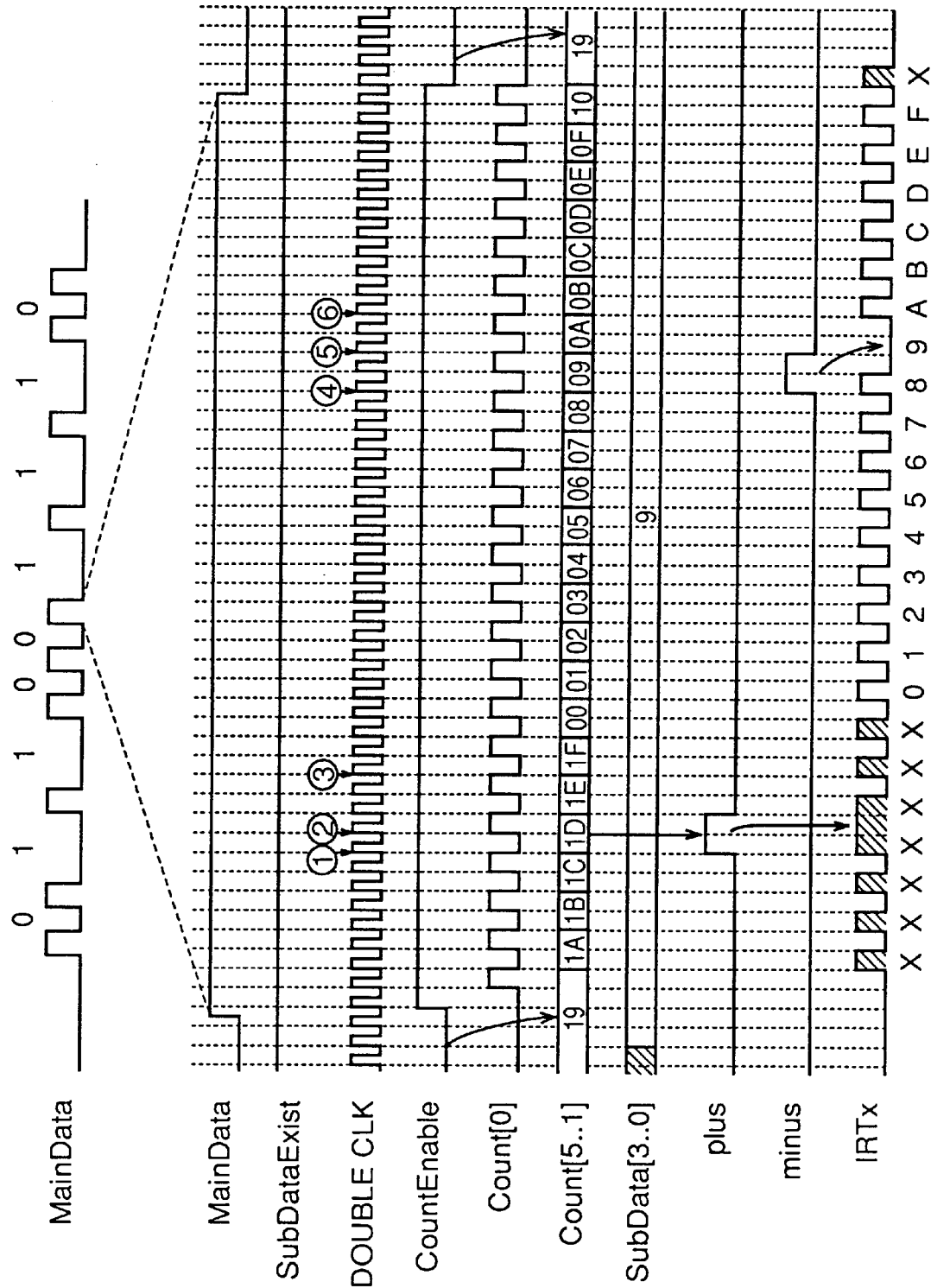
FIG. 38 is a timing chart of the main/subdata modulation part according to the fifth embodiment.

Referring to FIG. 38, the counter 22 starts counting the high-order bits count[5..1] from the initial value 19H when a CountEnable signal becomes "1", i.e., when a PPM modulation part 11 outputs a pulse signal. According to this embodiment, it is assumed that 24 or 25 pulses are involved in subcarriers in one bit of main data, sections next to first three pulses are necessarily rendered no emitting sections, and non-emitting sections of subsequent pulses are replaced with light emitting sections. The non-emitting sections replaced with light emitting sections are referred to as a disturbance 1. Further, sections next to subsequent three pulses of the subcarriers are necessarily rendered non-emitting sections (no disturbance is added), and light emitting sections of subsequent 16 pulses are replaced with non-emitting sections for superposing subdata. The light emitting sections replaced with non-emitting sections are referred to as a disturbance 2.

Figure 37:
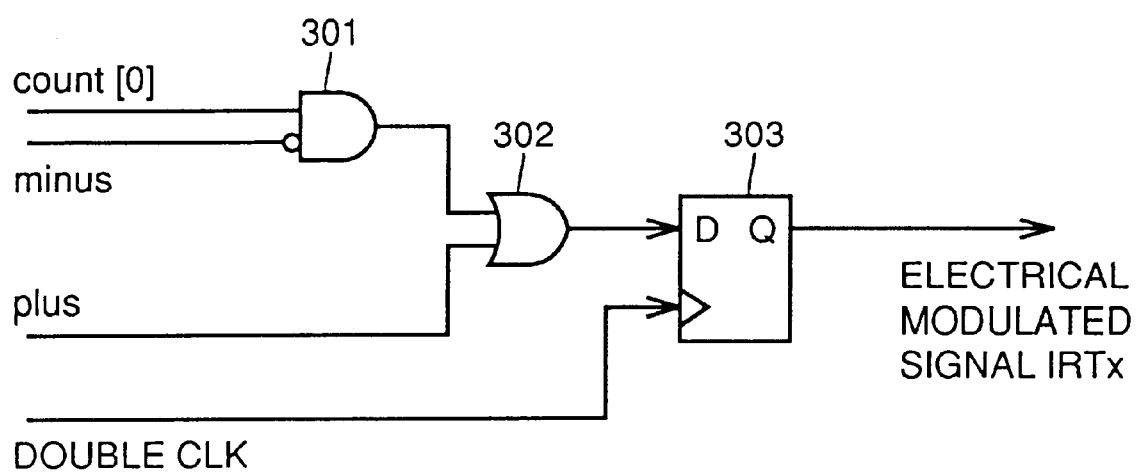
FIG. 37 is a block diagram showing the internal structure of an IRTx waveform generation circuit according to the fifth embodiment.

The counter 22 repeats a count-up operation, and the value of the high-order bits count[5..1] becomes 1DH on the leading edge of a double CLK signal at ① in FIG. 38. The SubDataExist signal is "1" (active), and hence the plus signal outputted from the compare circuit 291 becomes "1" for a period of two clocks of the double CLK signal. The plus signal is inputted in an OR gate 302 as shown in an IRTx waveform generation circuit in FIG. 37, and an output signal of an AND gate 301 is inputted in one input of the OR gate 302. The minus signal is "0", and hence the AND gate 301 outputs the count[0] signal as such. Further, an output of the OR gate 302 and the double CLK signal are inputted in D and C terminals of a D flip-flop 303 respectively. Therefore, the OR gate 302 outputs the count[0] signal as such until the plus signal becomes "1", whereby the D flip-flop 303 outputs an IRTx signal having the same signal waveform as the count[0] signal in a delay by a time corresponding to one clock of the double CLK signal. However, the OR gate 302 outputs "1" when the plus signal becomes "1", and hence the IRTx signal does not become "0" at the timing ② in FIG. 38. At the timing ③ in FIG. 38, the plus signal returns to "0" again and hence outputting of non-emitting sections of the IRTx signal is re-started.

The counter 22 further repeats the count-up operation, and the value of the counter high-order bits count[5..1] becomes 09H on the leading edge of the double CLK signal at ④ in FIG. 38. The value 9H of subdata is previously set for the SubData[3..0] signals by a computer (not shown) or the like and the SubDataExist signal is "1", and hence the minus signal outputted from the compare circuit 291 becomes "1" for a period of two clocks of the double CLK signal. An inverted signal of the minus signal is inputted in the AND gate 301 as shown in the IRTx waveform generation circuit in FIG. 37, while the count[0] signal is inputted in one input of the AND gate 301. Further, an output of the AND gate 301 is inputted in the OR gate 302, and the plus signal is inputted in one input of the OR gate 302. The plus signal is "0", whereby the OR gate 302 outputs the output from the AND gate 301 as such. Therefore, the OR gate 302 outputs the count[0] signal as such until the minus signal becomes "1", whereby the D flip-flop 303 outputs the IRTx signal which has the same signal waveform as the count[0] signal in a delay by a time corresponding to one clock of the double CLK signal. When the minus signal becomes "1", however, the AND gate 301 masks the count[0] signal, and hence the IRTx signal does not become "1" at the timing ⑤ in FIG. 38.

At the timing ⑥ in FIG. 38, the minus signal returns to "0" again and hence outputting of the subcarriers forming the IRTx signal is re-started. The counter 22 stops the count-up operation when the MainData signal and the CountEnable signal become "0", and hence no subcarriers are thereafter outputted for the IRTx signal. Thus, the disturbances 1 and 2 are added to the subcarriers, and the subdata are superposed on the main data by relative time intervals between the disturbances 1 and 2.

Figure 39:
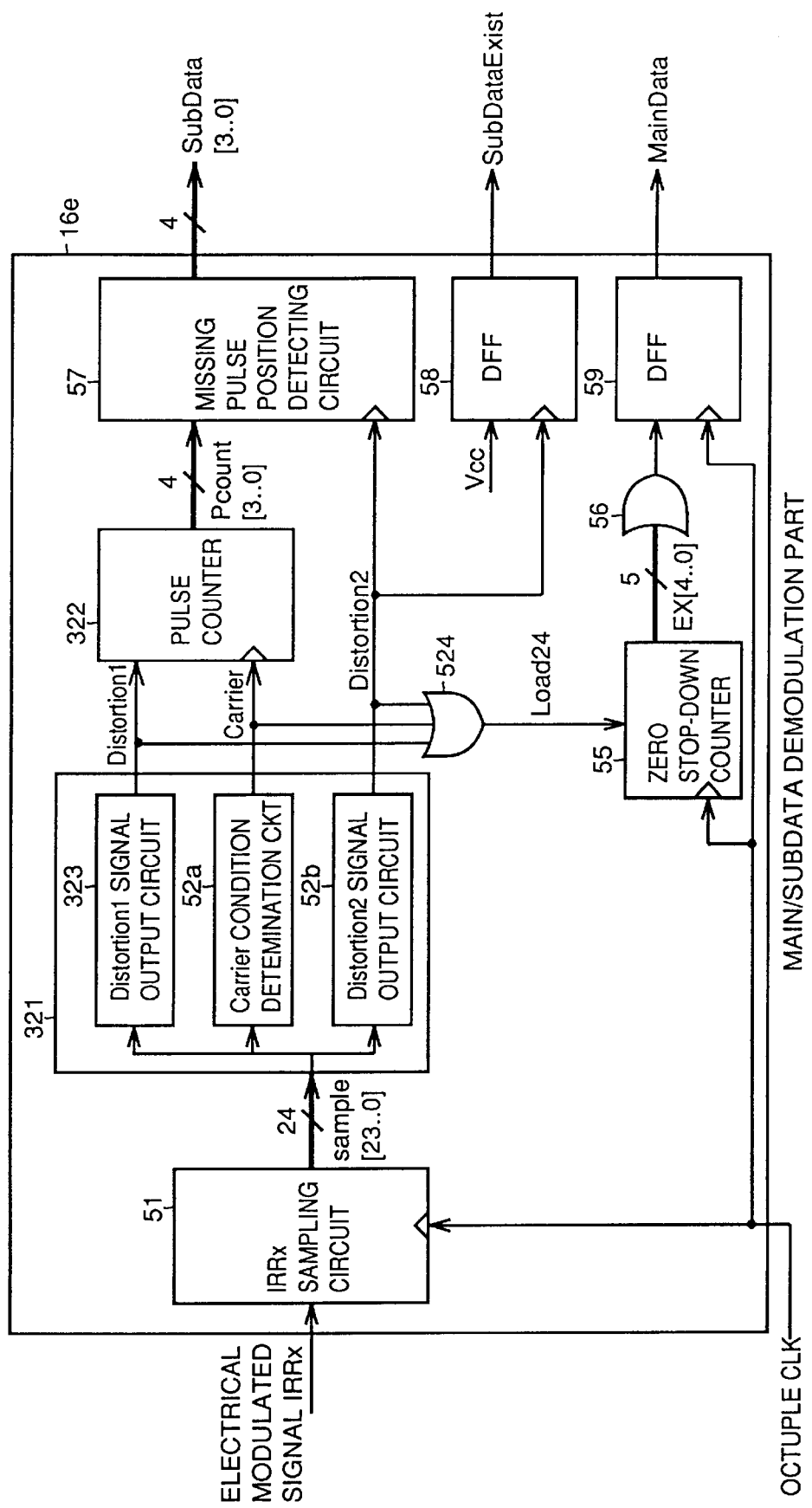
FIG. 39 is a block diagram showing the internal structure of a main/subdata demodulation part according to the fifth embodiment.

Referring to FIG. 39, an IRRx sampling circuit 51, a zero stop-down counter 55, a missing pulse position detecting circuit 57, an OR gate 56 and D flip-flops 58 and 59 of a main/subdata demodulation part 16e are identical in structure and function to those included in the main/subdata demodulation part 16a according to the embodiment 1 shown in FIG. 12, and hence description will not be repeated here. A waveform pattern matching circuit 321 is different from the waveform pattern matching circuit 52 shown in FIG. 12 in a point that a Distortionl signal output circuit 323 described later is added. Zero is first set in a pulse counter 322, which performs no count operation until a pulse is inputted in a Distortionl signal. After a pulse is inputted in the Distortionl signal, the pulse counter 322 performs a count-up operation in synchronization with the leading edge of a Carrier signal.

Figure 40A:
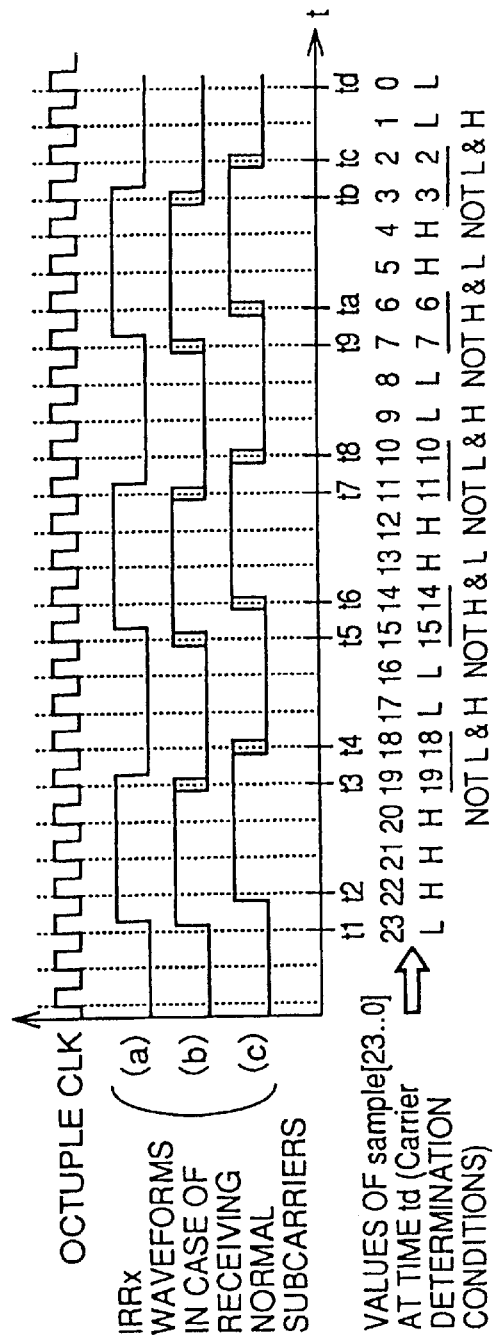
Figure 40B:
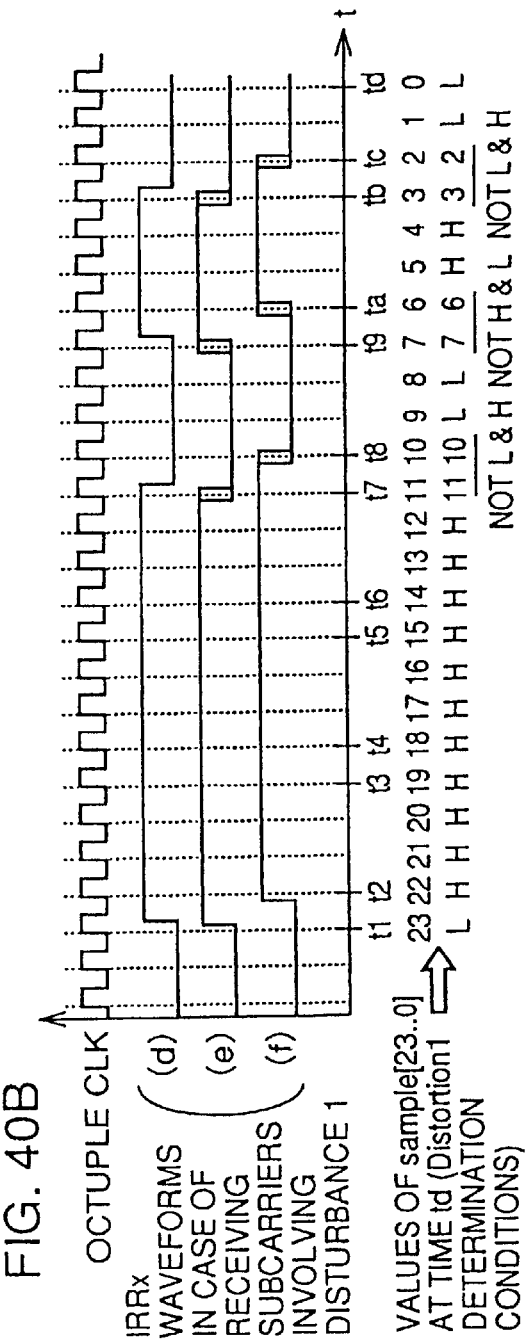

FIGS. 40A to 40C are timing charts showing sampling in the IRRx sampling circuit 51. Referring to FIGS. 40A and 40C, (a) to (c) and (g) to (i) are identical to those described with reference to (a) to (f) in FIGS. 14A and 14B, and hence description will not be repeated here. FIGS. 40A to 40C show IRRx waveforms providing all sample patterns assumed in such a case that a non-emitting section next to a first light emitting section of three continuous subcarriers is replaced with a light emitting section and rising between times t1 and t2 at (d) to (f) in the form of a timing chart. For the same reason as that described with reference to (a) to (c) in FIG. 14A, sample[11] and sample[10] signals and sample [3] and sample[2] signals can never go low and high respectively, and sample[7] and sample[6] signals can never go high and low respectively.

A circuit detecting that three subcarriers are continuously inputted and a circuit (Distortion2 signal output circuit) detecting that the central light emitting section of the three continuous subcarriers is replaced with a non-emitting section are similar to the Carrier condition determination circuit 52a and the Distortion signal output circuit 52b shown in FIGS. 15A and 15B respectively, and hence description will not be repeated here.

Figure 41:
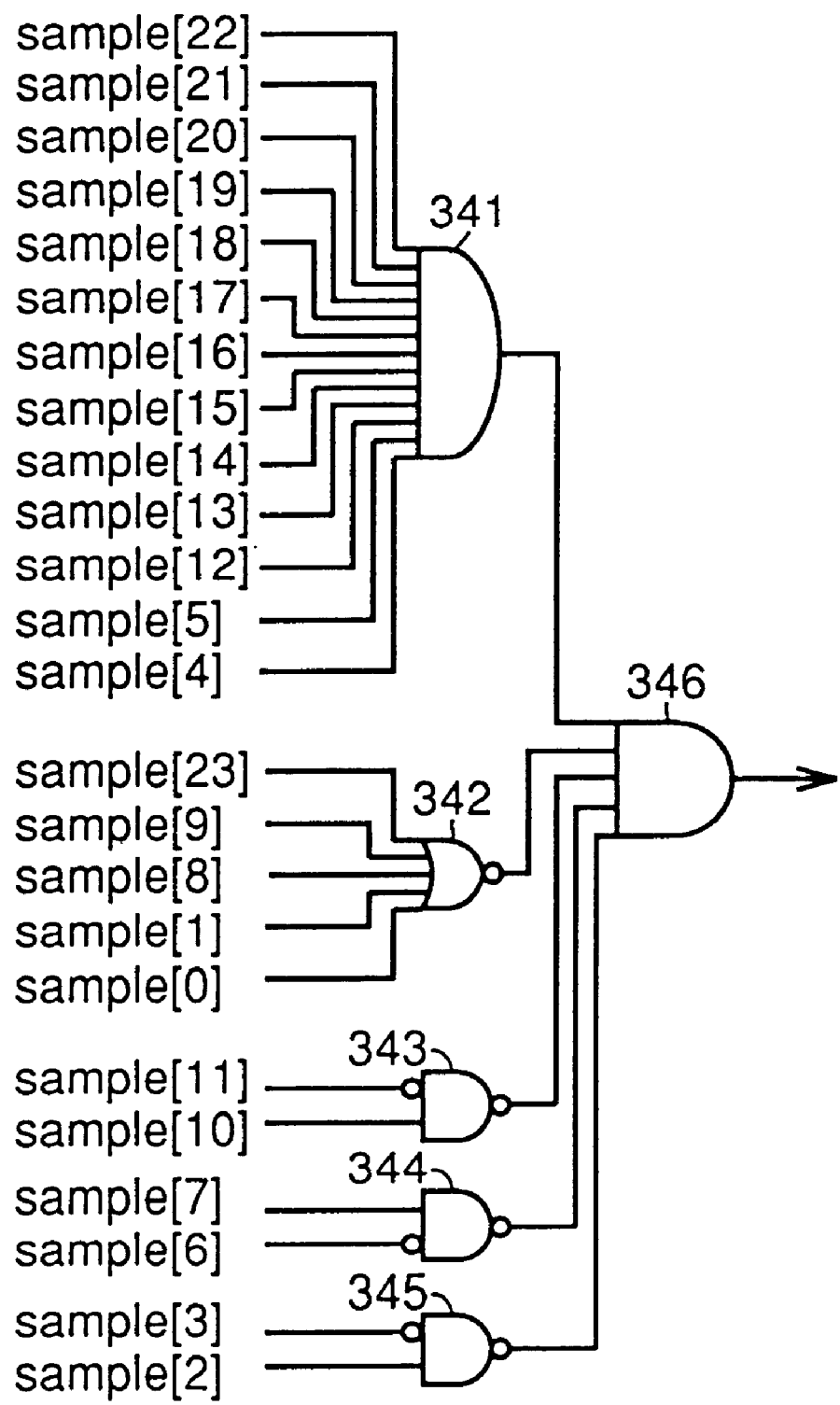
FIG. 41 illustrates the internal structure of a waveform pattern matching circuit according to the fifth embodiment.

FIG. 41 shows the Distortionl signal output circuit 323 appearing in FIG. 39, which is adapted to detect that the subcarriers having a non-emitting section, following the first light emitting section, replaced with an emitting section are inputted. Namely, this circuit generates pulses only when Distortionl determination conditions shown in FIG. 40B are satisfied. An AND gate 341 becomes "1" when all of sample[22] to sample[12], sample[5] and sample[4] signals are "1". A NOR gate 342 becomes "1" when all of sample [23], sample[9], sample[8], sample[1] and sample[0] signals are "0". NAND gates 343 and 345 become "1" when sample[11] and sample[10] signals and sample[3] and sample[2] signals are not at low and high levels respectively. A NAND gate 344 becomes "1" when sample[7] and sample[6] signals are not at high and low levels respectively. An output of an AND gate 346 becomes "1" when all of the AND gate 341, the NOR gate 342 and the NAND gates 343 to 345 become "1", i.e., when the Distortionl determination conditions shown in FIG. 40B are satisfied.

Figure 42:
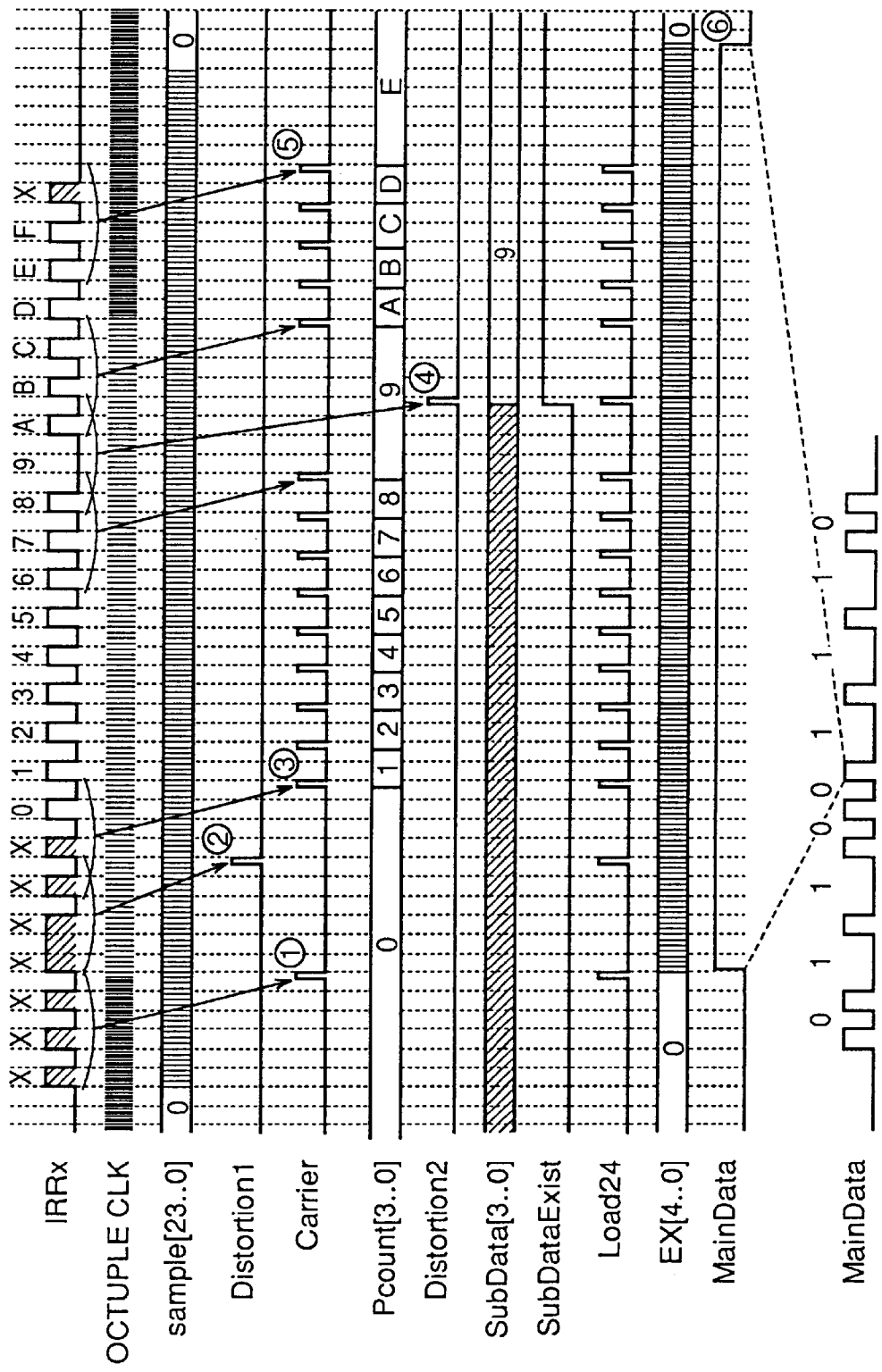
FIG. 42 is a timing chart of the main/subdata demodulation part according to the fifth embodiment.

Referring to FIG. 42, the waveform pattern matching circuit 321 detects first continuous three pulses of an IRRx signal, and outputs a Carrier signal at the timing ①. Further, the waveform pattern matching circuit 321 outputs a pulse for the Distortionl signal at the timing ② when the disturbance 1 is inputted. A value 0H (all outputs Pcount[3..0] are "0") is set in the pulse counter 322 which is a 4-bit counter, and the pulse counter 322 performs a count-up operation every time the Carrier signal becomes "1" after a pulse is inputted in the Distortionl signal. Therefore, the pulse counter 322 outputs 1H at the timing ③.

The waveform pattern matching circuit 321 generates a pulse every time the inputted sample[23..0] signals satisfy Carrier determination conditions shown in FIG. 40A, whereby a pulse is outputted for the Carrier signal every time one pulse of the IRRx signal is inputted until a non-emitting section "8" of the IRRx signal is inputted. Therefore, nine pulses of the Carrier signal are outputted after the pulse is inputted in the Distortionl signal until a light emitting section "9" of the IRRx signal replaced with a non-emitting section is inputted in the IRRx sampling circuit 51. Consequently, the count value of the pulse counter 322 becomes 9H.

On the other hand, a Load24 signal outputted from an OR gate 524 receiving the Carrier signal and the Distortion1 and Distortion2 signals is inputted in a load terminal of the zero stop-down counter 55. An octuple CLK signal is inputted in a C terminal of the zero stop-down counter 55. Therefore, the zero stop-down counter 55 loads a value 24 (decimal) and then starts a count-down operation every time a pulse is outputted for the Carrier signal or the Distortion1 or Distortion2 signal.

Outputs EX[4..0] of the zero stop-down counter 55 are inputted in the five-input OR gate 56. Further, an output of the OR gate 56 is inputted in a D terminal of the D flip-flop 59. The octuple CLK signal is inputted in a C terminal of the D flip-flop 59. The OR gate 56 outputs "1" when the count value of the zero stop-down counter 55 is other than 0H, and hence a MainData signal becomes "1" on the leading edge of the octuple CLK signal after the Carrier signal becomes "1" and falls (timing ① in FIG. 42).

The carrier condition determination circuit 52a outputs no pulse for the Carrier signal for a period of four cycles of subcarriers when the light emitting section "9" replaced with a non-emitting section is inputted. The Distortion1 signal output circuit 526 detects Distortion2 determination conditions shown in FIG. 40C and outputs a pulse for the Distortion2 signal at the timing ④ in FIG. 42.

The missing pulse position detecting circuit 57 is formed by a 4-bit D flip-flip which is a circuit holding the outputs Pcount[3..0] of the pulse counter 322 on the leading edge of the Distortion2 signal. As shown in FIG. 42, the missing pulse position detecting circuit 57 holds the value of the pulse counter 322 at the timing ④, and outputs the held value 9H for the SubData[3..0] signals. The Distortion signal and a voltage Vcc (+5 V) are inputted in C and D terminals of the D flip-flop 58 respectively, whereby the SubDataExist signal becomes "1" at the timing ④. A computer or the like connected with the digital optical receiver detects that the SubDataExist signal becomes "1", recognizes that subdata are superposed on the subcarriers, and recognizes the contents of the subdata by reading the SubData[3..0] signals.

When a non-emitting section "C" of the IRRx signal is inputted in the IRRx sampling circuit 51, the Carrier determination conditions are satisfied again and hence outputting of the Carrier signal is re-started. When the final pulse "X" of the IRRx signal is thereafter inputted in the IRRx sampling circuit 51, the waveform pattern matching circuit 321 outputs the final Carrier signal, as shown at the timing ⑤ in FIG. 42. At the same time, the final pulse is inputted in a Load24 signal input of the zero stop-down counter 55. After the zero stop-down counter 55 loads the value 24 first (① in FIG. 42) and starts the count-down operation, the value is loaded again before the count value becomes 0H and hence the output of the OR gate 56 remains "1". After the timing ⑤ in FIG. 42, however, the Load24 signal does not become "1" and hence the zero stop-down counter 55 outputs 0H when the octuple CLK signal is inputted by 24 clocks. Consequently, the OR gate 56 outputs "0" and the MainData signal becomes "0" after one clock of the octuple CLK signal (⑥ in FIG. 42). Therefore, it can be said that the zero stop-down counter 55 serves the function of regulating the length of the main data to the normal one (24 cycles of the subcarriers).

As hereinabove described, the digital optical transmitter 10 superposes subdata on main data by adding disturbances 1 and 2 to subcarriers, and the digital optical receiver 14 extracts the subdata superposed on the main data by detecting the disturbances 1 and 2 added to the subcarriers.

While the fifth embodiment is adapted to add the disturbances 1 and 2 by replacing the non-emitting sections in the subcarriers with light emitting sections, and by replacing the light emitting sections with non-emitting sections respectively, the disturbances 1 and 2 can be added to the subcarriers by any of the methods described with reference to the first through third embodiment.

Figure 43:
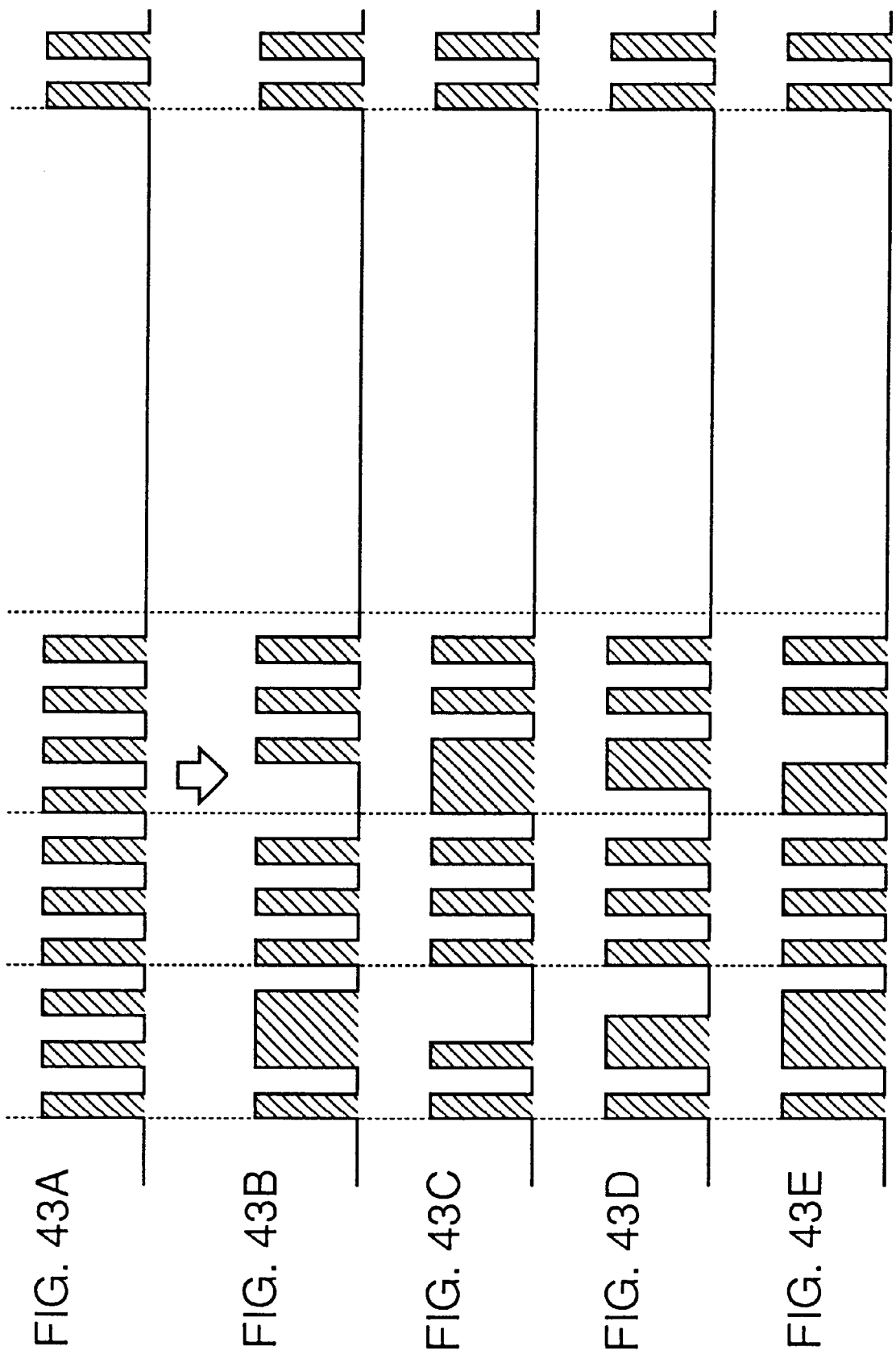
FIGS. 43A to 43E are adapted to illustrate a method of adding disturbances 1 and 2.

Namely, it is also possible to add the disturbances 1 and 2 by replacing light emitting sections with non-emitting sections, and by replacing non-emitting sections with light emitting sections respectively as shown in FIG. 43C, in place of the method according to the embodiment 5 shown in FIG. 43B.

Alternatively, it is also possible to add the disturbances 1 and 2 by displacing light emitting sections frontward and rearward respectively as shown in FIG. 43D.

Or, it is also possible to add the disturbances 1 and 2 by replacing non-emitting sections with light emitting sections and displacing light emitting sections frontward respectively, as shown in FIG. 43E.

As hereinabove described, disturbances 1 and 2 are added to subcarriers for superposing subdata at relative time intervals therebetween, whereby the subdata can be correctly extracted from main data even if first several pulses of the subcarriers are lost.

While the subdata are superposed on subcarriers in the ASK modulation system according to the embodiments 1 to 5, it is also possible to perform optical communication by superposing subdata on subcarriers in the FSK or PSK modulation system.

Figure 44:
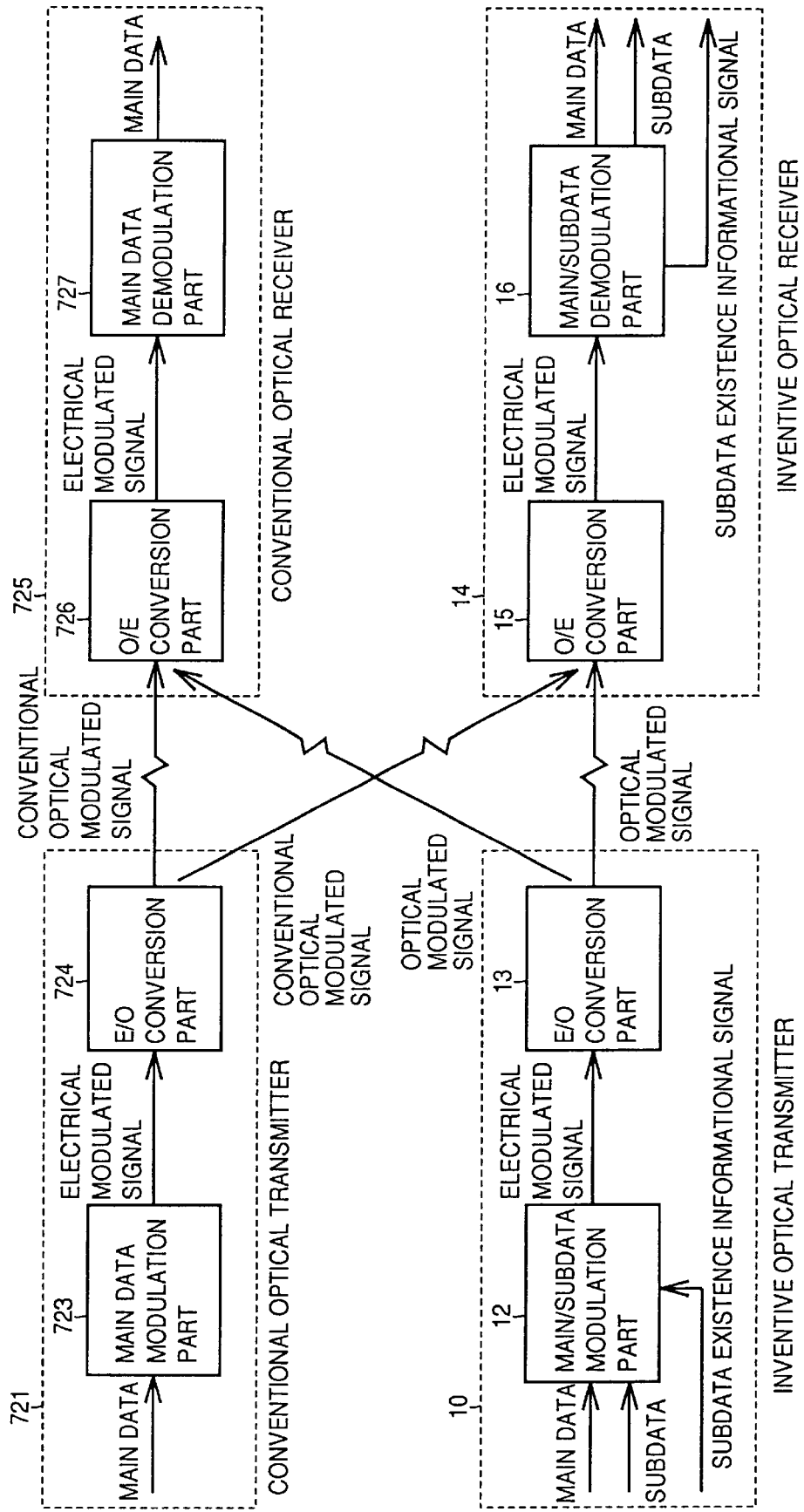
FIG. 44 illustrates communication between the digital optical transmitter according to the present invention and a conventional digital optical receiver and that between a conventional digital optical transmitter and the digital optical receiver according to the present invention.

FIG. 44 illustrates communication between the inventive digital optical transmitter 10 and the conventional digital optical receiver 724, and that between the conventional digital optical transmitter 721 and the inventive digital optical receiver 14.

When the optical modulated signal from the inventive optical transmitter 10 is inputted in the conventional optical receiver 725, respective parts in the O/E conversion part 726 and the main data demodulation part 727 exhibit waveforms shown in FIGS. 45B to 45E. Referring to FIGS. 45A to 45E, the main data demodulation part 727 employs the ASK modulation system, for example. When the waveform (FIG. 45B) replacing the light emitting sections with the non-emitting sections shown in the embodiment 1 is inputted in the photoreceptor 731, the waveform shown in FIG. 45C is inputted in the rectifier 735. FIG. 45D shows the waveform obtained by integrating the output from the rectifier 735 by the integrator 736. While distortions take place in the positions where the light emitting sections are replaced with the non-emitting sections, the voltage is higher than the threshold level for conversion from a high level to a low level shown by a dotted line, and hence the ASK modulation part 727 outputs general main data as shown in FIG. 45E. Therefore, no problem arises in operation.

When the optical modulated signal from the conventional digital optical transmitter 721 is inputted in the inventive digital optical receiver 14, on the other hand, the subdata existence informational signal SubDataExist (FIGS. 12, 20, 27, 34 or 42) described with reference to each of the first through fifth embodiment does not become "1". Therefore, the computer or the like connected with the inventive digital optical receiver 14 performs processing on the assumption that there are no subdata, and no problem arises in operation.

According to each of the first through third embodiment, therefore, it is possible to increase the data communication channel capacity as compared with the conventional digital optical communication device while keeping compatibility therewith.

While the subdata are superposed by operating only single pulses of the subcarriers in each embodiment, it is also possible to superpose subdata by operating plural pulses of the subcarriers in one bit of the main data. However, the voltage must not be lower than the threshold level by a distortion of the waveform, as shown in FIG. 45D.

It is also possible to combine the main/subdata modulation parts 12a to 12c described with reference to the first through third embodiment with each other. When the outputs of the main/subdata modulation parts 12a to 12c are inputted in a three-input selector for switching the selector in units of symbols, generating an electrical modulated signal and inputting the same in the E/O conversion part 13, for example, it is possible to replace light emitting sections with non-emitting sections or vice versa, or displace the light emitting sections in units of symbols.

In this case, the outputs of the main/subdata demodulation parts 16a to 16c may be inputted in a three-input selector for switching the selector in units of symbols and reading subdata on the digital optical receiver side. According to this method, it is possible to provide a digital optical transmitter and a digital optical receiver which are further superior in security.

Figures 46A, 46B, 46C, 46D, 46E:
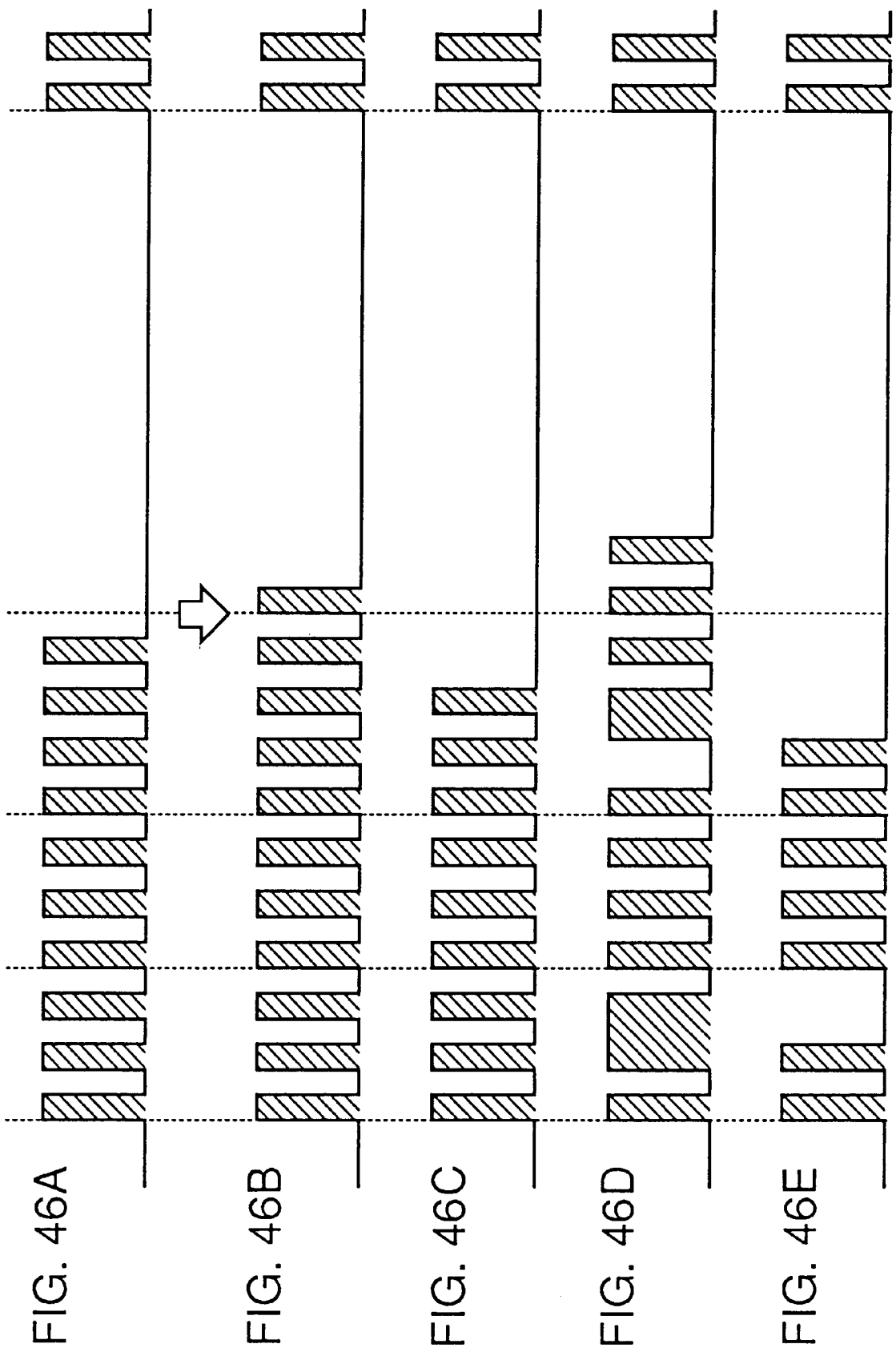
FIGS. 46A to 46E illustrate a method of superposing subdata on other main data.

FIG. 46B shows the case where subdata is superposed with the symbol section set greater than that of a normal symbol section (FIG. 46A). The value of subdata is determined by the level of increase of the symbol section. FIG. 46C shows the case where subdata is superposed with the symbol section set smaller than that of a normal symbol section. The value of subdata is determined by the reduced level of the symbol section. FIG. 46D shows a combination of the method of FIG. 46B and the methods of the second and third embodiment. FIG. 46E shows a combination of the method of FIG. 46C and the method of the first embodiment.

Figure 47:
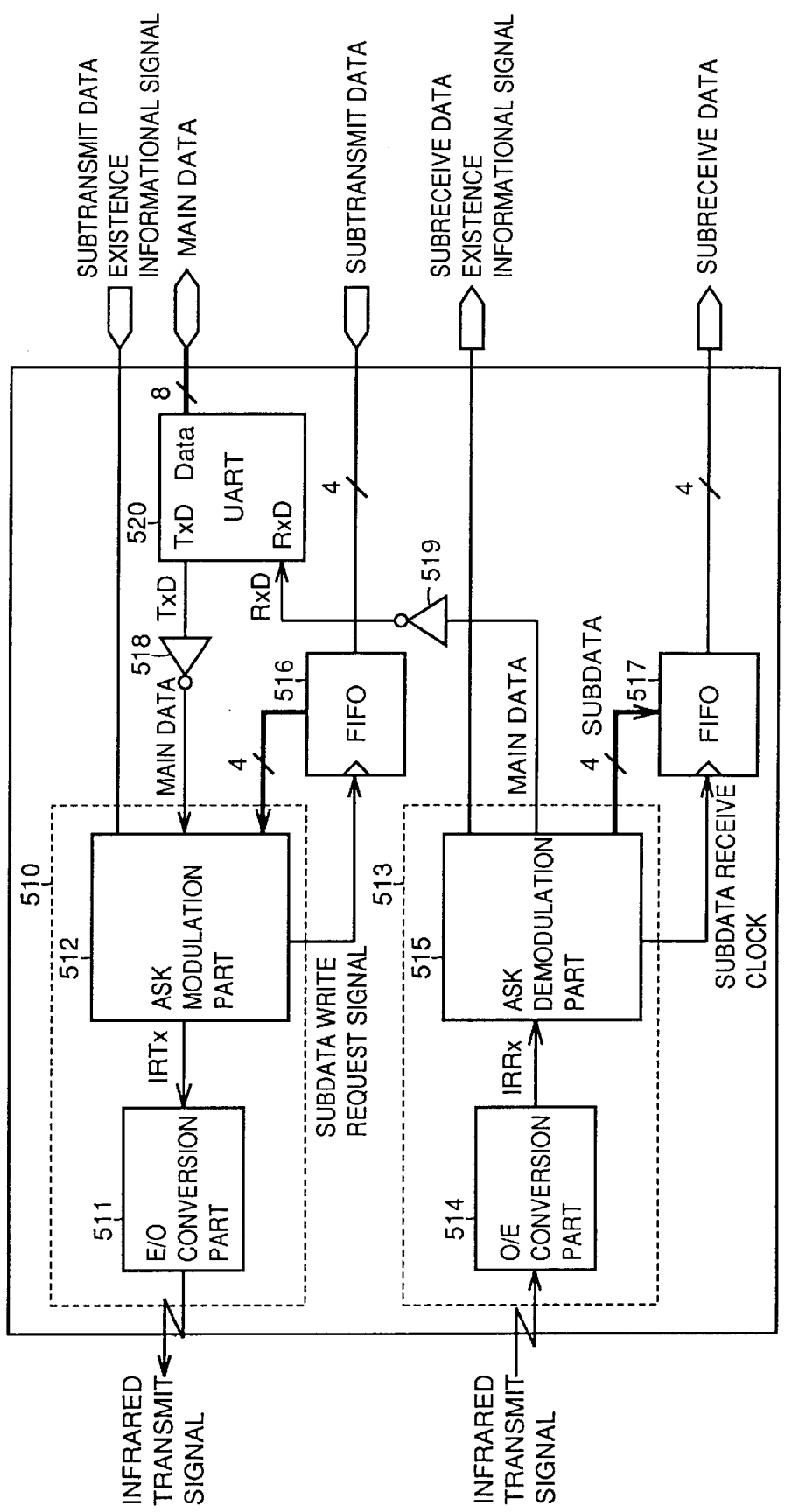
FIG. 47 is a block diagram showing the internal structure of a digital optical communication device according to a sixth embodiment of the present invention.

FIG. 47 illustrates a sixth embodiment of the present application. Referring to FIG. 47, a digital optical communication device includes an ASK transmitter 510 including an ASK modulation part 512 for superposing subdata on main data and outputting the data as an electrical modulated signal and an E/O conversion part 511 for converting the electrical modulated signal to an optical modulated signal and outputting the same, an ASK receiver 513 including an O/E conversion part 514 for converting the optical modulated signal to an electrical modulated signal and outputting the same and an ASK demodulation part 515 for receiving the electrical modulated signal and separating the subdata from the main data, an FIFO buffer 516 for buffering subtransmit data, an FIFO buffer 517 for buffering subreceive data, inverters 518 and 519, and an UART 520 for parallel-to-serial conversion.

In this embodiment, it is assumed that the transfer rate is 19200 bps, and the frequency of subcarriers is 500 KHz. Therefore, it follows that the interval of one symbol is 52.08 $\mu$s, and 26 slots exist per symbol.

When the ASK transmitter 510 outputs an infrared transmit signal (optical modulated signal), subtransmit data are inputted from a computer (not shown) or the like in the FIFO buffer 516 in synchronization with or in advance of inputting of the main data in the ASK transmitter 510.

The computer (not shown) or the like makes a subtransmit data existence informational signal "1" (active), and informs the ASK modulation part 512 of the existence of subdata. When the computer (not shown) or the like outputs 8-bit main transmit data to the UART 520, the UART 520 converts the 8-bit main transmission data to serial data TxD, and the inverter 518 inputs its inverted signal in the ASK modulation part 512 as main data. When the main data are inputted, the ASK modulation part 512 inputs the subdata from the FIFO buffer 516 and superposes the same on the main data, and the E/O conversion part 511 converts the data to an optical modulated signal and outputs this signal.

When an infrared receive signal (optical modulated signal) is inputted in the ASK receiver 513, the O/E conversion part 514 converts the inputted infrared receiving signal to an electrical signal IRRx. The ASK demodulation part 515 demodulates the main data from the electrical signal IRRx along with the subdata if the same are superposed. After demodulating the subdata, the ASK demodulation part 515 outputs a pulse for a subdata receive clock signal and writes the subdata in the FIFO buffer 517, and makes a subreceive data existence informational signal "1" (active) for informing the computer (not shown) or the like of the existence of the subreceive data.

On the other hand, the inverter 519 inverts the demodulated main data and inputs the same in the UART 520 as an RxD signal. The UART 520 converts the RxD signal which is serial data to 8-bit data, and outputs the same to the computer (not shown) or the like.

Figure 48:
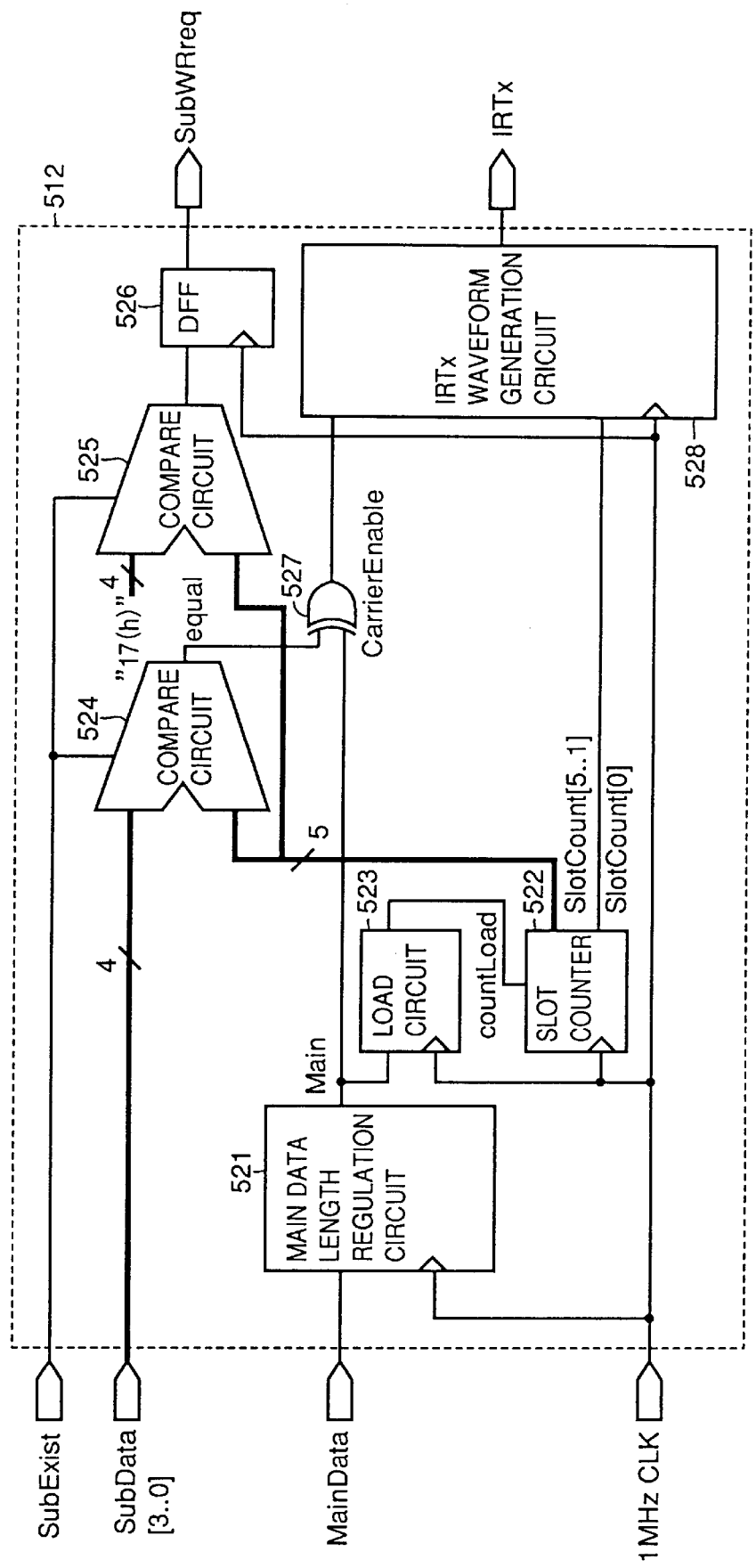
FIG. 48 is a block diagram showing the internal structure of an ASK modulation part 512 according to the sixth embodiment of the present invention.

Referring to FIG. 48, the ASK modulation part 512 includes a main data length regulation circuit 521 for synchronizing the main data with a 1 MHzCLK signal and outputting the same, a slot counter 522 for counting the number of slots, a load circuit 523 for generating a timing signal for loading a prescribed value in the slot counter 522, compare circuits 524 and 525, a D flip-flop 526, an EXOR gate 527, and an IRTx waveform generation circuit 528 for generating subcarriers involving the subdata.

The main data length regulation circuit 521 synchronizes a main data signal received from the inverter 518 with the 1 MHzCLK signal. This synchronization can be implemented by inputting the main data (MainData) signal and the 1 MHzCLK signal in D (data) and C (clock) terminals of the D flip-flop 526 respectively, for example. The synchronized signal is inputted in the load circuit 523 and the EXOR gate 527 as a Main signal.

Figure 49:
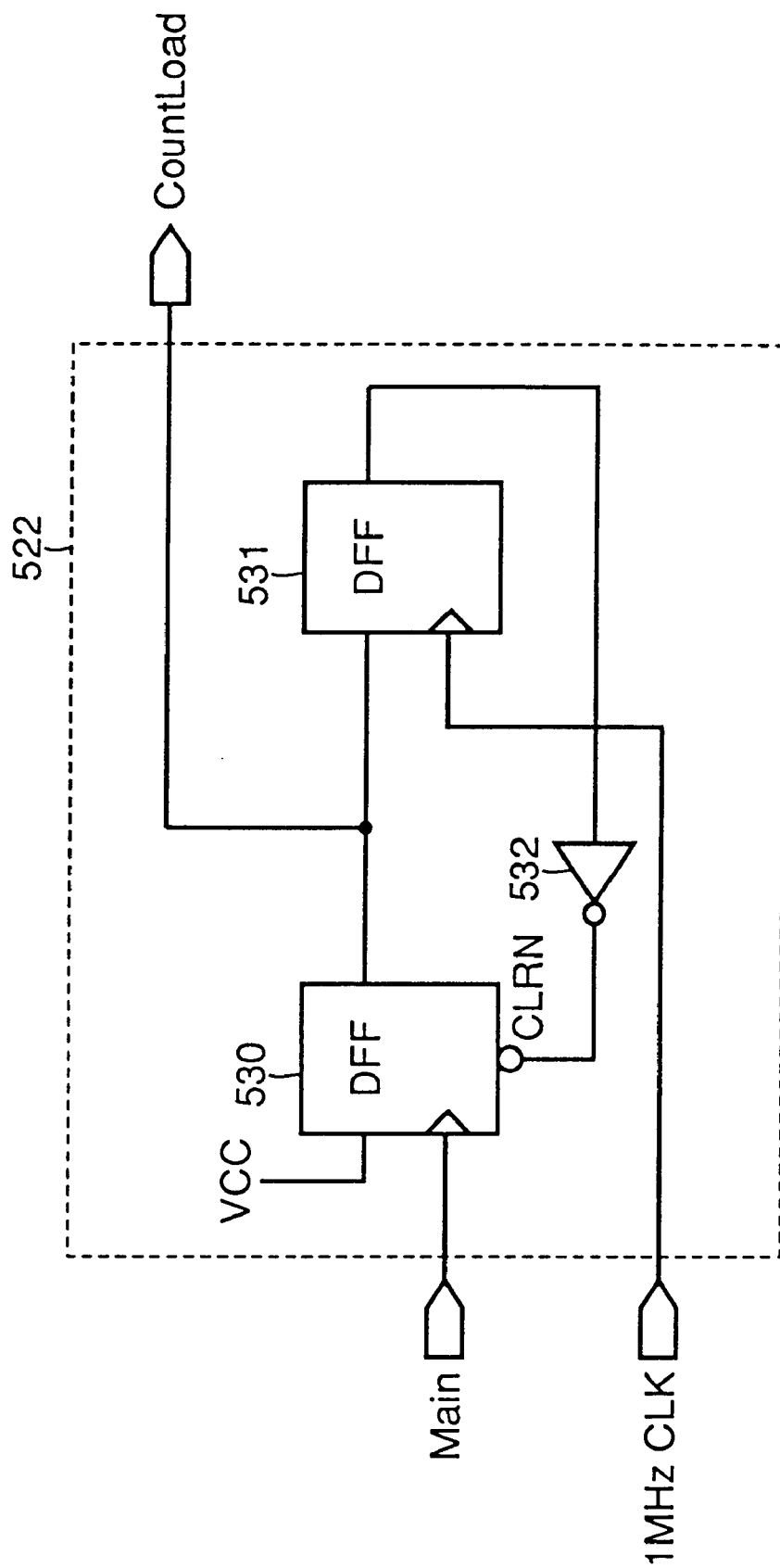
FIG. 49 is a block diagram showing the structure of a load circuit 523 of an ASK transmitter 510.

The load circuit 523 includes D flip-flops 530 and 531 and an inverter 532, as shown in FIG. 49. The load circuit 523 detects the leading edge of the Main signal, and outputs a pulse for one clock of the 1 MHzCLK signal for a CountLoad signal.

The slot counter 522 is formed by a 6-bit counter, and loads a prescribed value on the leading edge of the CountLoad signal asynchronously with the 1 MHzCLK signal. A signal of the least significant bit SlotCount[0] of the slot counter 522 is used in case of generating the subcarriers. Initial values 17H and 0 are respectively loaded on high-order bits SlotCount[5..1] and the least significant bit SlotCount[0] of the slot counter 522, which performs a count-up operation every time the 1 MHzCLK signal is inputted after the CountLoad signal becomes "1". Noting only the high-order bits count[5..1], the slot counter 522 seems to perform a count-up operation every time the 1 MHzCLK signal is inputted twice.

The compare circuit 524 outputs "0" for an equal signal when a subdata existence informational (SubExist) signal is "0" (inactive). When the SubExist signal is "1" (active), on the other hand, the compare circuit 524 outputs "1" if the subdata (SubData[3..0]) coincide with the high-order bit outputs (SlotCount[5..1]) of the slot counter 522, otherwise outputting "0". The SlotCount[5] signal is regularly compared with "0", while the SlotCount[4..1] signals are compared with the SubData[3..0] signals respectively.

The compare circuit 525 outputs "0" when the subdata existence informational (SubExist) signal is "0" (active). When the SubExist signal is "1" (active), on the other hand, the compare circuit 525 outputs "1" if the high-order outputs (SlotCount[5..1]) of the slot counter 522 coincide with "17h", otherwise outputting "0".

Figure 51:
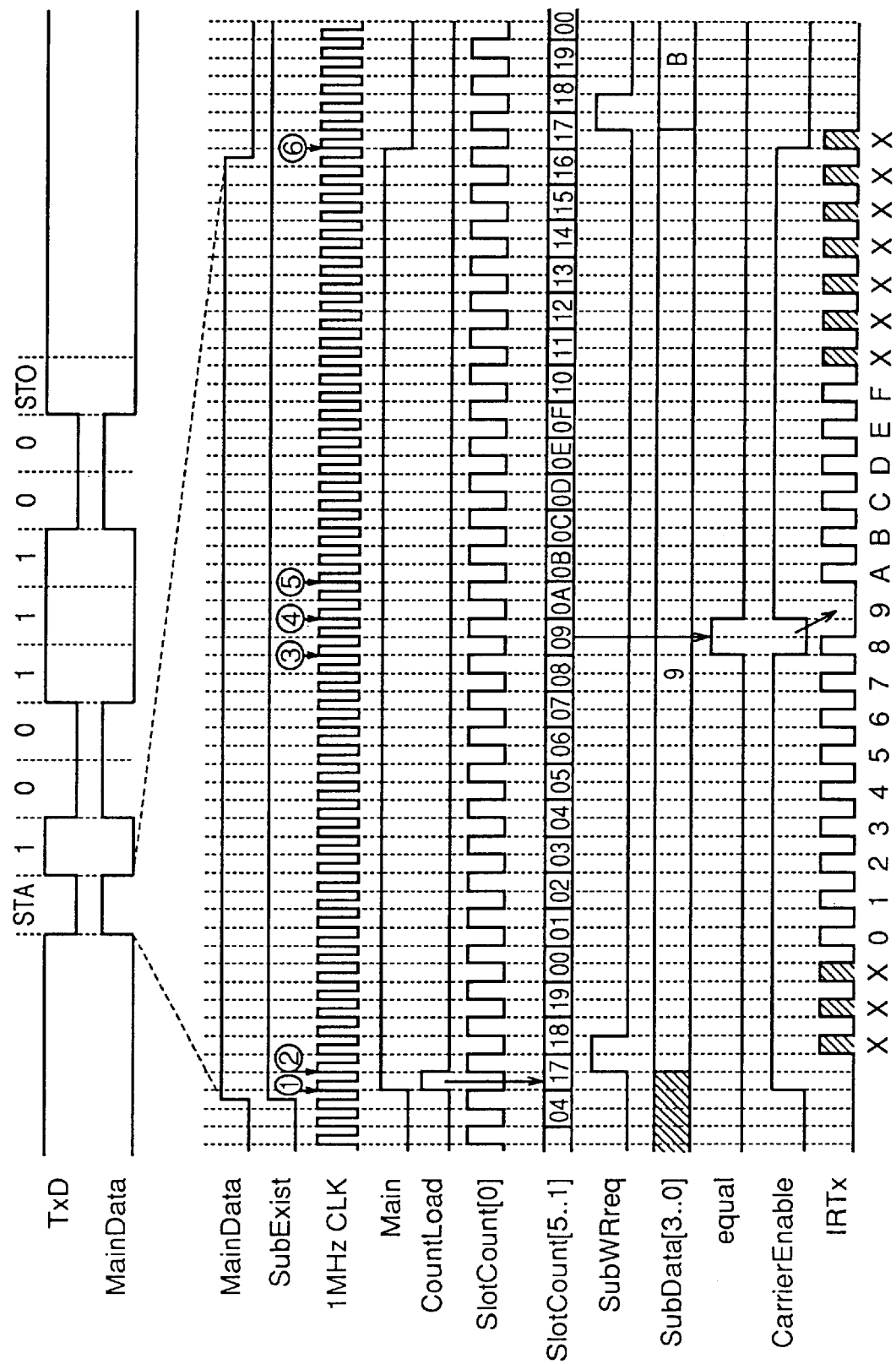
FIG. 51 is a timing chart (1) of an ASK modulation part according to the sixth embodiment.

Referring to FIG. 51, the Main signal becomes "1" at the timing ① when the main data MainData signal becomes "1". The load circuit 523 outputs a pulse for the CountLoad signal at the same timing. The slot counter 522 asynchronously loads the value "17h" on the leading edge of the CountLoad signal. The compare circuit 525 outputs "1" at the timing ①, and hence a SubWRreq signal becomes "1" at the timing ②. Namely, a subdata write request signal is outputted to the FIFO buffer 516, for inputting the subdata.

The slot counter 522 counts the high-order bits SlotCount[5..1] from the count value 17H, not to replace light emitting sections (first three pulses denoted by "X" in the IRTx waveform) of first three slots of the subcarriers with non-emitting sections. If any of the first three light emitting sections of the subcarriers is replaced with a non-emitting section in case of regenerating the main data from the optical signal in the ASK receiver 513, displacement results in the rise timing of the main data. In order to prevent this, therefore, the first three light emitting sections are not replaced with non-emitting sections.

Figure 50:
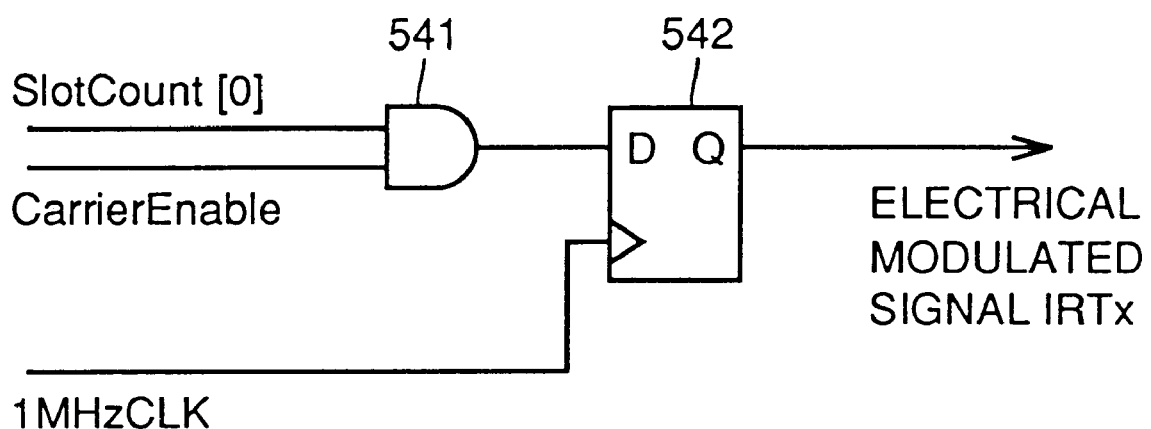
FIG. 50 illustrates the internal structure of an IRTx waveform generation circuit 528.

According to this embodiment, 26 pulses of subcarriers are involved in one bit of main data, and first three pulses are necessarily rendered light emitting sections, and any of light emitting sections of following 16 pulses is replaced with a non-emitting section for superposing subdata. Further, subsequent seven pulses are necessarily rendered light emitting sections. The slot counter 522 repeats a count-up operation, and the value of the slot counter high-order bits SlotCount[5..1] becomes 09H on the leading edge of the 1 MHzCLK signal at ③ in FIG. 51. The value 09H is set for the SubData[3..0] signals by the FIFO buffer 516 and the SubExist signal is "1" (active), and hence the equal signal outputted from the compare circuit 524 becomes "1" for a time of two clocks of the 1 MHzCLK signal. The equal signal is inputted in the EXOR gate 527 as shown in FIG. 48 and the Main signal is inputted in one terminal of the EXOR gate 527, whereby the CarrierEnable signal becomes "0" at the timing ③. The CarrierEnable signal is inputted in the AND gate 541 as shown in the IRTx waveform generation circuit in FIG. 50, and the SlotCount[0] signal is inputted in one input of the AND gate 541. Further, an output of the AND gate 541 and the 1 MHzCLK signal are inputted in D and C terminals of the D flip-flop 542 respectively. Therefore, the AND gate 541 outputs the SlotCount[0] signal as such after the CarrierEnable signal becomes "1" at the timing ①, whereby the D flip-flop 542 outputs the IRTx signal which has the same signal waveform as the SlotCount[0] signal in a delay by a time corresponding to one clock of the 1 MHzCLK signal. When the CarrierEnable signal becomes "0" at the timing ③, however, the AND gate 542 masks the SlotCount[0] signal, and hence the IRTx signal does not become "1" at the timing ④ in FIG. 51.

At the timing ⑤ in FIG. 51, the CarrierEnable signal returns to "1" again and hence outputting of the subcarriers forming the IRTx signal is re-started. The MainData signal becomes "0" and the Main signal becomes "0" at the timing ⑥, whereby the CarrierEnable signal becomes "0" and the SlotCount[0] signal is masked by the AND gate 541 at the timing following the timing ⑥, and no subcarriers are outputted for the IRTx signal. Thus, 4-bit information can be superposed with respect to one bit of main data as the subdata.

Figure 52:
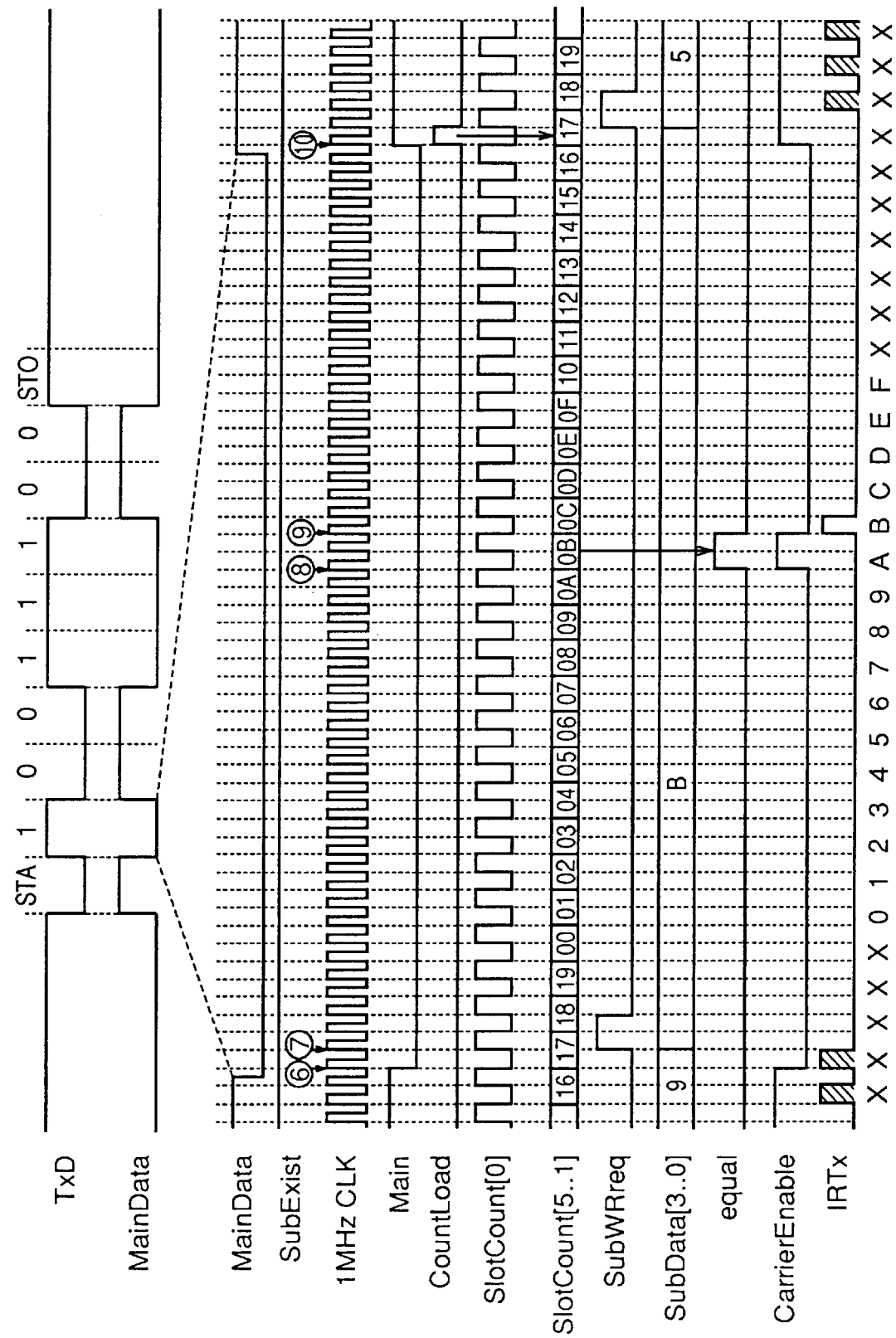
FIG. 52 is a timing chart (2) of the ASK modulation part according to the sixth embodiment.

At the timing ⑥ in FIG. 52 (⑥ in FIG. 51), the value of the SlotCount[5..1] signal becomes 17H again, and the SubWReq signal becomes "1" at the timing ⑦. The FIFO buffer 516 outputs next subdata BH on the leading edge of the SubWReq signal. The CarrierEnable signal becomes "0" at the timing ⑥, whereby the IRTx waveform generation circuit outputs no subcarriers.

The slot counter 522 repeats the count-up operation and the SlotCount[5..1] signals become 0BH at the timing ⑧, whereby the equal signal becomes "1". At this time, the EXOR gate 527 outputs "1" since the Main signal is "0". Therefore, one pulse is outputted for the IRTx signal at the timing ⑨. Thereafter no pulse is outputted for the IRTx signal, and an operation identical to that described with reference to FIG. 51 is performed after the timing ①.

Thus, it is possible to superpose pulses on non-emitting symbols, for superposing subdata by the positions. Namely, it is possible to superpose 4-bit subdata with respect to a single non-emitting symbol.

Figure 53:
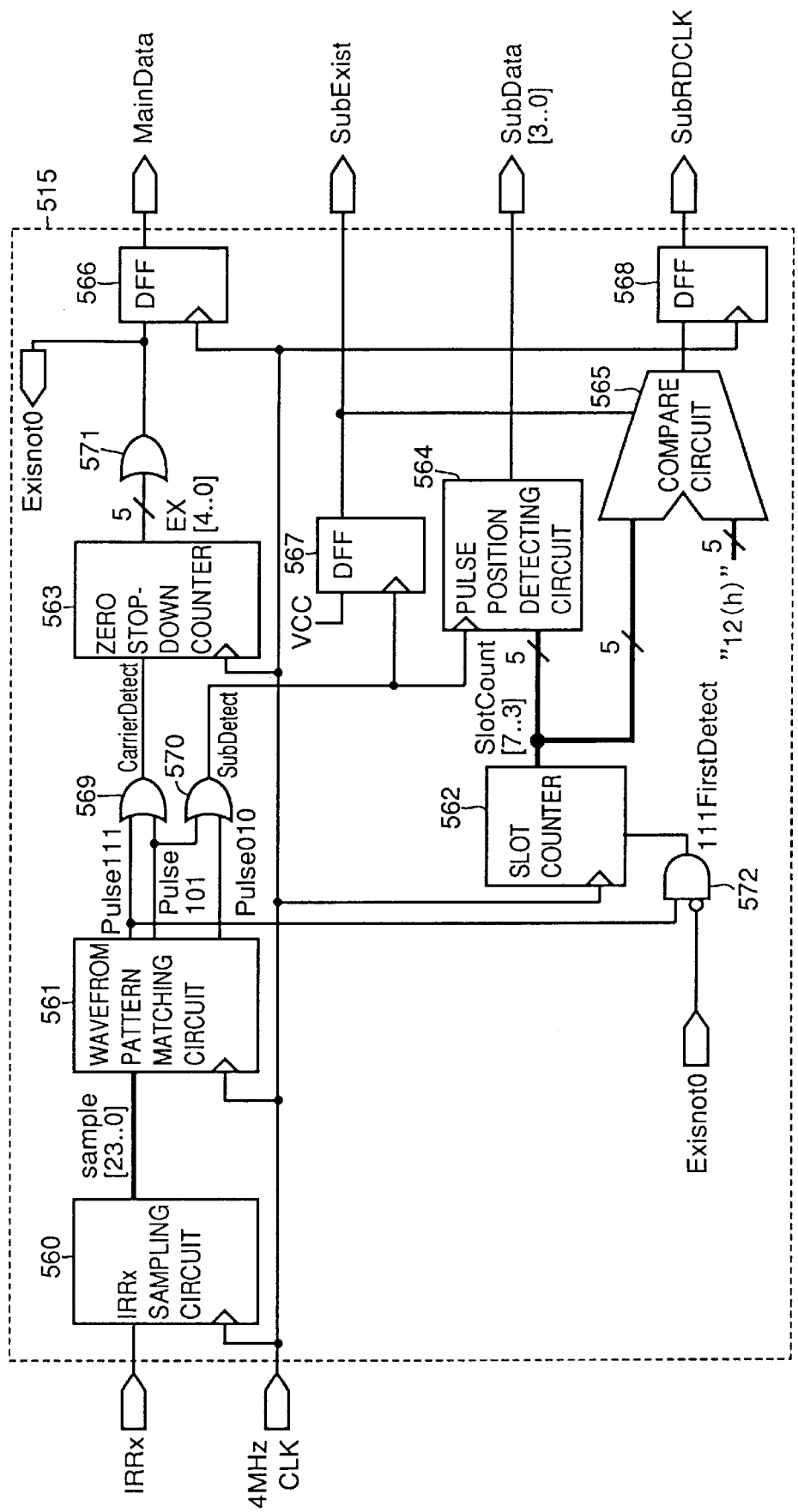
FIG. 53 is a block diagram showing the internal structure of an ASK demodulation part 515 according to the sixth embodiment.

Referring to FIG. 53, the ASK demodulation part 515 includes an IRRx sampling circuit 560 for sampling and outputting the electrical modulated signal IRRx, a waveform pattern matching circuit 561 for extracting a specific waveform from those sampled by the IRRx sampling circuit 560, a slot counter 562 for counting the value of slots of symbols, a zero stop-down counter 563 loading a prescribed value, starting a count-down operation, and stopping the count-down operation when the count value reaches zero, a pulse position detecting circuit 564 for detecting positions where light emitting sections in light emitting symbols are replaced with non-emitting sections or positions in non-emitting symbols superposed with pulses, a compare circuit 565, D flip-flops 566, 567 and 568, OR gates 569, 570 and 571 and an AND gate 572.

The IRRx sampling circuit 560 is formed by 24 stages of shift registers serially connecting 24 D flip-flops with each other, as shown in FIG. 13. A timing chart in the IRRx sampling circuit 560 is identical to that shown in FIGS. 14A and 14B, and hence description will not be repeated here.

Figure 54:
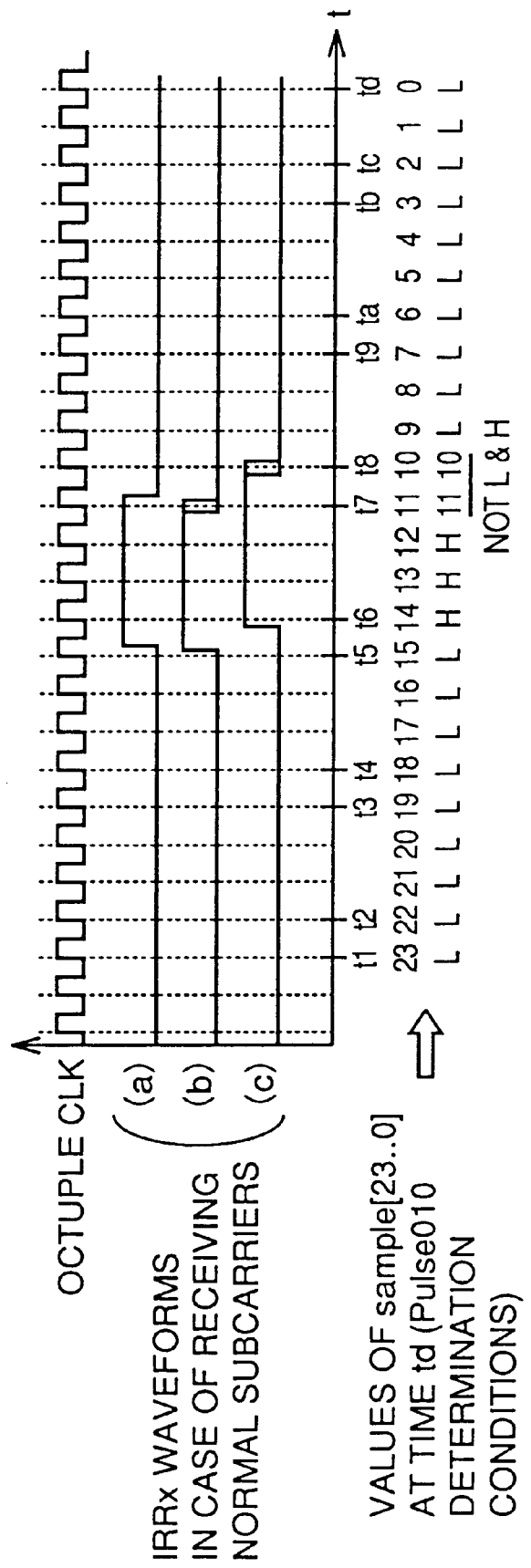
FIG. 54 is a timing chart in an IRRx sampling circuit according to the sixth embodiment.

FIG. 54 shows IRRx waveforms providing all sample patterns assumed in such a case that pulses are superposed in non-emitting symbols and rising between times t5 and t6 at (a) to (c) in the form of a timing chart. For the same reason as that described with reference to FIGS. 14A and 14B, sample[11] and sample[10] signals can never go low and high respectively.

A circuit detecting that three pulses of subcarriers are continuously inputted is identical to that shown in FIG. 15A, and hence description will not be repeated here.

Further, a circuit detecting that subcarriers having a central light emitting section replaced with a non-emitting section is identical to that shown in FIG. 15B, and hence description will not be repeated here.

Figure 55:
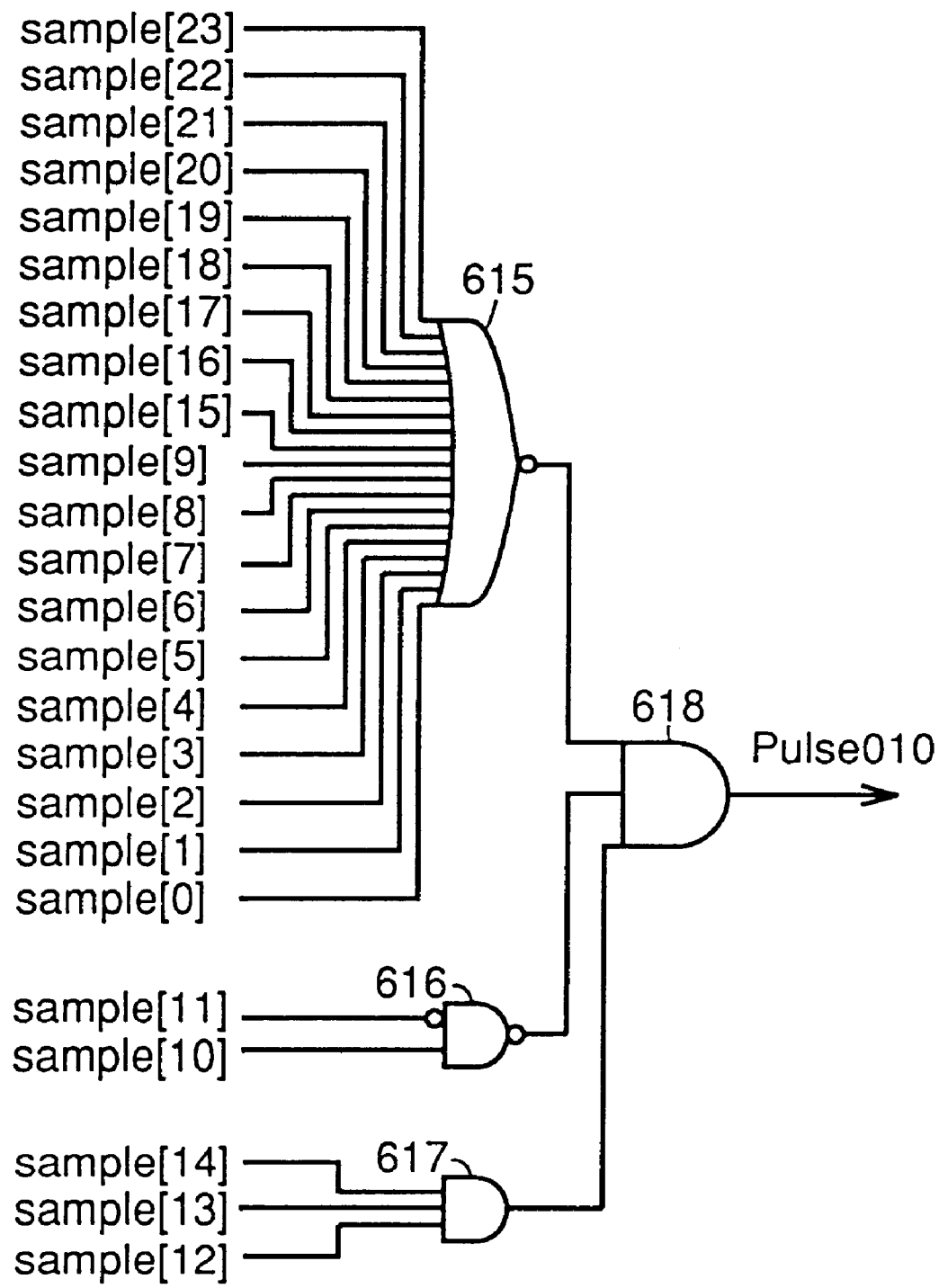
FIG. 55 illustrates the internal structure of a waveform pattern matching circuit according to the sixth embodiment.

FIG. 55 shows a circuit detecting that pulses are added into non-emitting symbols. Namely, this circuit generates pulses only when Pulse010 determination conditions shown in FIG. 54 are satisfied. A NOR gate 615 becomes "1" when all of sample[23] to sample[15] and sample[9] to sample[0] signals are "0". A NAND gate 616 becomes "1" when sample[11] and sample[10] signals are not at low and high levels respectively. An AND gate 617 becomes "1" when all of sample[14] to sample[12] signals become "1". An output of an AND gate 618 becomes "1" only when all of the NAND gates 615 and 616 and the AND gate 617 become "1", i.e., the Pulse010 determination conditions shown in FIG. 54 are satisfied.

Figure 56:
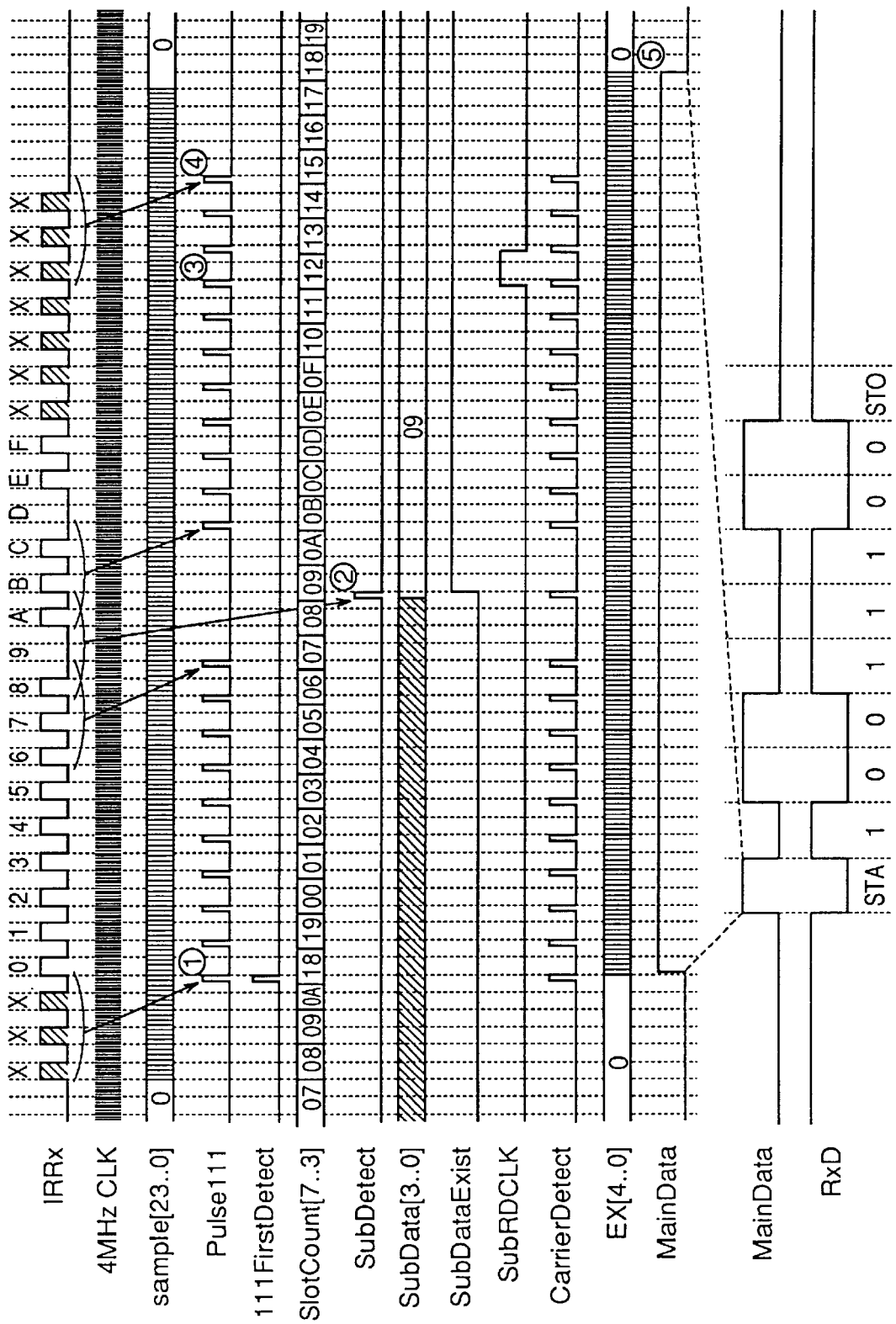
FIG. 56 is a timing chart (1) of the ASK demodulation part according to the sixth embodiment.

Referring to FIG. 56, the waveform pattern matching circuit 561 detects first continuous three pulses (three pulses shown by "X") of the IRRx signal, and outputs a Pulse111 signal at the timing ①. At this time, the zero stop-down counter 563 outputs a value 0H for EX[4..0] signals, and the OR gate 571 outputs "0". An Exisnot0 signal outputted from the OR gate 571 is "0", and hence the AND gate 572 receiving its inverted signal inputs a pulse of the Pulse111 signal in the slot counter 562 as a 111FirstDetect signal. When a pulse is outputted for the 111FirstDetect signal, the slot counter 562 loads a value 18H in high-order bits SlotCount[7..3] asynchronously with a 4 MHzCLK signal. Thereafter the slot counter 562 repeats a count-up operation on the leading edge of the 4 MHzCLK signal.

The waveform pattern matching circuit 561 outputs a pulse every time inputted sample[23..0] signals coincide with Pulse111 determination conditions shown in FIG. 14A, whereby a pulse is outputted for the Pulse111 signal every time one pulse of the IRRx signal is inputted until a pulse "8" of the IRRx signal is inputted. Therefore, 10 pulses of the Pulse111 signal are outputted before a light emitting section "9" of the IRRx signal replaced with a non-emitting section is inputted in the IRRx sampling circuit 560. Consequently, the count value of the high-order bits SlotCount[7..3] of the slot counter 562 becomes 09H.

On the other hand, a CarrierDetect signal outputted from the OR gate 569 receiving the Pulse111 signal and a Pulse101 signal is inputted in a load terminal of the zero stop-down counter 563. Further, the 4 MHzCLK signal is inputted in a C terminal of the zero stop-down counter 563. Therefore, the zero stop-down counter 563 loads a value 24 (decimal) and starts a count-down operation every time a pulse is outputted for the Pulse111 or Pulse101 signal.

The Ex[4..0] signals outputted from the zero stop-down counter 563 are inputted in the five-input OR gate 571, and an output of this OR gate 571 is inputted in a D terminal of the D flip-flop 566. The 4 MHzCLK signal is inputted in a C terminal of the D flip-flop 566. The OR gate 571 outputs "1" unless the count value of the zero stop-down counter 563 is 0H, whereby the MainData signal becomes "1" on the leading edge of the 4 MHzCLK signal after the CarrierDetect signal becomes "1" and falls (timing ① in FIG. 56).

When the subcarrier "9" replaced with a non-emitting section is inputted in the IRRx sampling circuit 560, no pulse is outputted for the Pulse111 signal for a period of four cycles of the subcarriers. The waveform pattern matching circuit 561 detects the Pulse101 determination conditions shown in FIG. 14B and outputs a pulse for a SubDetect signal at the timing ② in FIG. 56.

The pulse position detecting circuit 564 holds the SlotCount[7..3] signals outputted from the slot counter 562 on the leading edge of the SubDetect signal. This circuit is formed by a 4-bit D flip-flop. As shown in FIG. 56, the pulse position detecting circuit 564 holds the value of the slot counter 562 at the timing ②, and outputs the held value 9H for the SubData[3..0] signals. The SubDetect signal and a voltage Vcc (+5 V) are inputted in C and D terminals of the D flip-flop 567 respectively, whereby the SubDataExist signal becomes "1" at the timing ②. A computer or the like connected with the digital optical communication device detects that the SubDataExist signal becomes "1", recognizes that subdata are superposed on the subcarriers, and recognizes the contents of the subdata by reading subreceive data from the FIFO buffer 517.

The compare circuit 565 outputs "0" when the output of the D flip-flop 567 is "0". If the output of the D flip-flop 567 is "1", on the other hand, the compare circuit 565 outputs "1" only when the value of the high-order bits SlotCount [7..3] of the slot counter 562 coincides with "12H". Therefore, the compare circuit 565 outputs "1" at the timing ③, and a SubRDCLK signal becomes "1" on the next leading edge of the 4 MHzCLK signal.

The value of subdata SubData[3..0] is written in the FIFO buffer 517 on the leading edge of the SubRDCLK signal. When the final subcarrier "X" of the IRRx signal is thereafter inputted in the IRRx sampling circuit 560, the waveform pattern matching circuit 561 outputs the final Pulse111 signal, as shown at the timing ④ in FIG. 56. At the same time, the final pulse is inputted in the CarrierDetect signal inputted in the zero stop-down counter 563. After the zero stop-down counter 563 loads the value 24 first (① in FIG. 56) and starts the count-down operation, the value is loaded again before the count value becomes 0H and hence the output of the OR gate 571 remains "1". After the timing ④ in FIG. 56, however, the CarrierDetect signal does not become "1" and hence the zero stop-down counter 563 outputs 0H when the 4 MHzCLK signal is inputted by 24 clocks. Consequently, the OR gate 571 outputs "0" and the MainData signal becomes "0" after one clock of the 4 MHzCLK signal (⑤ in FIG. 56). Therefore, it can be said that the zero stop-down counter 563 serves the function of regulating the length of the main data to the normal one (26 cycles of the subcarriers).

The slot counter 562 further repeats the count-up operation, returns to 00H (⑥ in FIG. 57) after the value of the SlotCount[7..3] signals becomes 19H, and repeats the count-up operation.

Figure 57:
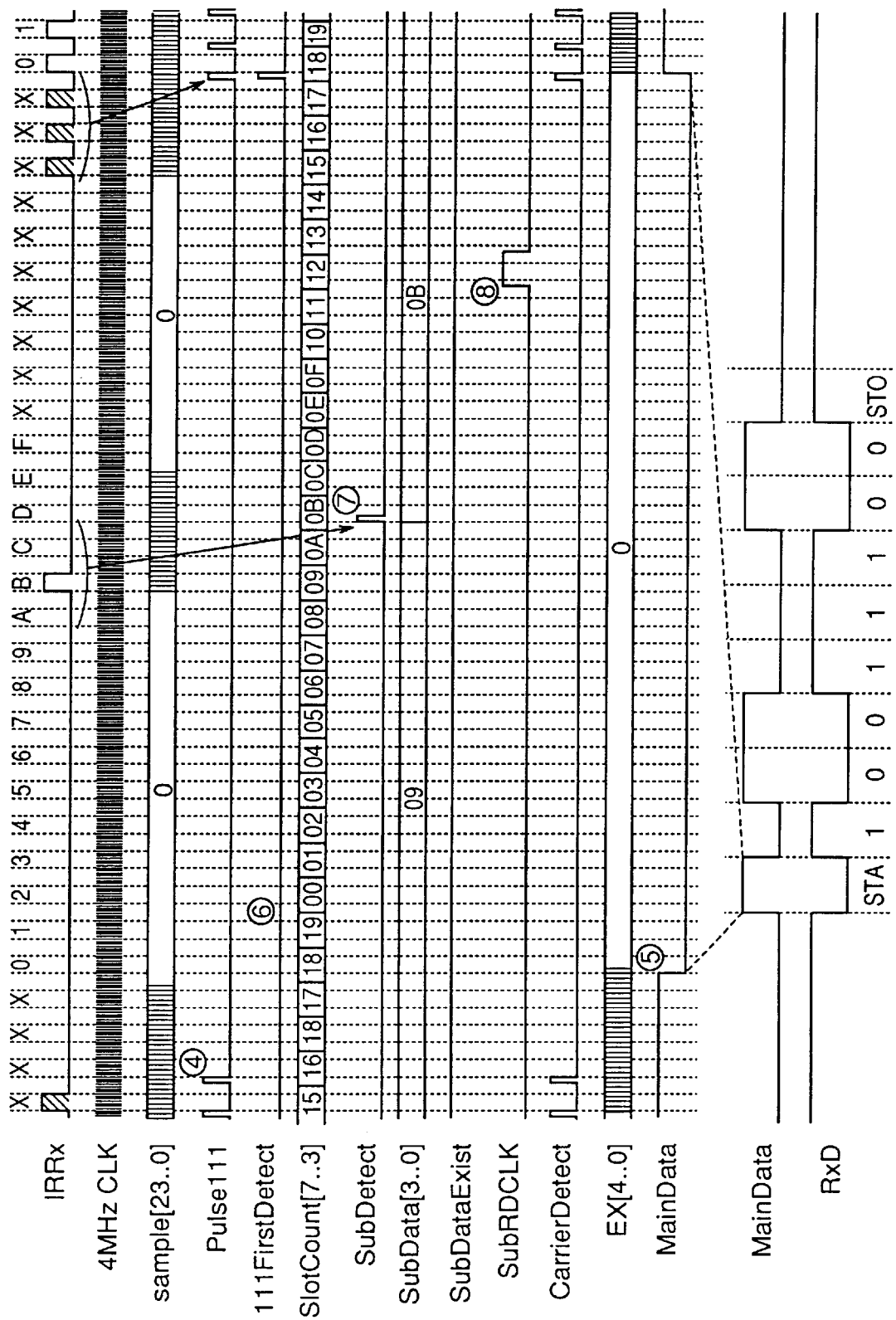
FIG. 57 is a timing chart (2) of the ASK demodulation part according to the sixth embodiment.

When a pulse "B" replaced with a light emitting section is inputted in the IRRx sampling circuit 560, on the other hand, the waveform pattern matching circuit 561 detects the Pulse010 determination conditions shown in FIG. 54 and outputs a pulse for the SubDetect signal at the timing ⑦ in FIG. 57 through the OR gate 570.

The pulse position detecting circuit 564 holds the SlotCount[7..3] signals outputted from the slot counter 562 on the leading edge of the SubDetect signal, and outputs the held value OBH for the SubData[3..0] signals. The slot counter 562 further repeats the count-up operation, and outputs "1" for the SubRDCLK signal on the leading edge of the 4 MHzCLK signal after the value of the SlotCount [7..3] signals becomes 12H. At the timing ⑧, the value of the subdata SubData[3..0] is written in the FIFO buffer 517. The computer or the like connected to the digital optical communication device recognizes the contents of the subdata by reading the data from the FIFO buffer 517.

As hereinabove described, the ASK transmitter 510 superposes subdata on main data by replacing light emitting sections of subcarriers with non-emitting sections or superposing pulses on non-emitting symbols, while the ASK receiver 513 extracts the subdata superposed on the main data by detecting the light emitting sections of the subcarriers replaced with non-emitting sections or the pulses superposed on the non-emitting symbols.

While the positions for replacing light emitting sections in the subcarriers with non-emitting sections or the positions for superposing pulses on non-emitting symbols are decided in response to subdata respectively thereby transmitting subdata, it is also possible to regularly replace a specific light emitting section in the subcarriers with a non-emitting section, or to superpose pulses on specific positions in non-emitting symbols thereby superposing subdata. In this case, the receiving end can at least recognize that the transmitter has a function of receiving subdata due to the existence of the non-emitting sections or the pulses superposed on the non-emitting sections. Further, it is possible to provide the subdata with various meanings through an arrangement between the transmitter and the receiver.

As the subdata, data (current time etc.) changing with time can be superposed and transmitted on the ASK transmitter 510 side, for example. It is possible to improve the reliability of security by extracting the subdata and determining whether or not the value thereof is correct on the ASK receiver 513 side. However, innumerable possibilities are conceivable as to what data are employed as subdata, and hence no further description is made here.

Figure 58:
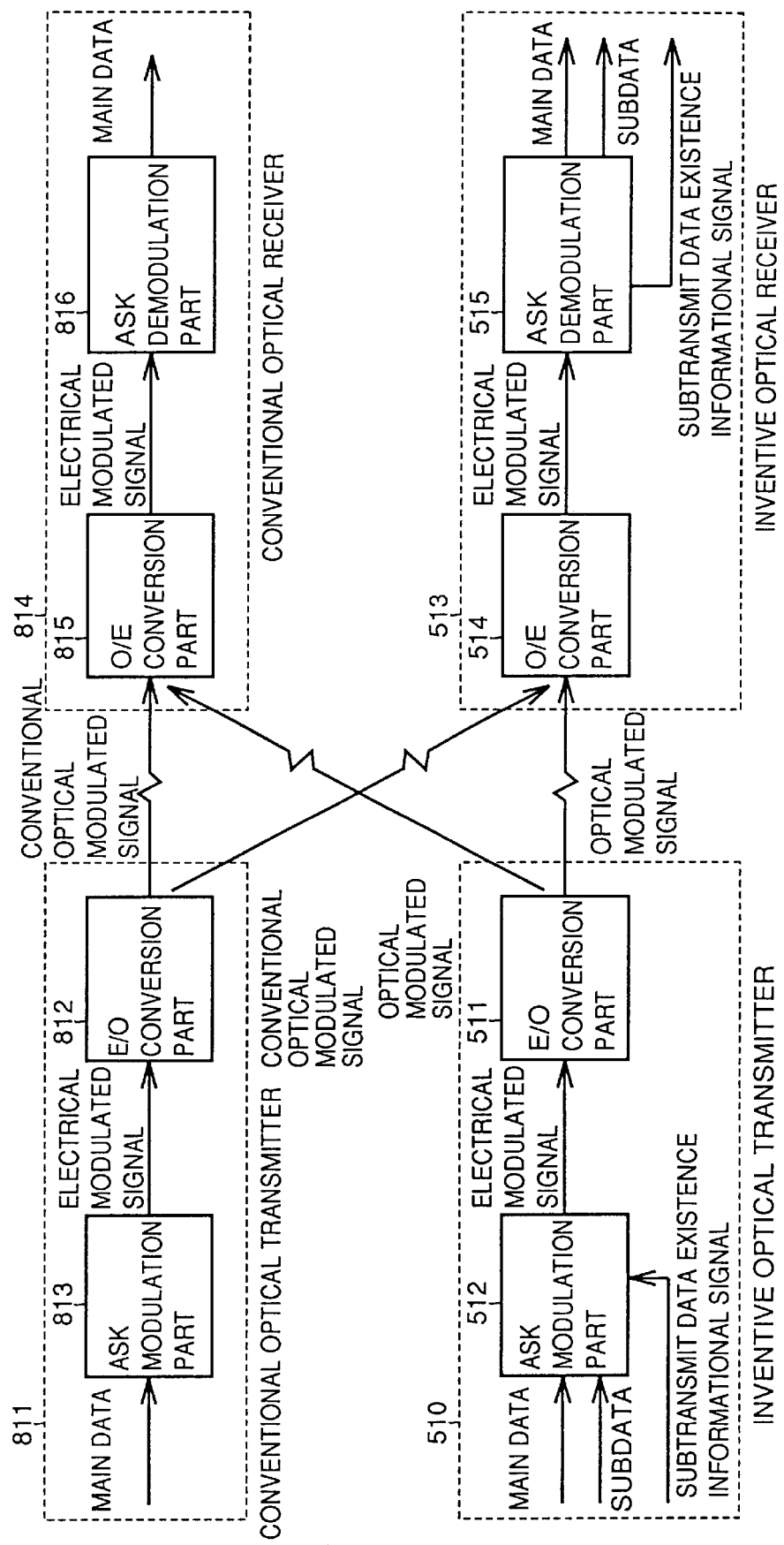
FIG. 58 illustrates communication between the digital optical transmitter according to the sixth embodiment and a conventional digital optical receiver and that between a conventional digital optical transmitter and the digital optical receiver according to the sixth embodiment.
Figure 59A:
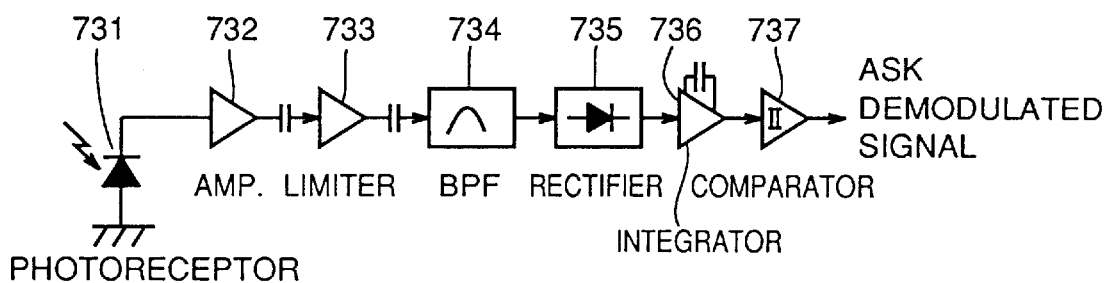
FIG. 59A illustrates the internal structures of an O/E conversion part and an ASK demodulation part in a conventional optical receiver.
Figure 59B:
FIGS. 59B to 59E illustrate transmission waveforms transmitted from the inventive optical transmitter and received by the conventional optical receiver.
Figure 59C:
Figure 59D:
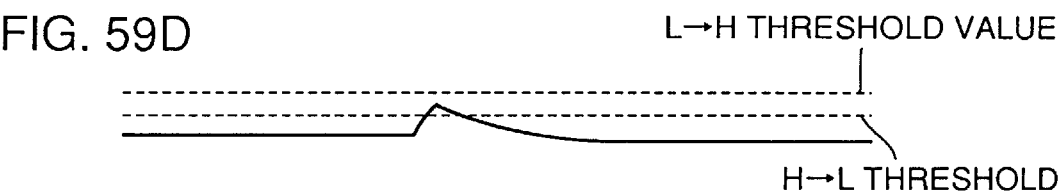
Figure 59E:

Referring to FIG. 58, waveforms in the O/E conversion part 815 and the ASK demodulation part 816 are as shown in FIGS. 59B to 59E when the optical modulated signal from the optical transmitter 510 according to the present invention is inputted in the conventional optical receiver 814. FIG. 59A shows the case of ASK modulation as to the ASK demodulation part 816, for example. When the waveform (FIG. 59B) superposing pulses on non-emitting symbols shown in this embodiment is inputted in the photoreceptor 731, the waveform shown in FIG. 59C is inputted in the rectifier 735. The waveform obtained after the integrator 736 integrates the output from the rectifier 735 is that shown in FIG. 59D. While distortions take place in the positions where the pulses are superposed on the non-emitting symbols, the voltage is higher than the threshold level for conversion from a low level to a high level shown by a dotted line, and hence the ASK demodulation part 816 outputs general non-emitting symbols as shown in FIG. 59E. Therefore, no problem arises in operation.

When the optical modulated signal from the conventional digital optical transmitter 811 is inputted in the inventive digital optical receiver 513, on the other hand, the subdata existence informational signal SubDataExist does not become "1", as hereinabove described. Therefore, the computer or the like connected with the inventive digital optical receiver 513 performs processing on the assumption that there are no subdata, and no problem arises in operation.

According to this embodiment, therefore, it is possible to increase the data communication channel capacity as compared with the conventional digital optical communication device while keeping compatibility therewith.

While a pulse having the width of one pulse of the subcarriers is superposed on the non-emitting symbol in this embodiment as shown in FIG. 60B, it is also possible to superpose subdata even if the pulse width is larger or smaller than one pulse of the subcarriers, as shown in FIGS. 60C to 60E.

The data rate of the main data is generally not integral times the cycle of the subcarriers, and hence the number of pulses of the subcarriers involved in each symbol includes an error of about one pulse. Therefore, the value of the slot counter may be displaced from the position of the slot in each symbol during communication when the ratio of the data rate of the main data to the cycle of the subcarriers is extremely inferior (the ratio exceeds 1 by merely multiplying the value on decimal places by some number) or the packet length is extremely long.

In case of superposing subdata information through a self-advancing counter, therefore, it is necessary to previously arrange the number of subcarriers involved in a single symbol between the optical transmitter and the optical receiver for forcibly initializing the counter at the point of time when displacement results in the count value. When the ratio of the data rate to the cycle of the subcarriers is 25.25, for example, displacement of 1/4 pulses results when the slot counter counts 25 pulses of the subcarriers, and hence the count value is displaced frontward from the original slot position in the symbol when symbols are transmitted four times. It is possible to prevent such displacement between the value of the slot counter and the slot position in each symbol by providing a symbol counter which counts the number of the count operation repeated by the slot counter and forcibly initializing the value of the slot counter when the value of the symbol counter reaches 3.

While the optical communication device employing the ASK modulation system has been described with reference to this embodiment, the present invention is also applicable to a modulation system utilizing subcarriers of a QAM (quadrature amplitude modulation) system or the like.

[Embodiment 7]

Figure 61A:
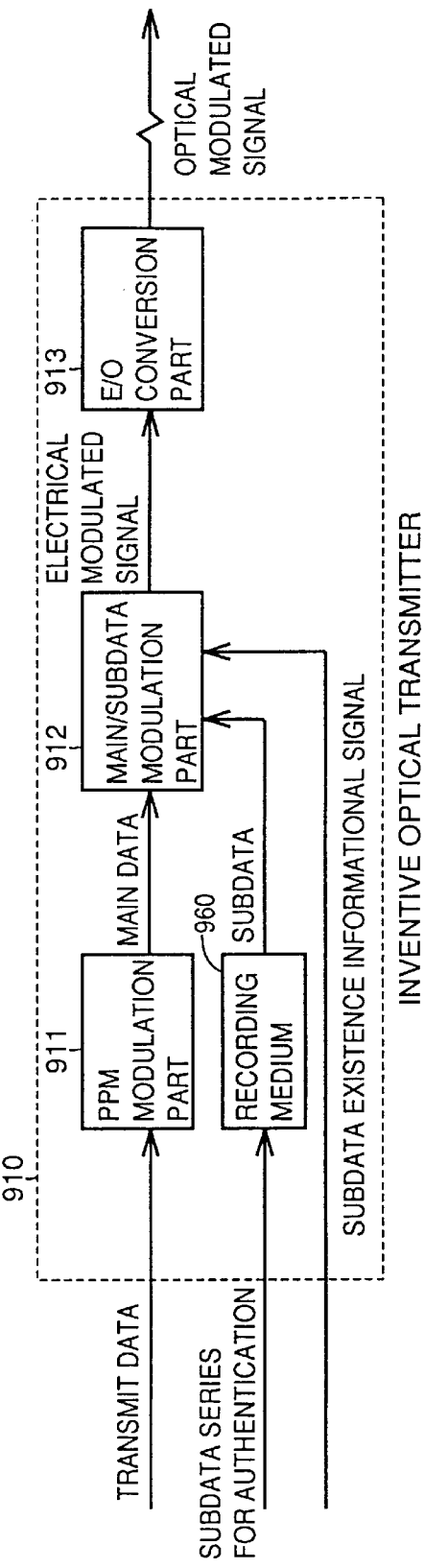
FIGS. 61A and 61B are block diagrams showing the internal structure of a digital optical transmitter and a digital optical receiver according to seventh and eighth embodiments of the present application.
Figure 61B:
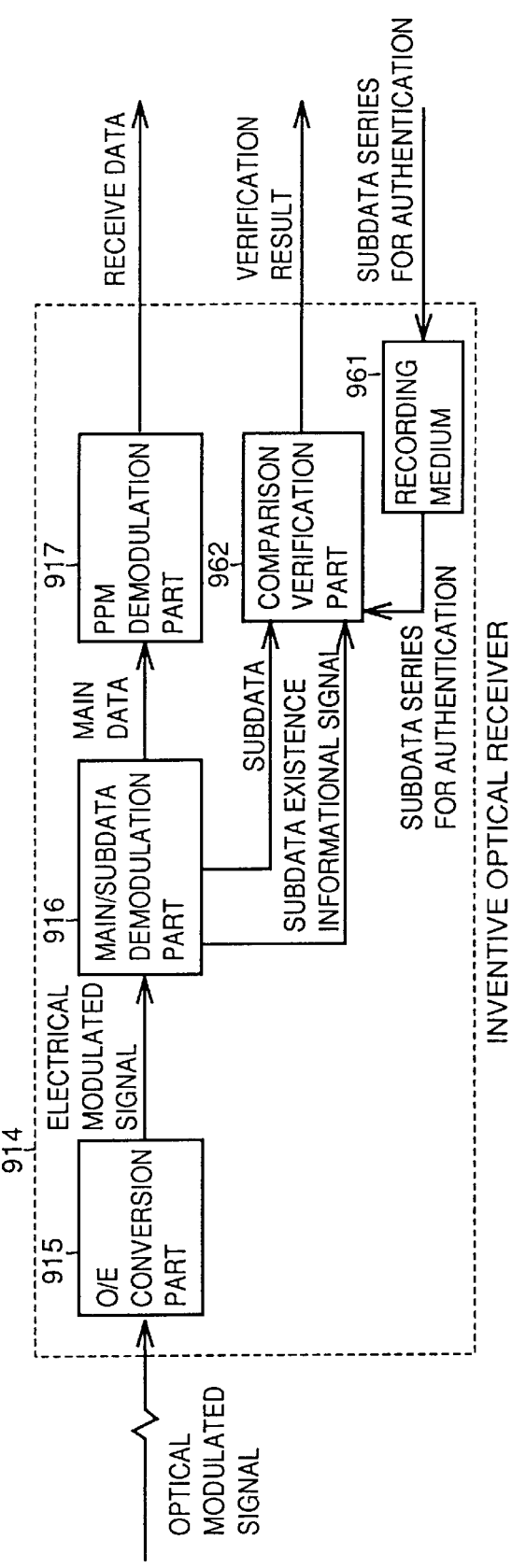

FIGS. 61A and 61B are block diagrams showing the internal structure of a digital optical transmitter and receiver according to a seventh embodiment of the present invention.

The structures of a PPM modulation part 911, a PPM demodulation part 917, an E/O conversion part 913, and an O/E conversion part are similar to those already described. A main/subdata modulation part 912 and a main/subdata demodulation part 916 may employ the specific structures described in any of the first through sixth Embodiment.

The user of a digital optical transmitter 910 can hold in advance the subdata series for authentication in a recording medium 960. The user of a digital optical receiver 914 can obtain the subdata series for authentication in advance from the user of digital optical transmitter 910 to hold that series in recording medium 961 inside digital optical receiver 914. It is assumed that the user of digital optical receiver 914 can only register the subdata series for authentication in recording medium 961, and cannot read out or reuse the subdata series actually received by digital optical receiver 914.

A compare verification part 962 identifies the timing of the existence of subdata by a subdata existence informational signal to sequentially carry out the comparison between the actually received subdata and the subdata series for authentication.

The user can confirm whether the main data is actually the data transmitted from a proper transmitter by the comparison result.

In an eighth embodiment of the present application, when the main data represents electronic information such as money currency and the like in the seventh embodiment of the present invention, the subdata can be rendered to assume the role corresponding to a watermark of a bank note.

The user can confirm that the information of the bank note indicated by the main data is not a counterfeit, and is one of the proper procedure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital optical transmitter transmitting data through a modulation system utilizing subcarriers, comprising:
a main/subdata modulation part for distorting a main data modulated waveform in response to subdata, wherein said waveform is obtained by modulating a subcarrier in main data; and
a conversion part for converting an electrical modulated signal output from said main/subdata modulation part to an optical modulated signal, and for outputting said optical modulated signal; and
a selection part for selecting whether or not information of said subdata is superposed on said main data modulated waveform by distortion;
wherein said main/subdata modulation part outputs a subcarrier modulated waveform when said selection part selects communication with no superposition of said subdata during distortion, and thereafter outputs the same when said selection part selects communication with superposition of said subcarrier.

2. The digital optical transmitter in accordance with claim 1, wherein said main/subdata modulation part modulates said subcarrier so that a distortion of said main data signal, which is to be demodulated, is within a predetermined allowable range.

3. The digital optical transmitter in accordance with claim 1, wherein the modulated subdata modulated by said main/subdata modulation means is used as data for authentication.

4. The digital optical transmitter in accordance with claim 1, wherein the modulated subdata is used as electronic watermark data.

5. A digital optical transmitter transmitting data through a modulation system utilizing subcarriers, comprising:
a main/subdata modulation part for distorting a main data modulated waveform in response to subdata, wherein said waveform is obtained by modulating a subcarrier in main data, and wherein said main/subdata modulation part adds a distortion signal by replacing a light emitting section with a non-emitting section in a symbol forming said main data modulated waveform; and
a conversion part for converting an electrical modulated signal output from said main/subdata modulation part to an optical modulated signal, and for outputting said optical modulated signal.

6. The digital optical transmitter in accordance with claim 5, wherein said main/subdata modulation part decides a position based on preset values of said light emitting section to be replaced in said symbol of said subdata.

7. A digital optical transmitter transmitting data through a modulation system utilizing subcarriers, comprising:
a main/subdata modulation part for distorting a main data modulated waveform in response to subdata, wherein said waveform is obtained by modulating a subcarrier in main data, and wherein said main/subdata modulation part adds a distortion signal by replacing a non-emitting section with a light emitting section in a symbol forming said main data modulated waveform; and
a conversion part for converting an electrical modulated signal output from said main/subdata modulation part to an optical modulated signal, and for outputting said optical modulated signal.

8. The digital optical transmitter in accordance with claim 7, wherein said main/subdata modulation part decides a position of said non-emitting section to be replaced in said symbol based on preset values of said subdata.

9. A digital optical transmitter transmitting data through a modulation system utilizing subcarriers, comprising:
a main/subdata modulation part for distorting a main data modulated waveform in response to subdata, wherein said waveform is obtained by modulating a subcarrier in main data, and wherein said main/subdata modulation part adds a distortion signal by displacing a position of a light emitting section in a symbol forming said main data modulated waveform; and a conversion part for converting an electrical modulated signal output from said main/subdata modulation part to an optical modulated signal, and for outputting said optical modulated signal.

10. The digital optical transmitter in accordance with claim 9, wherein said main/subdata modulation part decides a position of said light emitting section to be displaced in said symbol based on preset values of said subdata.

11. A digital optical receiver receiving data through a modulation system utilizing subcarriers, comprising:
a conversion part for receiving an optical modulated signal, converting the same to an electrical modulated signal formed of a subcarrier, and outputting said electrical modulated signal; and
a subdata extraction part for detecting a distortion signal in said subcarrier and for extracting subdata that is superposed on said subcarrier;
wherein said subdata extraction part detects two distortion signals in said subcarrier and extracts said subdata by a relative time interval between said two distortion signals.

12. The digital optical receiver in accordance with claim 11, wherein the extracted subdata is used as data for authentication.

13. The digital optical receiver in accordance with claim 11, wherein the subdata is used as electronic watermark data.

14. A digital optical receiver receiving data through a modulation system utilizing subcarriers, comprising:
a conversion part for receiving an optical modulated signal, converting the same to an electrical modulated signal formed of a subcarrier, and outputting said electrical modulated signal; and
a subdata extraction part for detecting a distortion signal in said subcarrier and for extracting subdata that is superposed on said subcarrier;
wherein said subdata extraction part extracts said subdata by detecting where a light emitting section in said subcarrier is replaced with a non-emitting section.

15. The digital optical receiver in accordance with claim 14, wherein said subdata extraction part decides which subdata to extract based on a position where said light emitting section is replaced with said non-emitting section.

16. A digital optical receiver receiving data through a modulation system utilizing subcarriers, comprising:
a conversion part for receiving an optical modulated signal, converting the same to an electrical modulated signal formed of a subcarrier, and outputting said electrical modulated signal; and
a subdata extraction part for detecting a distortion signal in said subcarrier and for extracting subdata that is superposed on said subcarrier;
wherein said subdata extraction part extracts said subdata by detecting where a non-emitting section in said subcarrier is replaced with a light emitting section.

17. The digital optical receiver in accordance with claim 16, wherein said subdata extraction part decides which subdata to extract based on a position where said non-emitting section is replaced with said light emitting section.

18. A digital optical receiver receiving data through a modulation system utilizing subcarriers, comprising:
a conversion part for receiving an optical modulated signal, converting the same to an electrical modulated signal formed of a subcarrier, and outputting said electrical modulated signal; and
a subdata extraction part for detecting a distortion signal in said subcarrier and for extracting subdata that is superposed on said subcarrier;
wherein said subdata extraction part extracts said subdata by detecting where a position of a light emitting section in said subcarrier is displaced.

19. The digital optical receiver in accordance with claim 18, wherein said subdata extraction part decides which subdata is extracted based on where the position of said light emitting section is displaced.

20. A digital optical transmitter transmitting data through a modulation system utilizing subcarriers, comprising:
a main/subdata modulation part for distorting a main data modulated waveform in response to subdata, wherein said waveform is obtained by modulating a subcarrier in main data, and wherein said main/subdata modulation part adds two distortion signals in a symbol forming said main data modulated waveform and superposes said subdata by a relative time interval between said two distortion signals; and
a conversion part for converting an electrical modulated signal output from said main/subdata modulation part to an optical modulated signal, and for outputting said optical modulated signal.

21. A digital optical transmitter transmitting data through a modulation system utilizing subcarriers, comprising:
a main/subdata modulation part for distorting a non-emitting symbol of a main data modulated waveform in response to subdata, obtained by modulating a subcarrier on main data; and
a conversion part for converting an electrical modulated signal output from said main/subdata modulation part to an optical modulated signal, and for outputting said optical modulated signal.

22. The digital optical transmitter in accordance with claim 21, further including a selection part for selecting whether or not information of said subdata is superposed on said main data modulated waveform,
wherein said main/subdata modulation part outputs a subcarrier modulated waveform when said selection part selects communication with no superposition of said subdata during distortion, and thereafter outputs the same when said selection part selects communication with superposition of said subdata.

23. The digital optical transmitter in accordance with claim 21, wherein said main/subdata modulation part adds a distortion by superposing a pulse in a non-emitting symbol forming said main data modulated waveform.

24. The digital optical transmitter in accordance with claim 23, wherein said main/subdata modulation part decides a position of said pulse to be superposed in said non-emitting symbol based on preset values of said subdata.

25. The digital optical transmitter in accordance with claim 23, wherein the pulse width of said superposed pulse is an integral times a half cycle of said subcarrier.

26. A digital optical receiver receiving data through a modulation system utilizing subcarriers, comprising:
a conversion part for receiving an optical modulated signal, converting the same to an electrical modulated signal formed of a non-emitting symbol, and outputting said electrical modulated signal; and
a subdata extraction part for detecting a distortion signal of said non-emitting symbol, and for extracting subdata that is superposed on said non-emitting symbol.

27. The digital optical receiver in accordance with claim 26, wherein said subdata extraction part extracts said subdata by detecting where a pulse is superposed in said non-emitting symbol.

28. The digital optical receiver in accordance with claim 27, wherein said subdata extraction part decides which subdata to extract based on a position of said superposed pulse on said non-emitting symbol.

29. A digital optical transmitter, comprising:
- a main/subdata modulator for modulating a main data waveform utilizing subcarriers, wherein said modulation distorts the subcarriers in accordance with preset values of received subdata; and
- a converter for converting an electrical modulated signal output from said main/subdata modulator into an optical modulated signal; and
- a selector part for selecting whether or not information of said subdata is superposed on said main data modulator waveform by distortion;
- wherein said main/subdata modulator part outputs a subcarrier modulator waveform when said selector part selects communication with no superposition of said subdata during distortion, and thereafter outputs the same when said selector part selects communication with superposition of said subcarrier.

30. A digital optical receiver, comprising:
- a converter for converting a received optical modulated signal to an electrical modulated signal that is formed of a subcarrier; and
- a main/subdata demodulator for extracting subdata superposed on said subcarrier in accordance with a detected distortion signal; and
- wherein said main/subdata demodulator part detects two distortion signals in said subcarrier and extracts said subdata by a relative time interval between said two distortion signals.

* * * * *

UNITED STATES PATENT AND TRADEMARK OFFICE
CERTIFICATE OF CORRECTION

PATENT NO. : 6,388,784 B1  
DATED : May 14, 2002  
INVENTOR(S) : Makoto Nakamura et al.

It is certified that error appears in the above-identified patent and that said Letters Patent is hereby corrected as shown below:

Title page,
Item [30], Foreign Application Priority Data, please correct the third filing date from "May 19, 1997" to -- May 2, 1997 --.

Signed and Sealed this

Seventh Day of January, 2003

JAMES E. ROGAN
*Director of the United States Patent and Trademark Office*